(12) United States Patent
Briese et al.

(10) Patent No.: US 10,843,565 B2
(45) Date of Patent: Nov. 24, 2020

(54) PTO QUICK ATTACH FOR VEHICLE

(71) Applicant: Polaris Industries Inc., Medina, MN (US)

(72) Inventors: Kevin K. Briese, Badger, MN (US); Jacob D. Hanson, Lindstrom, MN (US)

(73) Assignee: Polaris Industries Inc., Medina, MN (US)

( * ) Notice: Subject to any disclaimer, the term of this patent is extended or adjusted under 35 U.S.C. 154(b) by 75 days.

(21) Appl. No.: 15/852,510

(22) Filed: Dec. 22, 2017

(65) Prior Publication Data
US 2018/0186233 A1 Jul. 5, 2018

Related U.S. Application Data

(60) Provisional application No. 62/437,667, filed on Dec. 22, 2016.

(51) Int. Cl.
*A01B 71/06* (2006.01)
*B60K 25/06* (2006.01)
(Continued)

(52) U.S. Cl.
CPC ............ *B60K 25/06* (2013.01); *A01B 71/063* (2013.01); *B60K 17/28* (2013.01); *B60K 25/02* (2013.01);
(Continued)

(58) Field of Classification Search
CPC .. B60K 25/02; B60K 25/06; B60K 2025/026; B60K 2025/065; B60K 17/28; A01B 71/063; A01B 59/062; A01B 63/108
See application file for complete search history.

(56) References Cited

U.S. PATENT DOCUMENTS

| | | | | |
|---|---|---|---|---|
| 7,278,502 | B2 * | 10/2007 | Trefz | A01B 71/063 |
| | | | | 180/53.1 |
| 7,284,625 | B2 * | 10/2007 | Jones | B60K 25/02 |
| | | | | 180/53.4 |

(Continued)

FOREIGN PATENT DOCUMENTS

| | | |
|---|---|---|
| EP | 1982580 | 10/2008 |
| FR | 3018029 | 9/2015 |

OTHER PUBLICATIONS

Search Report of the International Searching Authority, dated Apr. 16, 2018, for related International Patent Application No. PCT/US2017/068169; 9 pages.

(Continued)

*Primary Examiner* — James A English
(74) *Attorney, Agent, or Firm* — Faegre Drinker Biddle & Reath LLP

(57) ABSTRACT

A utility vehicle is disclosed. The utility vehicle is configured to support a removable implement. The removable implement may include one or more components configured to be powered by a power take off system of the utility vehicle. The removable implement may also include one or more components configured to be powered by a hydraulic system of the utility vehicle. An operator of the utility vehicle, without exiting a cab of the utility vehicle, can couple the implement to the utility vehicle such that the hydraulic components are hydraulically coupled to the vehicle's hydraulic system and such that the components of the implement configured to be powered by a power take off system of the utility vehicle are operably coupled to the power take off system of the utility vehicle.

13 Claims, 48 Drawing Sheets

(51) Int. Cl.
   *B60K 17/28*     (2006.01)
   *B60K 25/02*     (2006.01)
   *A01B 63/108*    (2006.01)
   *A01B 59/06*     (2006.01)

(52) U.S. Cl.
   CPC ........... *A01B 59/062* (2013.01); *A01B 63/108* (2013.01); *B60K 2025/026* (2013.01); *B60K 2025/065* (2013.01)

(56) References Cited

U.S. PATENT DOCUMENTS

| | | | |
|---|---|---|---|
| 10,015,922 B2 * | 7/2018 | Ribo | A01B 71/063 |
| 2006/0055140 A1 * | 3/2006 | Trefz | A01B 71/063 |
| | | | 280/100 |
| 2011/0290570 A1 * | 12/2011 | Goulet | A01B 71/063 |
| | | | 180/53.1 |
| 2014/0060219 A1 | 3/2014 | Marotte | |
| 2016/0113188 A1 * | 4/2016 | Huegerich | A01B 59/042 |
| | | | 180/53.1 |
| 2016/0348731 A1 | 12/2016 | Knuth | |

OTHER PUBLICATIONS

Written Opinion of the International Searching Authority, dated Apr. 16, 2018, for related International Patent Application No. PCT/US2017/068169; 11 pages.

International Preliminary Report on Patentability issued by The International Bureau of WIPO, dated Jun. 25, 2019, for International Patent Application No. PCT/US2017/068169; 10 pages.

International Preliminary Report on Patentability issued by the International Preliminary Examining Authority, dated Jan. 9, 2020, for International Patent Application No. PCT/US2017/068169; 20 pages.

Office Action issued by the Canadian Intellectual Property Office, dated Jul. 20, 2020, for Canadian Patent Application No. 3,047,166; 3 pages.

* cited by examiner

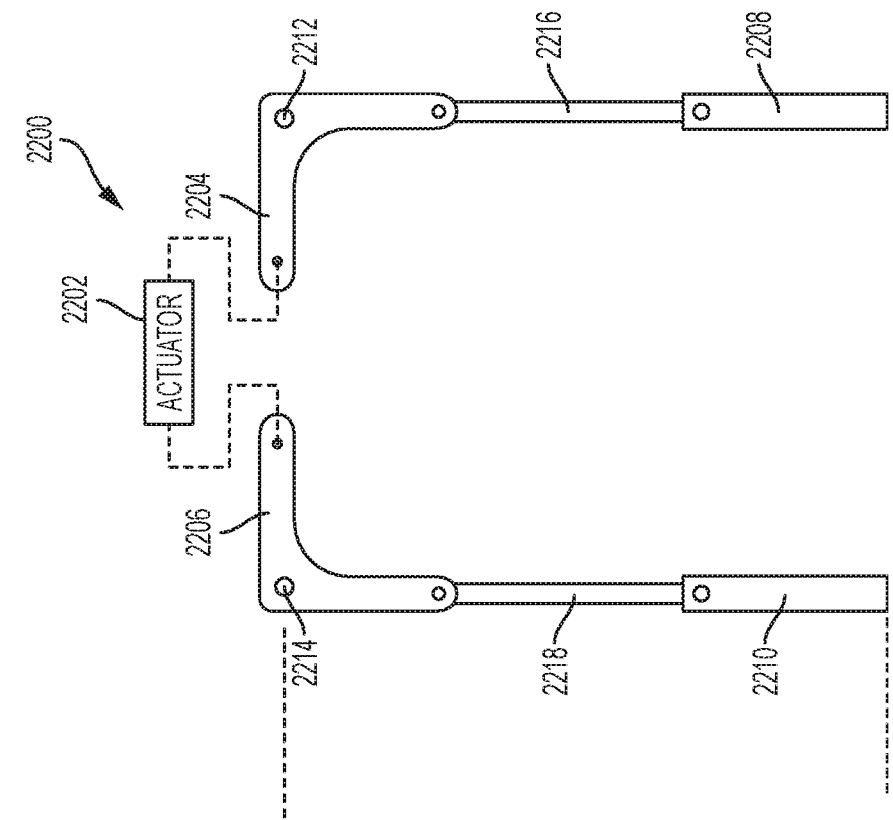
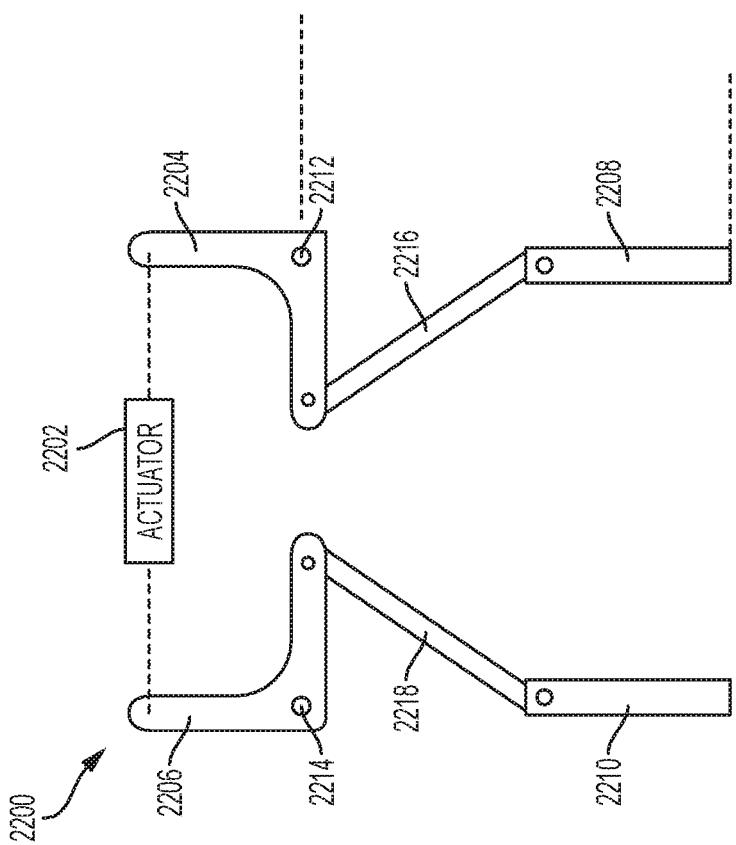
FIG. 9
FIG. 8

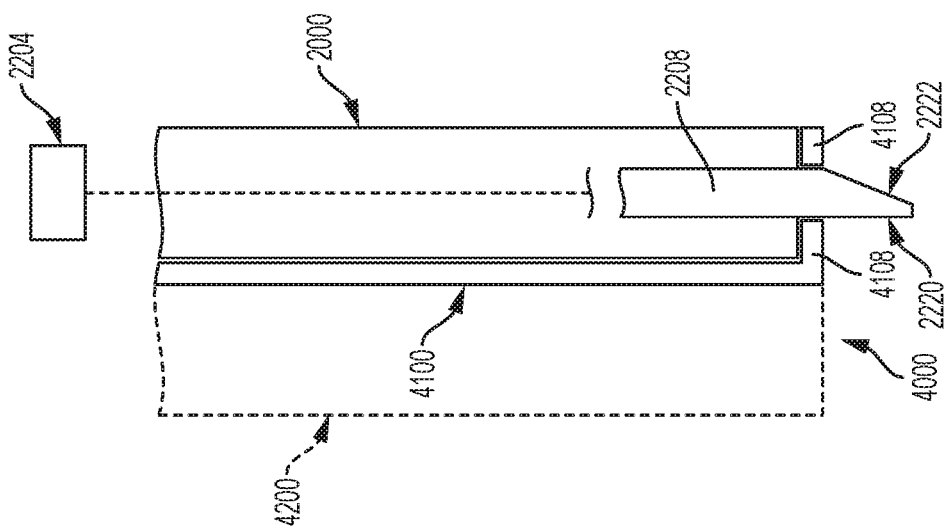
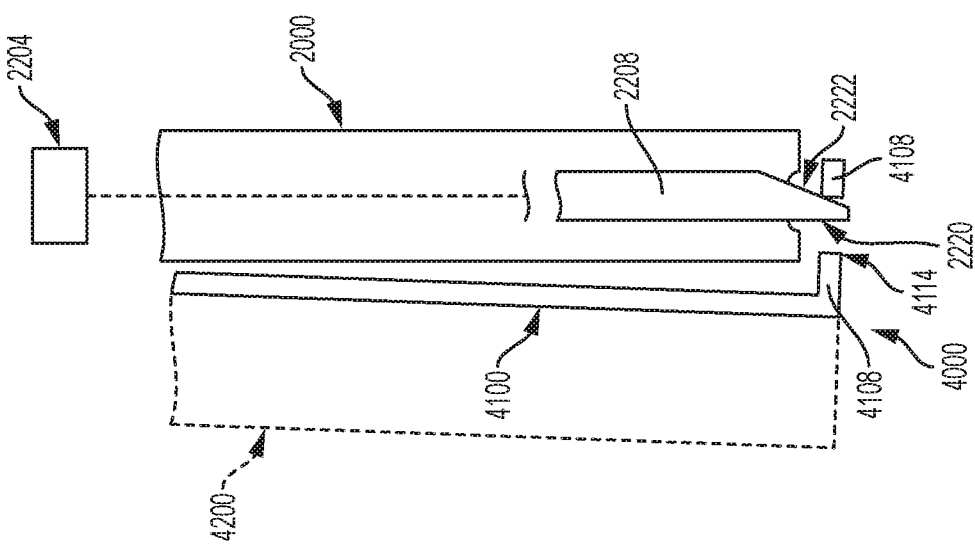

PTO QUICK ATTACH FOR VEHICLE

TECHNICAL FIELD

The present application claims priority from U.S. Provisional application Ser. No. 62/437,667, filed 22 Dec. 2016, the subject matter of which is incorporated herein by reference.

Various aspects of the instant disclosure relate to multi-purpose utility vehicles, and more particularly, to multi-purpose utility vehicles configured to support removable attachments or implements, such as front end attachments.

BACKGROUND OF THE DISCLOSURE

Recreation and utility vehicles are becoming more popular and are being utilized for a range of tasks. For instance, Polaris Industries Inc. of Medina, Minn. manufactures utility vehicles which include a Power Take Off ("PTO") system, which is a system that facilitates the powering and control of removable attachments or implements that can be removably coupled to the utility vehicle. Generally, the PTO system utilizes engine power of the utility vehicle.

Typically, a variety removable attachments or implements may attach to the utility vehicle. In many instances, the various attachments or implements are designed to perform different tasks, and therefore require versatility in their control. Systems have been developed to address the need for universal attachment and control of these different attachments or implements. For instance, Polaris Industries Inc. of Medina, Minn. has developed systems for controlling the speed of the PTO system relative to the utility vehicle's engine power output, thereby controlling the output speed of the attachments or implements relative to the utility vehicle's engine power output.

However, challenges still remain and improvements are needed in the area of coupling or mating these removable attachments or implements to utility vehicles. Conventional systems require manual attachment of numerous components, such as the PTO and hydraulic systems, wherein an operator must exit the utility vehicle, approach the attachment or implement and manually couple the PTO and hydraulic systems. This activity not only takes time, but also exposes the operator to environmental elements. In addition, manually coupling these attachments or implements to the utility vehicle exposes the operator to heavy equipment, pressurized hydraulic lines, and potentially moving parts. Accordingly, to avoid injury that could occur as result of unsafe operation, systems are needed to enable the operator to couple attachments or implements to the utility vehicle without the need to exit the operator's cab or operator area.

The embodiments disclosed herein relate to multi-purpose utility vehicles and systems that fully integrate PTO systems and hydraulic systems for the hands-free coupling and powering of removable attachments and implements, such as front end attachments.

Exemplary utility vehicles available from Polaris Industries Inc. of Medina, Minn., and are disclosed in U.S. Pat. No. 8,944,449 issued on Feb. 3, 2015; U.S. Pat. No. 8,950,525 issued on Feb. 10, 2015; U.S. Pat. No. 7,819,220, issued on Oct. 26, 2010; U.S. Provisional Patent Application No. 61/442,071, filed on Feb. 11, 2011; U.S. patent application Ser. No. 13/1370,139, filed on Feb. 9, 2012; U.S. patent application Ser. No. 13/464,603, filed on May 4, 2012; U.S. patent application Ser. No. 13/492,589, filed on Jun. 8, 2012; and International Patent Application No. PCT/US2011/031376, filed on Apr. 6, 2011, the complete disclosures of which are expressly incorporated by reference herein.

Exemplary PTO systems available from Polaris Industries Inc. of Medina, Minn., and are disclosed in U.S. Pat. No. 8,950,525, mentioned above; and U.S. Pat. No. 7,399,255, issued on Jul. 15, 2008.

SUMMARY OF THE DISCLOSURE

Various aspects of the disclosure relate to PTO QUICK ATTACH FOR VEHICLE.

Some aspects of the disclosure relate to a utility vehicle including a frame, an operator area supported by the frame, a power take off system, and an implement interface system coupled to the frame. In some embodiments, the implement interface system is configured to interface with at least one removable implement that includes at least one hydraulically powered component and at least one component configured to be powered by the power take off system of the utility vehicle.

In some embodiments, an operator of the utility vehicle, without exiting the operator area of the utility vehicle, can couple the implement to the utility vehicle such that the least one hydraulically powered component of the implement is hydraulically coupled to the hydraulic system of the utility vehicle and such that the at least one component configured to be powered by the power take off system is operably coupled to the power take off system of the vehicle.

Some aspects of the disclosure relate to a utility vehicle including a power take off system configured to deliver power to a removable implement coupled to the utility vehicle and a power take off driving member coupled to the power take off system of the utility vehicle. In some embodiments, the power take off driving member includes a body and a plurality of lobes radially emanating from the body of the power take off driving member. In some embodiments, the utility vehicle further includes a removable implement operably coupled to the power take off system of the utility vehicle.

In some embodiments, the removable implement includes a power take off receiving member configured to interface with the power take off driving member. In some such embodiments, the power take off receiving member includes a body and a plurality of lobes radially emanating from the body of the power take off receiving member. In some embodiments, each adjacent radially emanating lobe has a reaction member projecting therefrom such that a void exits each adjacent reaction member, wherein each adjacent radially emanating lobe of the power take off driving member engages a reaction member of the power take off receiving member to cause the power take off receiving member to rotate.

Some aspects of the disclosure relate to a method of operating a utility vehicle including coupling a removable implement to the utility vehicle, wherein the utility vehicle includes an operator area, a power take off system, and a driving member coupled to the power take off system. In some embodiments, the implement includes at least one component configured to be powered by the power take off system of the utility vehicle and a receiving member configured to engage the driving member of the utility vehicle. In some embodiments. the removable implement is coupled to the utility vehicle such that the driving member and the receiving member are not properly aligned. In some such embodiments, the method further includes engaging the power take off system of the utility vehicle from within the operator area to cause the driving member to rotate relative to the receiving member until the driving member and the receiving member are properly aligned.

While multiple, inventive examples are specifically disclosed, various modifications and combinations of features from those examples will become apparent to those skilled in the art from the following detailed description. Accordingly, the disclosed examples are meant to be regarded as illustrative in nature and not restrictive.

BRIEF DESCRIPTION OF THE DRAWINGS

FIG. 8 is a front view of an actuation system in a first position, according to some embodiments.

FIG. 9 is a front view of the actuation system illustrated in FIG. 8 in a second position, according to some embodiments.

FIG. 24 is a cross sectional view of a portion of the actuation system illustrated in FIG. 23 taken along line 24-24 with the actuation system in an intermediate position, according to some embodiments.

FIG. 25 is a cross sectional view of a portion of the actuation system illustrated in FIG. 23 taken along line 24-24 with the actuation system in a second position, according to some embodiments.

DETAILED DESCRIPTION

The embodiments disclosed below are not intended to be exhaustive or to limit the disclosure to the precise forms disclosed in the following detailed description. Rather, the embodiments are chosen and described so that others skilled in the art may utilize their teachings. While the present disclosure relates to systems that utilized in combination with a multi-purpose utility vehicle, it should be understood that the features disclosed herein may have application to other types of vehicles.

Referring to FIGS. 1 to 4, an illustrative embodiment of a utility vehicle 1000 is shown and described. In various embodiments, the utility vehicle 1000 includes an implement interface system 2000 and a support system 3000. In some embodiments, one or more attachments or implements 4000 can be coupled to the utility vehicle 1000. In some embodiments, the utility vehicle 1000 further includes a PTO system 5000. Together, the implement interface system 2000, the support system 3000, and the PTO system 5000 enable the vehicle 1000 to interact with and control the one or more implements or attachments 4000. Specifically, these systems and components of the utility vehicle 1000 enable an operator to couple and decouple an implement or attachment 4000 to the utility vehicle 1000 without ever exiting the utility vehicle 1000, as described further below.

Figure 5:
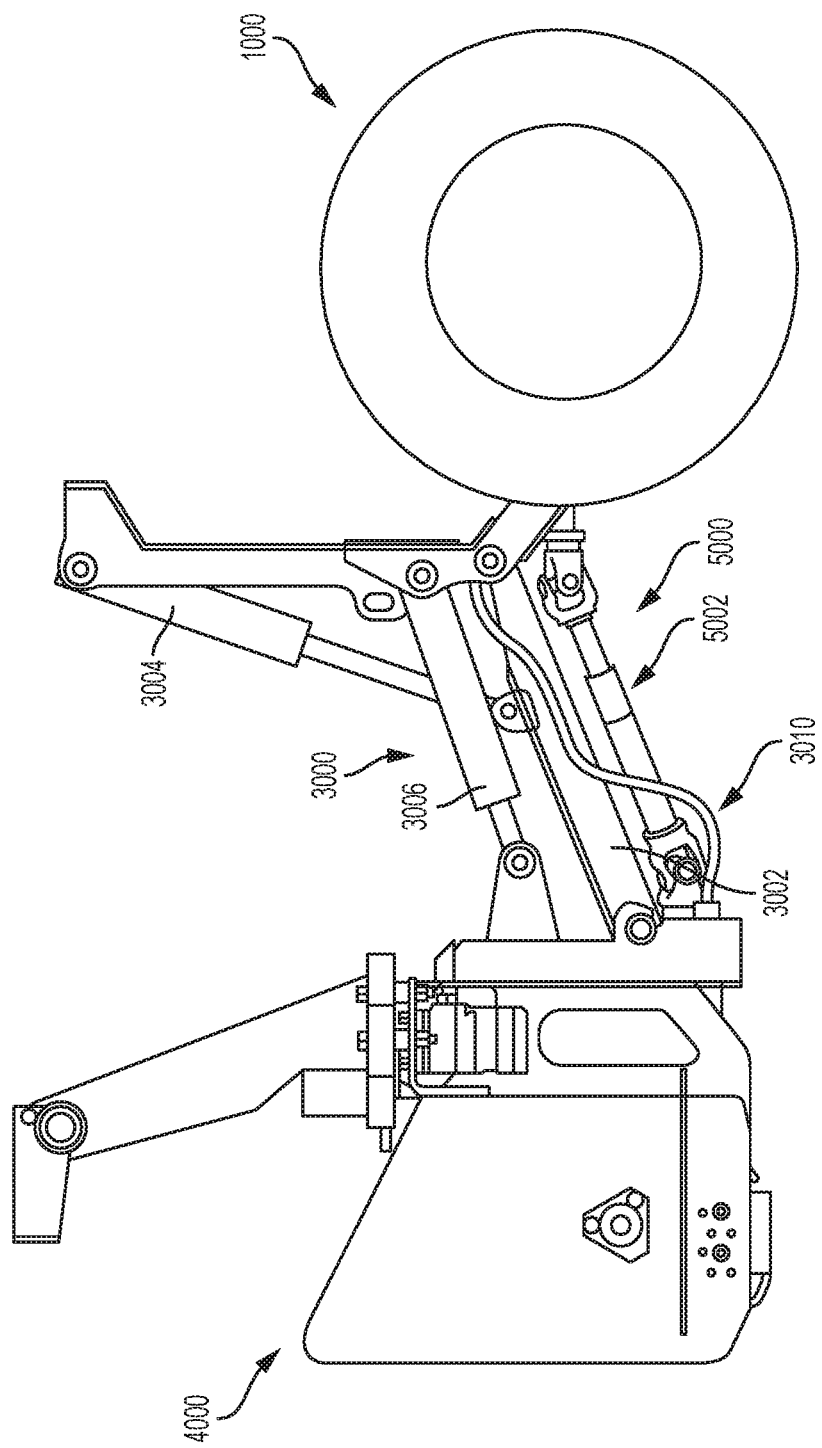
FIG. 5 is a side view of a portion of the utility vehicle illustrating portions of a power system of the utility vehicle, according to some embodiments.

An example implement 4000 is illustrated in FIG. 5. In some examples, the utility vehicle 1000 is one of the exemplary utility vehicles referred to above. Generally, the utility vehicle includes a forward or front end 1002, an aft or rear end 1004, a right side 1006, and a left side 1008. Generally, the right and left sides are considered to be from the perspective of an operator sitting in a cab or operator area 1010 and facing the forward end 1002 of the utility vehicle.

Figure 1:
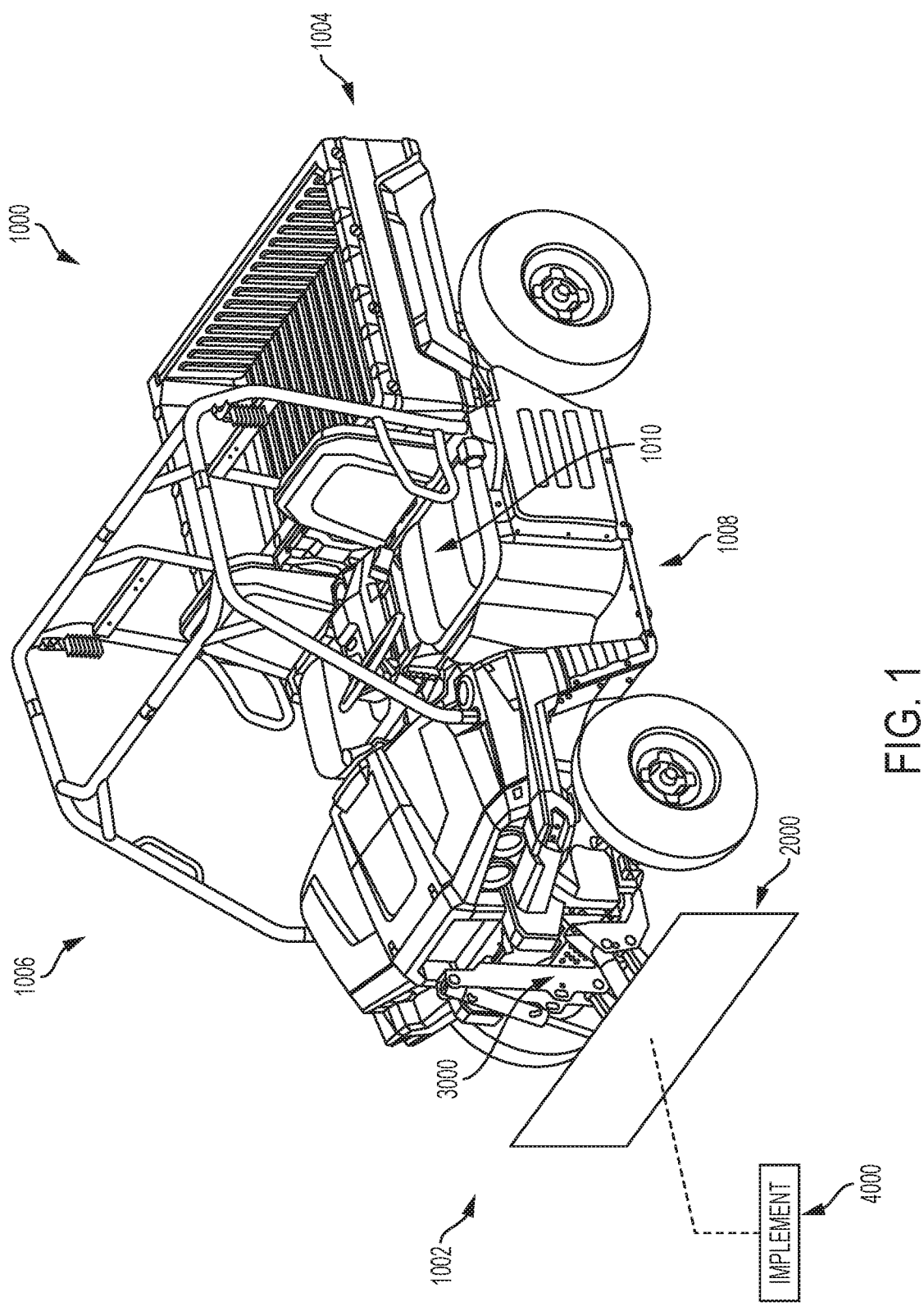
FIG. 1 is a front perspective view of a utility vehicle, according to some embodiments.
Figure 2:
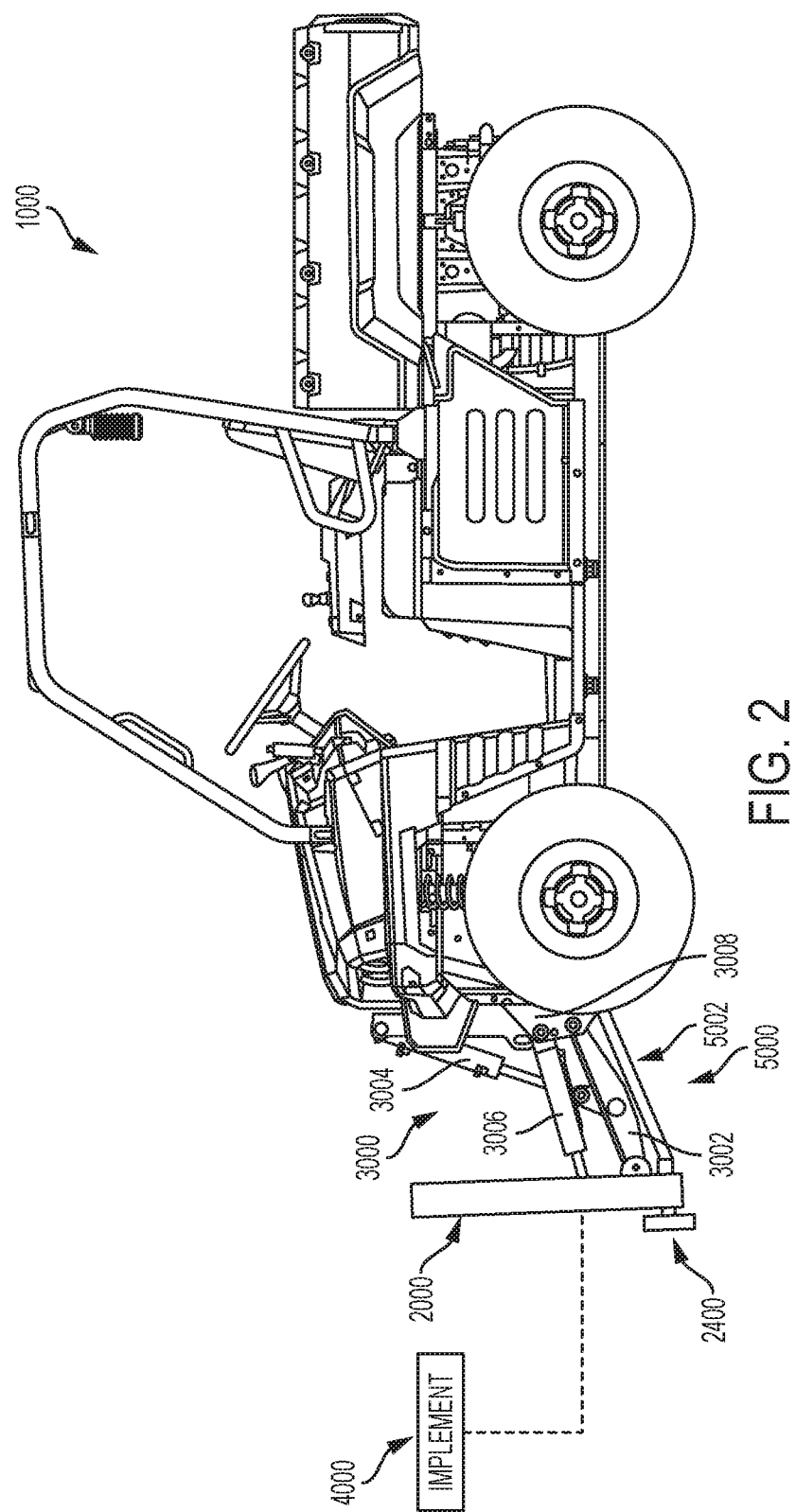
FIG. 2 is a side view of a utility vehicle, according to some embodiments.
Figure 3:
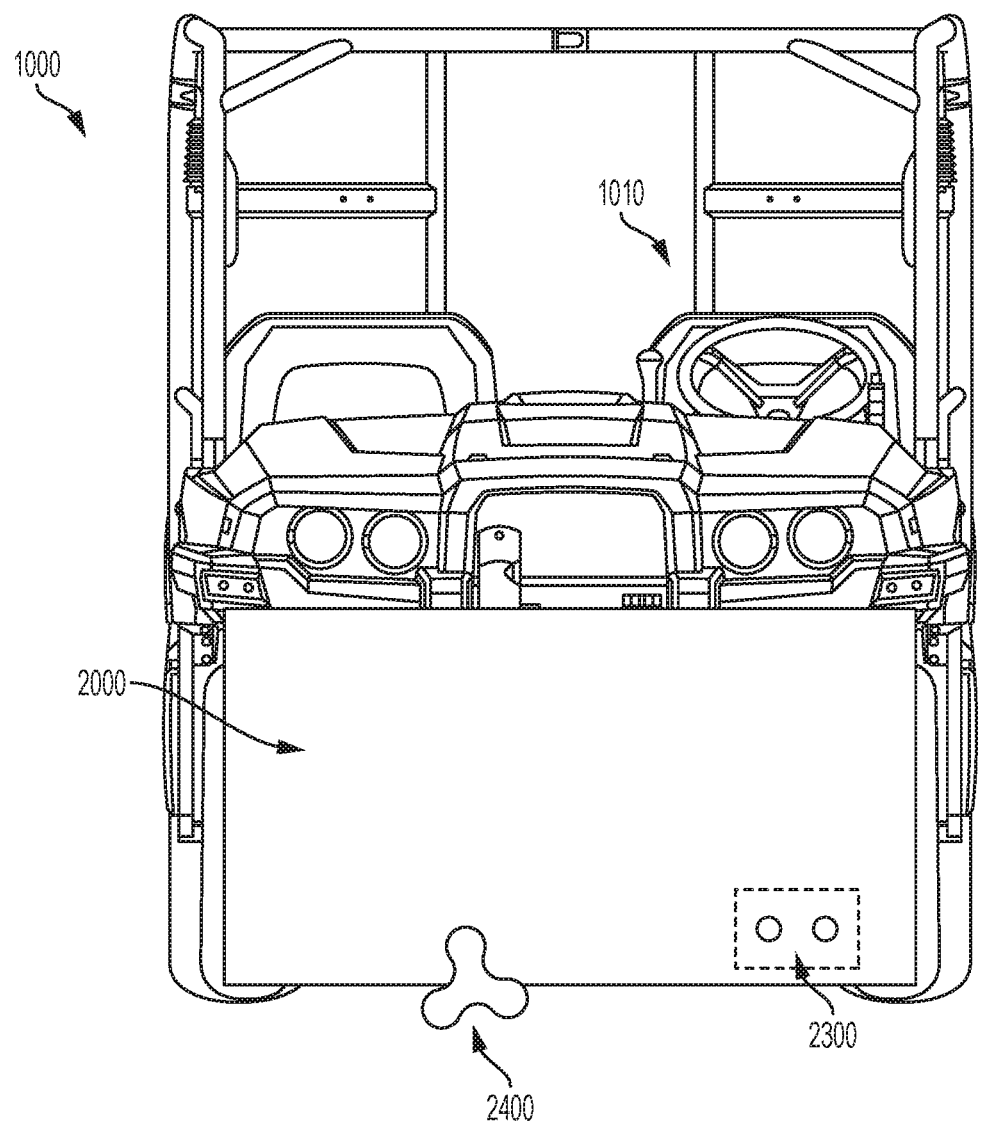
FIG. 3 is a front view of a utility vehicle, according to some embodiments.

As mentioned above, in some embodiments, the utility vehicle 1000 includes a PTO system 5000 that is operable to deliver power to an implement 4000 coupled to the utility vehicle 1000. Specifically, the PTO system 5000 is operable to deliver power to one or more components or mechanisms of the implement 4000. For example, referring specifically to FIG. 2, the utility vehicle 1000 includes a PTO system 5000. In various embodiments, the PTO system 5000 includes drive shaft member 5002 that extends between the utility vehicle 1000 and the implement interface system 2000. In various embodiments, a portion of the PTO system 5000 is supported by the implement interface system 2000. In some embodiments, the drive shaft member 5002 interfaces with one or more components of the implement interface system 2000. Generally, these one or more components of the implement interface system 2000 then interface with the implement 4000, as discussed in greater detail below. It will be appreciated that while the PTO system 5000 is illustrated in FIG. 2 as extending from a forward or front end of the utility vehicle 1000, in other embodiments, the PTO system 5000 may extend from any other portion of the utility vehicle, such as the aft or rear end of the utility vehicle 1000.

In various embodiments, the implement interface system 2000 is movably coupled to the utility vehicle 1000 via the support system 3000. As illustrated, the support system 3000 is coupled to the forward end 1002 of the utility vehicle 1000. That is, in various embodiments, the support system 3000 is operably coupled to the forward end 1002 of the utility vehicle 1000 and the implement interface system 2000 is operably coupled to the support system 3000.

Generally, the support system 3000 facilitates manipulation and control of the implement interface system 2000 and thereby the one or more implements or attachments 4000 coupleable thereto. In various embodiments, the support system 3000 can be pitched or otherwise rotated relative to the utility vehicle 1000. This rotation causes a change in position of the implement interface system 2000 relative to the utility vehicle 1000 as will be appreciated by one of skill in the art.

In various embodiments, the support system 3000 includes one or more frame members and one or more control devices that facilitate manipulation and control of the one or more frame members. In some embodiments, the control devices include hydraulic components such as hydraulic cylinders. In some such embodiments, the hydraulic components are coupled to the utility vehicle and to the one or more frame members.

Figure 4:
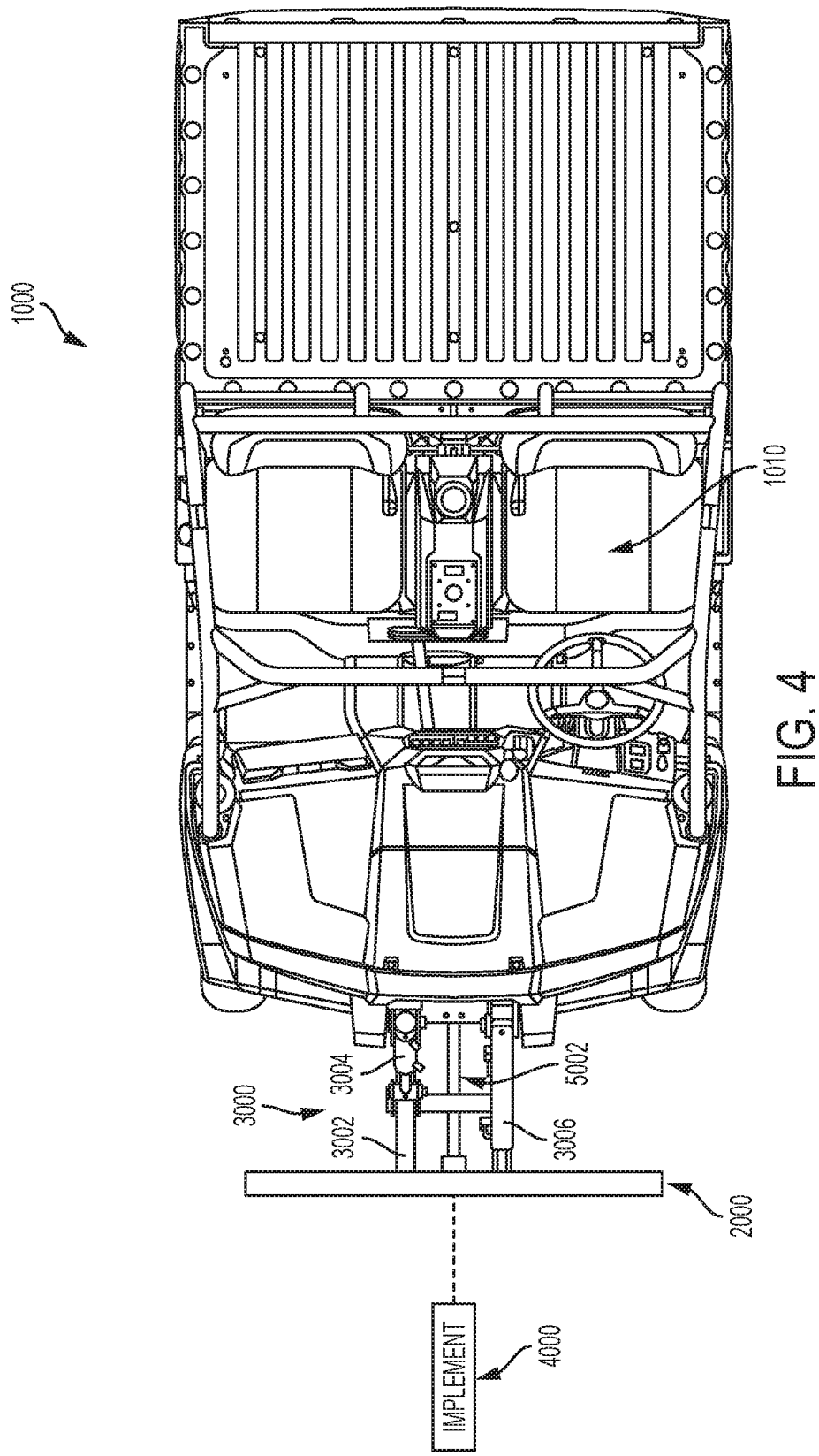
FIG. 4 is a top view of a utility vehicle, according to some embodiments.

For example, as illustrated in FIGS. 2, 4, and 5, the support system 3000 includes a frame member 3002 and a plurality of hydraulic components, such as hydraulic cylinders 3004 and 3006. In some embodiments, the frame member 3002 is coupled to the utility vehicle 1000 and to the implement support system 2000. In some embodiments, the frame member 3002 is rotatably coupled to the utility vehicle 1000 such that the frame member 3002 may pivot or otherwise rotate relative to the utility vehicle 1000. In some embodiments, the frame member 3002 is additionally or alternatively rotatably coupled to the implement support member 2000 such that the implement support member 2000 may pivot or otherwise rotate relative to the frame member 3000. As such, in various embodiments, the implement support member 2000 may pivot or otherwise rotate relative to utility vehicle 1000.

In some embodiments, as mentioned above, the support system 3000 includes one or more hydraulic cylinders. In some embodiments, a hydraulic cylinder 3004 is coupled to the utility vehicle and to the frame member 3002. In some such embodiments, the hydraulic cylinder 3004 is rotatably coupled to the utility vehicle 1000 such that the hydraulic cylinder 3004 may pivot or otherwise rotate relative to the utility vehicle 1000. In some embodiments, the hydraulic cylinder 3004 is rotatably coupled to the frame member 3002 such that the frame member 3002 may pivot or otherwise rotate relative to the hydraulic cylinder 3004. In some embodiments, hydraulic cylinder 3004 facilitates manipulation of the frame member 3002 relative to the utility vehicle 1000. Specifically, the hydraulic cylinder 3004 can be actuated to cause the frame member 3002 to rotate relative to the utility vehicle 1000 as will be appreciated by one of skill in the art.

In some embodiments, the support system 3000 includes one or more brackets situated between the frame member 3002 and the hydraulic components. That is, in some embodiments, one or more brackets are coupled to the utility vehicle 1000 and one or more of the various components of the support system 3000 are coupled to the utility vehicle 1000 via the one or more brackets. An exemplary bracket 3008 is illustrated in FIG. 2. In some embodiments, the support system 3000 includes one or more hydraulic lines, such as hydraulic line 3010 (FIG. 5) which operate to couple the hydraulic system of the utility vehicle 1000 to the hydraulic components of the implement interface system 2000.

As discussed above, in various embodiments, an implement interface system 2000 is coupled to the utility vehicle 1000 and facilitates manipulation and control of one or more implements 4000 coupled thereto from within the cab 1010 of the utility vehicle 1000. In some embodiments, the implement interface system 2000 is coupled to the utility vehicle via the support system 3000. That is, in some embodiments, the support system 3000 is coupled to the utility vehicle 1000 and the implement interface system 2000 is coupled to the support system 3000.

In some embodiments, as mentioned above, the implement support system 2000 can be pivoted or rotated relative to the support system 3000. In some such embodiments, one or more hydraulic components facilitate such pivoting or rotation. For example, referring now to FIGS. 2, 4, and 5, a hydraulic cylinder 3006 is coupled to the implement interface system 2000. In some embodiments, hydraulic cylinder 3006 is further coupled to the utility vehicle 1000. In some embodiments, hydraulic cylinder 3006 is coupled to the utility vehicle 1000 via one or more brackets or via the support system 3000. In various embodiments, the hydraulic cylinder 3006 can be actuated to cause the implement interface system 2000 to rotate relative to the support system 3000 as will be appreciated by one of skill in the art.

As discussed above, in various embodiments, an implement interface system 2000 enables the vehicle 1000 to interact with and control the one or more implements or attachments 4000. Referring now to FIGS. 6 to 10 an exemplary implement interface system 2000 is illustrated. In general, the implement interface system 2000 is configured to interface with a variety of different implements or attachments. Exemplary attachments and implements include a bucket, a mower, a pallet fork, a snow blade, and a whisker push broom, to identify some examples.

In some embodiments, the implement interface system 2000 includes a frame 2100. In some embodiments, the frame 2100 includes one or more structural support members, such as structural support members 2102 and 2104. In some embodiments, the implement interface system 2000 includes one or more actuation components. For example, as discussed in greater detail below, in some embodiments the implement interface system 2000 includes an actuator 2202 that operates to cause the implement 4000 to be coupled or otherwise secured to the implement interface system 2000. In various embodiments, the actuator 2202 also operates to cause the implement 4000 to be decoupled from the implement interface system 2000. In some embodiments, the actuator 2202 is a hydraulic actuator. In some other embodiments, the actuator 2202 is a pneumatic or electronic actuator.

In some embodiments, the implement interface system 2000 includes one or more hydraulic interface components, such as hydraulic interface component 2300. In some such embodiments, the one or more hydraulic interface components facilitate a hydraulic coupling between the utility vehicle 1000 and the implement 4000. In some embodiments, the implement interface system 2000 additionally or alternatively includes at least one component configured to interface with the PTO system 5000 of the utility vehicle 1000. For example, as illustrated, the implement interface system 2000 includes a PTO drive member 2400. In some such embodiments, the PTO system components of the implement interface system 2000 operate to transfer power from the utility vehicle 1000 to the implement 4000 coupled to the implement interface system 2000. Specifically, the PTO system components of the implement interface system 2000 are configured to receive power, such as rotational energy, from the driveshaft member 5002 of the PTO system 5000 and transfer that power to one or more components of the implement 4000 that are configured to receive power from the PTO system 5000 of the utility vehicle 1000. As discussed in greater detail below, unlike conventional designs, the novel arrangement and design disclosed herein enables a coupling of the PTO system 5000 of the utility vehicle 1000 to the implement 4000 without requiring an operator to exit an operator area of the utility vehicle 1000.

In some embodiments, the implement interface system includes a front portion 2002, a back portion 2004, a right side portion 2006, a left side portion 2008, a top portion 2010, and a bottom portion 2012. Generally, the front portion 2002 of the implement interface system 2000 is configured to interface with the implement 4000, while the back portion 2004 is configured to interface with the support system 3000.

Figure 7:
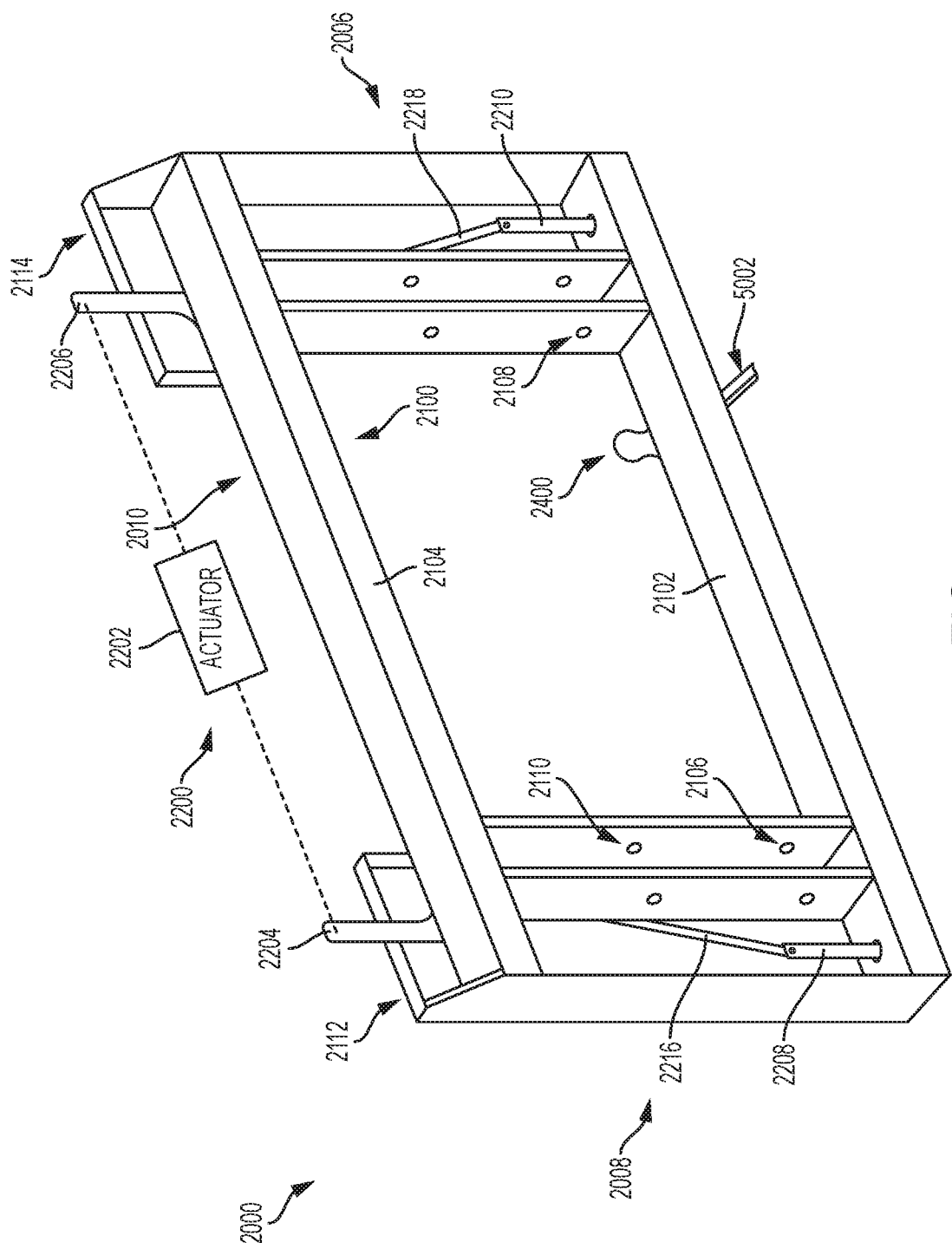
FIG. 7 is a back perspective view of an implement interface system, according to some embodiments.
Figure 10:
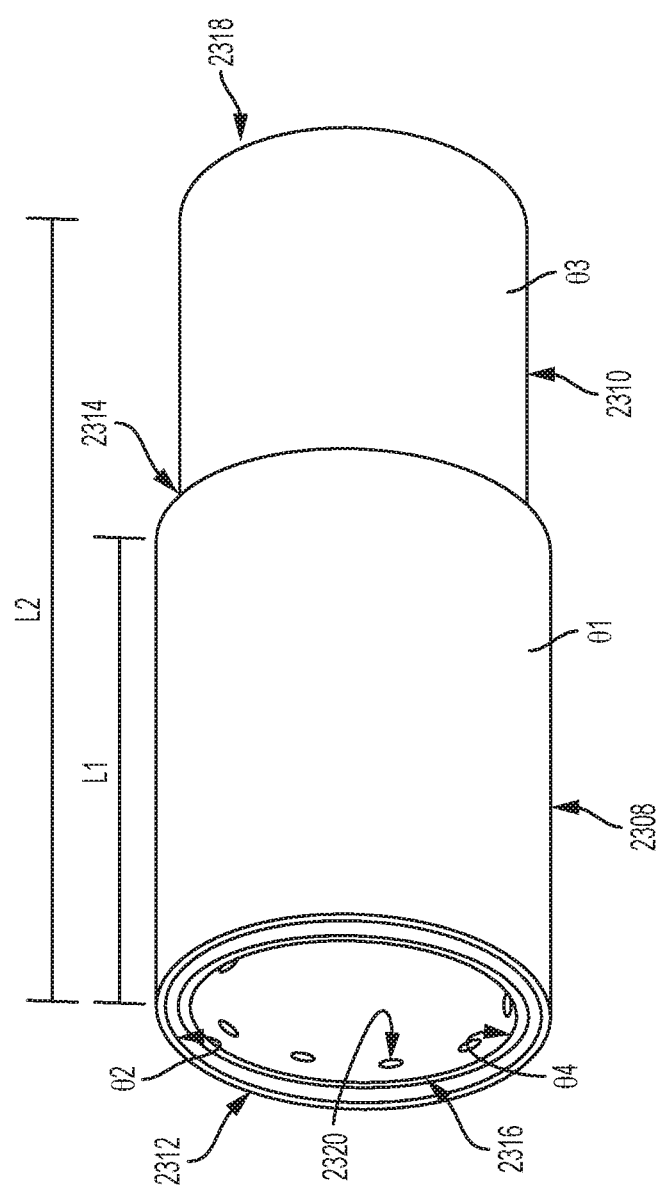
FIG. 10 is a perspective view of a hydraulic coupling, according to some embodiments.

Referring now to FIG. 7, a back perspective view of the implement interface system 2000 is illustrated. In some embodiments, in addition to the structural support members 2102 and 2104, the frame 2100 includes one or more support system retaining features 2106 and 2108. In some embodiments, the one or more support system retaining features 2106 and 2108 operate as an interface with the frame member 3002 of the support system 3000. Specifically, in some embodiments, the one or more support system retaining features 2106 and 2108 are oriented and configured to interface with the support system 3000 such that the implement interface system 2000 may be operably coupled to the support system 3000 as disclosed herein. Generally, as the support system 3000 is manipulated by the hydraulic cylinder 3004, the support system 3000 exerts force on the implement interface system 2000 via the one or more support system retaining features 2106 and 2108, which causes the implement interface system 2000 to move. In various embodiments, this interaction is responsible for raising and lowering the implement interface system 2000 relative to the utility vehicle 1000 as will be appreciated by those of skill in the art.

As discussed above, in various embodiments, the implement interface system 2000 is rotatably coupled to the support system 3000 such that the implement interface system 2000 can pivot or otherwise rotate relative to the support system 2000. In some embodiments, the frame 2100 includes one or more hydraulic component interface features 2110, which facilitate the coupling of one or more of the hydraulic components, such as hydraulic cylinder 3006, to the implement interface system 2000. In various embodiments, hydraulic cylinder 3006 operates to cause the implement interface system 2000 to rotate or pivot about the support system 3000. Generally, this rotation or pivot capability is facilitated by offsetting the one or more hydraulic component interface features 2110 from the one or more support system retaining features 2106 and 2108 such that a force directed to the implement interface system 2000 by the hydraulic cylinder 3006 can create a moment that causes the implement interface system 2000 to rotate about the support system 3000 (and thus rotate relative to the utility vehicle 1000).

It will be appreciated that a variety of mechanisms may be utilized in accordance with the support system retaining features 2016 and 2018 and the hydraulic component interface features 2020 to couple the frame member 3002 and the hydraulic components of the support system 3000 to the frame 2100 of the implement interface system 2000. In some embodiments, one or more pins, nuts, bolts, shanks, clips, and/or other fastening mechanism or components, for example, may be utilized without departing from the spirit or scope of the disclosure.

As mentioned above, in some embodiments, the implement interface system 2000 is securable to the implement 4000. In various embodiments, the frame 2100 of implement interface system 2000 includes one or more implement retention features, such as implement retention features 2112 and 2114. In some embodiments, the implement retention features 2112 and 2114 are positioned along the top portion 2010 of the implement interface system 2000. As discussed in greater detail below, implement retention features 2112 and 2114 are configured to engage one or more portions of the implements 4000.

In some embodiments, in addition to the implement retention features 2112 and 2114, the implement interface system 2000 includes an actuation system that operates to secure the one or more implements 4000 to the implement interface system 2000. For example, as illustrated in FIGS. 6 to 9, the implement interface system 2000 includes actuation system 2200. Referring now specifically to FIG. 8, an exemplary actuation system 2200 is illustrated with the remaining components of the implement interface system removed. Generally, the actuation system 2200 includes one or more actuators 2202, one or more actuation members, such as actuation members 2204 and 2206, and one or more engagement pins, such as engagement pins 2208 and 2210. In some embodiments, the one or more actuation members 2204 and 2206 are configured to rotate about pivots 2212 and 2214. In some embodiments, the one or more engagement pins 2208 and 2210 are configured to translate along their longitudinal length. In some embodiments, rotation of the one or more actuation members 2204 and 2206 causes the engagement pins 2208 and 2210 to translate along their longitudinal length.

In some embodiments, the actuation system additionally includes one or more linkages situated between the actuation members 2204 and 2206 and the engagement pins 2208 and 2210. For example, as illustrated in FIG. 8, linkage 2216 is situated between and coupled to each of actuation member 2204 and engagement pin 2208. Similarly, linkage 2218 is situated between and coupled to each of actuation member 2206 and engagement pin 2210. In various embodiments, the linkages are configured to rotate relative to the actuation members and engagement pins to which they are coupled. In these embodiments, the linkages are configured to transfer the rotational motion of the actuation members into the translational motion of the engagement pins. An exemplary illustration of the motion of the actuation system 2200 is evidenced in comparing FIG. 8 to FIG. 9. As shown, rotating the actuation members from a first rotational position to a second rotational position causes the engagement pins to translate from a first longitudinal position to a second longitudinal position. In some embodiments, when the engagement pins are positioned in the first longitudinal position, the implement interface system 2000 is disengaged from the implement 4000, while when the engagement pins are positioned in the second longitudinal position, the implement interface system 2000 is engaged with the implement 4000. Generally, when the implement interface system 2000 is engaged with the implement 4000, the implement 4000 is operably coupled to the utility vehicle 1000 such that the various components of the implement 4000 are controllable by an operator situated within the cab 1010 of the utility vehicle 1000. Specifically, upon the engagement pins being transitioned to the second longitudinal position (e.g., an engaged position), the hydraulic components of the implement 4000 are hydraulically coupled to the hydraulic system of the utility vehicle 1000 and the components of the implement configured to be powered by the utility vehicle's PTO system 5000 are operably coupled to the utility vehicle's PTO system 5000.

In various embodiments, the one or more actuators 2202 operate to manipulate actuation members 2204 and 2206 to cause engagement pins 2208 and 2210 to engage the implement 4000 to secure the implement 4000 to the implement interface system 2000. In various embodiments, the one more actuators 2202 are operably coupled to the utility vehicle such that the one or more actuators 2202 may be controlled by an operator situated within the cab 1010 of the utility vehicle 1000. For example, one or more actuation switches, such as one or more electronic actuation switches, may be located within the cab 1010 of the utility vehicle 1000 and an operator seated within the cab 1010 may activate the one or more actuation switches to cause the actuation system to operate to secure the implement 4000 to the implement interface system 2000 (or alternatively to operate to cause the implement interface system 2000 to disengage from the implement 4000), as will be discussed in greater detail below.

Figure 6:
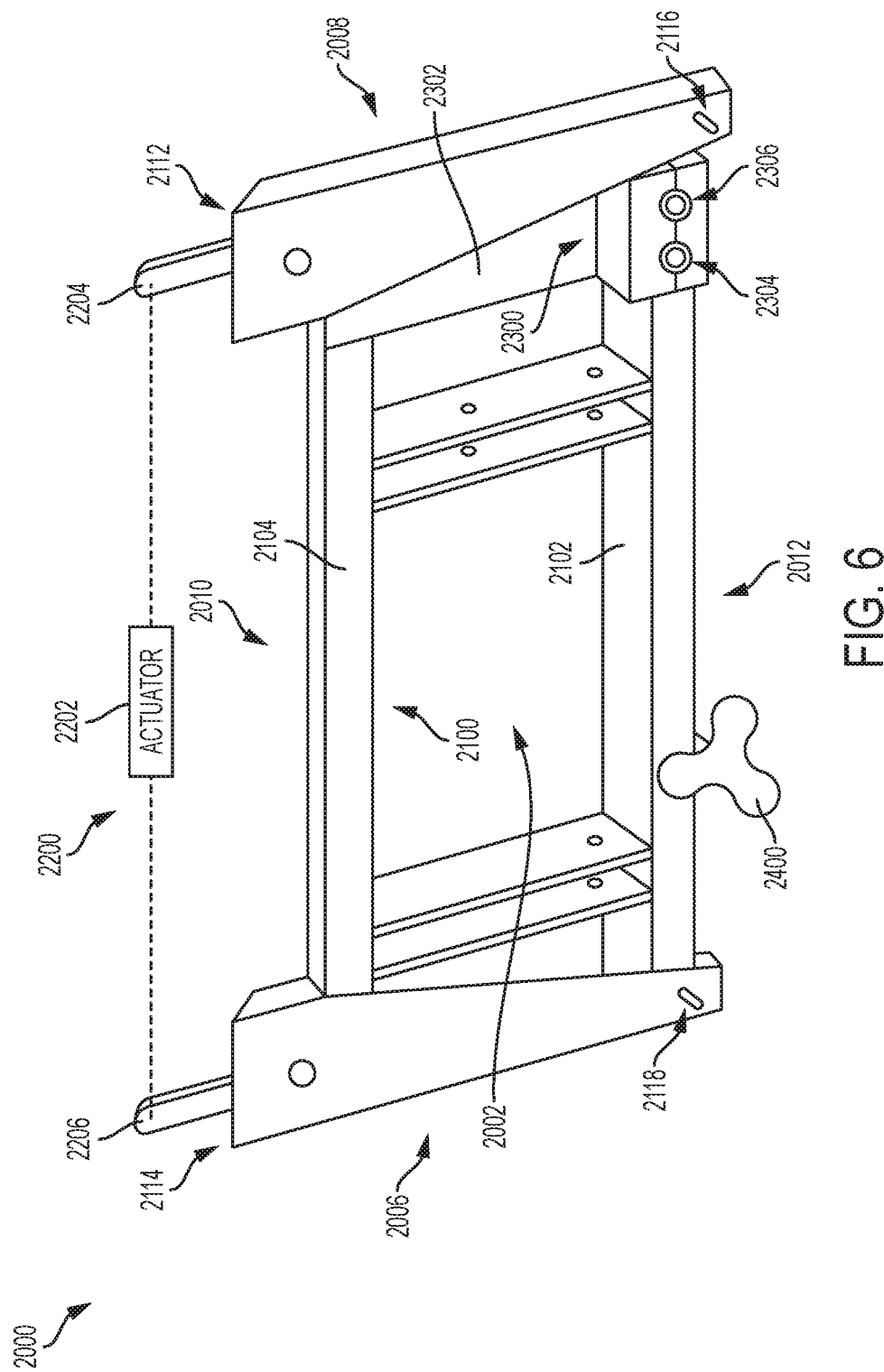
FIG. 6 is a front perspective view of an implement interface system, according to some embodiments.
Figure 11:
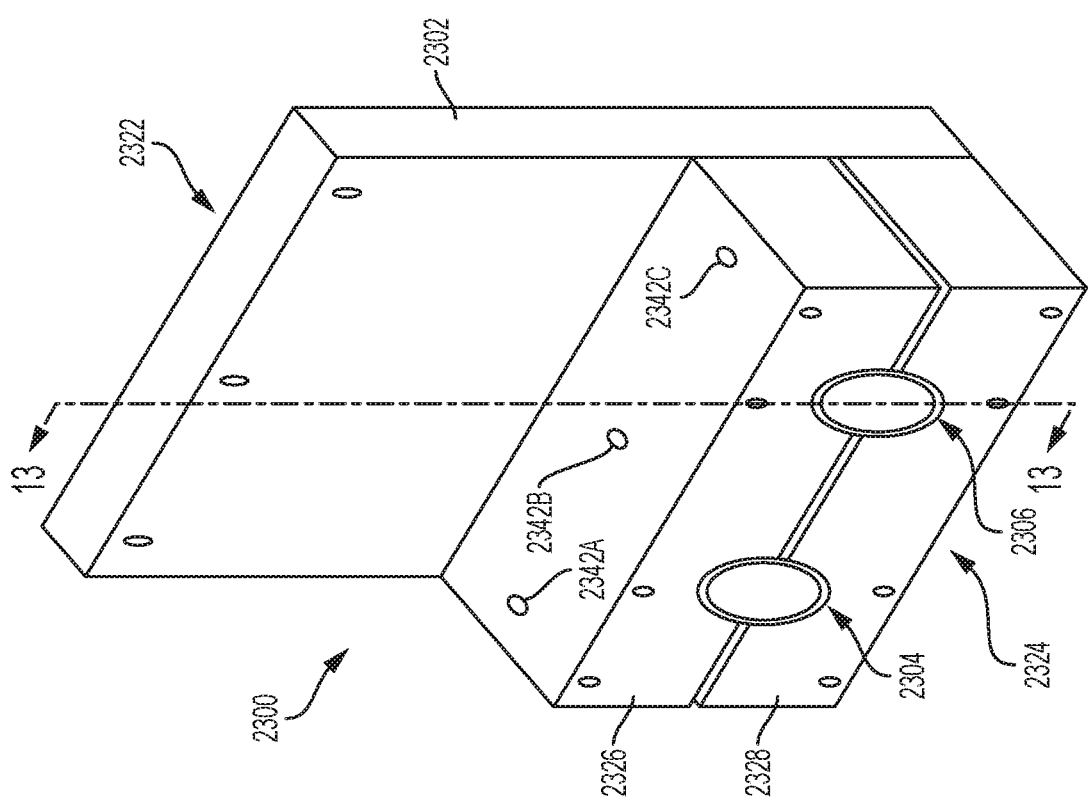
FIG. 11 is a perspective view of a hydraulic interface component, according to some embodiments.

As discussed above, in various embodiments the implement interface system 2000 includes one or more hydraulic interface components, such as hydraulic interface component 2300. As mentioned above, in some such embodiments, the one or more hydraulic interface components facilitate a hydraulic coupling between the utility vehicle 1000 and the implement 4000. In some embodiments, and as shown in FIG. 11, the hydraulic interface component 2300 includes a body 2302. In some embodiments, the body 2302 is coupled to the frame 2100 of the implement interface system 2000. For example, as illustrated in FIG. 6, the body 2302 of the hydraulic interface component 2300 is coupled to the frame 2100 on the left side portion 2008 of the implement interface system 2000. In some embodiments, the hydraulic interface component 2300 includes one or more hydraulic couplings, such as hydraulic couplings 2304 and 2306. As will be discussed in greater detail below, hydraulic couplings 2304 and 2306 are configured to interface with the hydraulic couplings of the implement 4000, such that the hydraulic components of the implement 4000 are hydraulically coupled to the utility vehicle 1000.

In some embodiments, the hydraulic couplings 2304 and 2306 are quick connect-disconnect hydraulic couplings as will be understood by those of skill in the art. With specific reference to FIG. 10, the hydraulic couplings 2304 and 2306 each generally include an outer sleeve 2308 and an inner sleeve 2310. As illustrated, the outer sleeve 2308 includes a first end 2312, a second end 2314, and a lumen extending therethrough from the first end 2312 to the second end 2314. In some embodiments, the outer sleeve has an outside diameter Ø1 (theta1), inside diameter Ø2 (theta2), and a longitudinal length L1. Likewise, as illustrated, the inner sleeve 2310 includes a first end 2316, a second end 2318, and a lumen extending therethrough from the first end 2316 to the second end 2318. In some embodiments, the inner sleeve 2310 has an outside diameter Ø3 (theta3), and inside diameter Ø4 (theta4), and a longitudinal length L2.

In various embodiments, the outside diameter Ø3 (theta3) of the inner sleeve 2310 is smaller than the inside diameter Ø2 (theta2) of the outer sleeve 2308 such that the inner sleeve 2310 may be disposed within an interior region of the lumen of the outer sleeve 2308. In some such embodiments, the outer and inner sleeves 2308 and 2310 are concentric in that they share a common longitudinal axis. In some embodiments, the outer and inner sleeves 2308 and 2310 are slideable relative to one another. That is, in some embodiments, the outer sleeve 2308 can translate along its longitudinal axis relative to the inner sleeve 2310. Likewise, in some embodiments, the inner sleeve 2310 can slide along its longitudinal axis relative to the outer sleeve 2308.

In some embodiments, each hydraulic coupling 2304 and 2306 includes one or more retractable detents 2320. In some embodiments, the one or more retractable detents 2320 operate to releasably retain the hydraulic fittings of the implement 4000 within the hydraulic couplings 2304 and 2306. While certain quick connect-disconnect hydraulic couplings are generally known, the novelty of the hydraulic couplings disclosed herein, such as hydraulic couplings 2304 and 2306, is in their construction, securement, and method of operating with the components of the various systems described herein, as discussed below.

Figure 13:
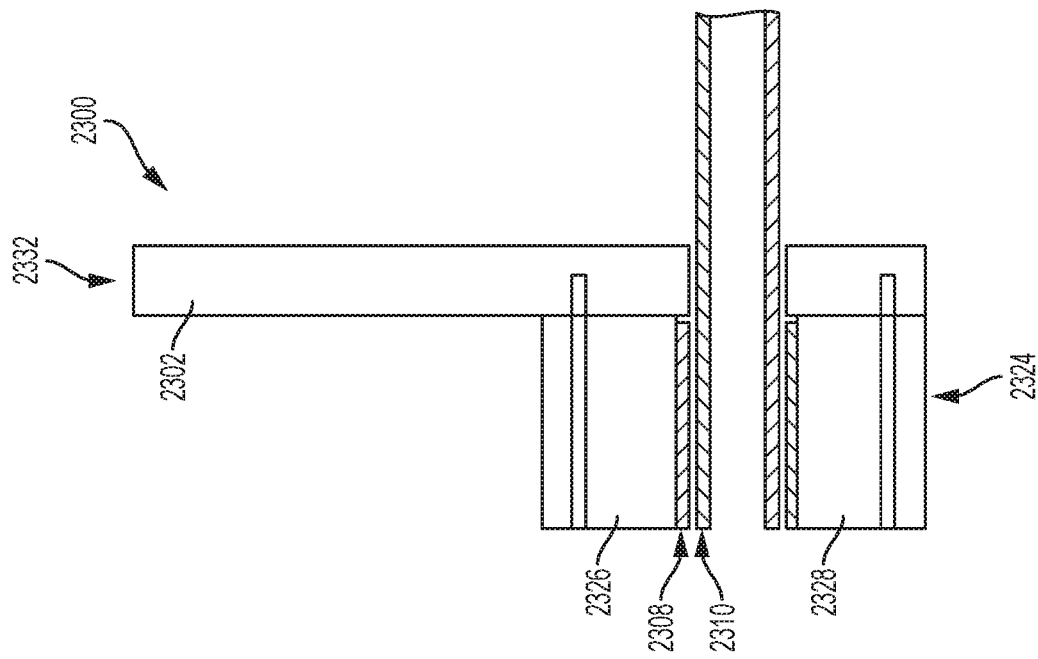
FIG. 13 is a cross sectional view of the hydraulic interface component of FIG. 11 taken along line 13-13, according to some embodiments.
Figure 12:
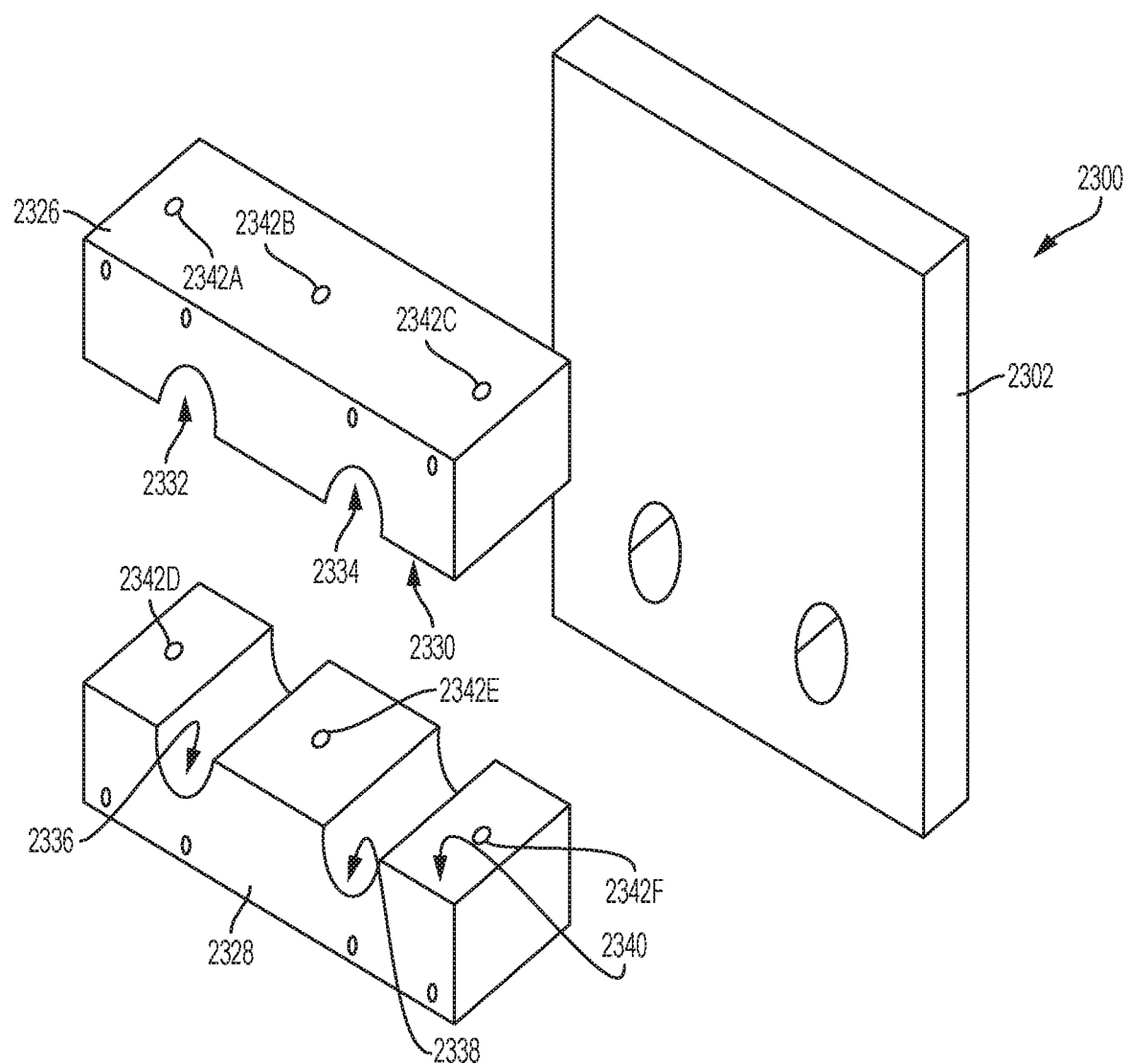
FIG. 12 is an exploded view of the hydraulic interface component of FIG. 11, according to some embodiments.

Turning now to FIGS. 11 to 13, in some embodiments, the hydraulic interface component 2300 has an upper portion 2322 and a lower portion 2324, and includes one or more coupling interface plates, such as a first or upper coupling interface plate 2326 and a second or lower coupling interface plate 2328. In some embodiments, the coupling interface plates are situated at or proximate to the lower portion 2324 of the hydraulic interface component 2300.

FIG. 12 is an exploded view of FIG. 11, with the hydraulic couplings 2304 and 2306 removed for clarity. In some embodiments, the upper and lower coupling interface plates 2326 and 2328 are separable from one another such that the hydraulic couplings 2304 and 2306 can be sandwiched therebetween. In some embodiments, the coupling interface plates 2326 and 2328 include one or more apertures, such as apertures 2342A-2342F that facilitate coupling together of coupling interface plates 2326 and 2328. In some embodiments, one or more of the apertures 2342A-2342F may be a threaded aperture.

In some embodiments, the upper and lower coupling interface plates 2326 and 2328 can be coupled together via one or more fasteners, such as one or more screws, bolts, nuts, studs, pins, or rods, or one or more welds. In some embodiments, the upper and lower coupling interface plates 2326 and 2328 are also coupleable to the frame 2100 of the implement interface system 2000 via one or more fasteners, such as one or more screws, bolts, nuts, studs, pins, or rods, or one or more welds, for example. In some embodiments, the upper and lower coupling interface plates 2326 and 2328 are coupled to body 2302 of the hydraulic interface component 2300, and the frame 2302 is coupled to the frame 2100 of the implement interface system 2000 via one or more fasteners, such as one or more screws, bolts, nuts, studs, pins, or rods, or one or more welds, for example.

In some embodiments, each of the coupling interface plates includes one or more coupling retaining features that are configured to interface with the hydraulic couplings 2304 and 2306. For example, in some embodiments, the upper coupling interface plate 2326 includes coupling retaining features 2332 and 2334 in a bottom surface 2330 thereof. As illustrated, coupling retaining features 2332 and 2334 are reliefs or channels formed in the bottom surface 2330 of the upper coupling interface plate 2326. In some embodiments, these reliefs or channels are shaped in a manner that corresponds to a shape of the hydraulic couplings. For example, coupling retaining features 2332 and 2334 are cylindrically shaped such that a portion of hydraulic couplings 2304 and 2306 can be received thereby. In some embodiments, the lower interface plate 2328 includes coupling retaining features 2336 and 2338 in a top surface 2340 thereof. As illustrated, coupling retaining features 2336 and 2338 are cylindrical reliefs or channels similar to the coupling retaining features 2332 and 2334.

In some embodiments, the coupling retaining features of the coupling interface plates interact with the outer sleeves 2308 of the hydraulic couplings 2304 and 2306 such that the outer and inner sleeves 2308 and 2310 can be translated relative to one another. In various embodiments, as outlined below, this translation is the mechanism through which the couplings 2304 and 2306 hydraulically couple the utility vehicle 1000 to the implement 4000.

In some embodiments, the coupling retaining features of the coupling interface plates receive a portion of the hydraulic couplings 2304 and 2306 therein such that the first and second ends 2312 and 2314 of the outer sleeve 2308 are obstructed from translating along the longitudinal axis of the outer sleeve 2308 relative to the coupling interface plates 2326 and 2328. In some embodiments, the hydraulic couplings 2304 and 2306 are alternatively or additionally frictionally retained by the coupling interface plates 2326 and 2328. For example, in some embodiments, when the coupling interface plates 2326 and 2328 are coupled together, coupling retaining features 2332 and 2336, together, form a first aperture through the coupling interface plates 2326 and 2328. Likewise in some embodiments, when the coupling interface plates 2326 and 2328 are coupled together, coupling retaining features 2334 and 2338, together, form a second aperture through the coupling interface plates 2326 and 2328. In this example, the first aperture forms an interference fit with the outer sleeve 2308 of the hydraulic coupling 2304, and the second aperture forms an interference fit with the outer sleeve 2308 of the hydraulic coupling 2306. In some embodiments this interference may be the result of a dissimilar cross-sectional geometry, diameter, shape, width, height, eccentricity, or other geometric feature between the coupling retaining features 2332, 2334, 2336, and 2338 and the outer sleeve 2308.

In some embodiments, an interference fit between the outer sleeves 2308 of the hydraulic couplings 2304 and 2306 and the coupling interface plates 2326 and 2328 results in the outer sleeves 2308 of the hydraulic couplings 2304 and 2306 being constrained against translational (or alternatively translational and rotational) motion relative to the coupling interface plates 2326 and 2328. As such, the inner sleeve 2310 can be axially translated relative to the outer sleeve 2308 to facilitate a hands-free hydraulic coupling between the utility vehicle 1000 to the implement 4000. That is, while conventional designs require the operator to exit the cab of the vehicle to manually couple the hydraulics of an implement to the hydraulics of the vehicle, as discussed in greater detail below, the above discussed configuration enables an operator seated inside the cab 1010 of the utility vehicle 1000 the ability to hydraulically couple the utility vehicle 1000 to the implement 4000 without ever leaving the safety and comfort of the cab 1010.

As discussed above, in various embodiments, the implement interface system 2000 includes at least one PTO system component, such as PTO drive member 2400. In some such embodiments, the one or more PTO system components operate to transfer power from the utility vehicle 1000 to the implement 4000 coupled to the implement interface system 2000. For example, in some embodiments, the PTO drive member 2400 is rotationally driven by a drive shaft and thereby rotates about the drive shaft to deliver rotational drive energy to an implement that is coupled to the implement interface system 2000 that is configured to receive such rotational drive energy. In some embodiments, an implement that is configured to receive such rotation drive energy utilizes the rotational drive energy to power one or more components of the implement 4000 as discussed in greater detail below. Like the hydraulic and other systems discussed herein, the PTO system 5000 can be coupled to the implement while the operator of the utility vehicle 1000 remains seated within the safety and comfort of the cab 1010. That is, an operator of the utility vehicle 1000 can couple the implement 4000 to the utility vehicle 1000 such that the PTO system 5000 is operably coupled to the implement 4000 without ever exiting the cab 1010 of the utility vehicle 1000.

Referring back now to FIG. 6, the implement interface system 2000 includes a PTO drive member 2400. As illustrated, the PTO drive member 2400 is positioned along the bottom portion 2012 of the implement interface system 2000. In some embodiments, the PTO drive member 2400 is operably coupled to the frame 2100 of the implement interface system 2000. For example, referring now to FIG. 14, a bottom view of the implement interface system 2000 is illustrated. In some embodiments, the PTO drive member 2400 is coupled to a drive shaft 2402 such that the PTO drive member 2400 rotates with the drive shaft 2402.

In some embodiments, as mentioned above, the PTO drive member 2400 is operably coupled to the frame 2100 of the implement interface system 2000. In some such embodiments, and with reference to FIG. 14, the drive shaft 2402 is supported by one or more drive shaft support housings 2404. In some embodiments, the drive shaft 2402 passes through the drive shaft support housing 2404. For example, in some embodiments, the drive shaft support housing 2402 includes one or more bearings through which the drive shaft passes. In some embodiments, these one or more bearing operably couple the drive shaft 2402 to the drive shaft housing 2404.

Figure 14:
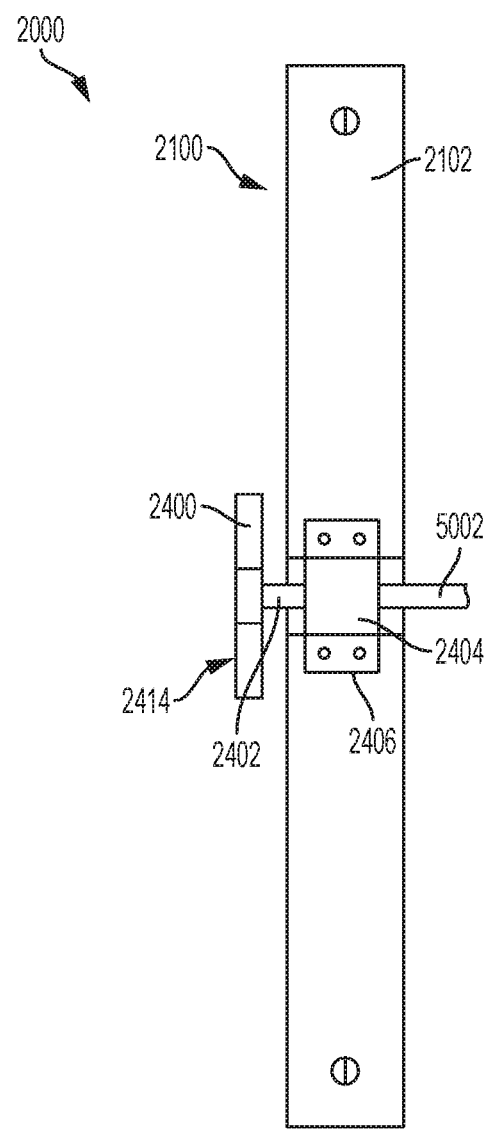
FIG. 14 is a bottom view of an implement interface system, according to some embodiments.

In some embodiments, the PTO drive member 2400 is coupled such that it offset to a position forward to the frame 2100 of the implement interface system 2000. For example, as illustrated in FIG. 14 the PTO drive member 2400 is situated at a position forward of the frame 2100. In some embodiments, the PTO drive member 2400 is positioned such that as the implement interface system 2000 engages the implement 4000, the PTO drive member 2400 is operable to interface with one or more components of the implement 4000 such that the PTO drive member 2400 can transfer power to the implement 4000. In some such embodiments, the PTO drive member 2400 projects toward the implement 4000 such that it interferes with a PTO receiving member of the implement as discussed in greater detail below.

In some embodiments, the drive shaft support housing 2404 is coupled to the frame 2100 of the implement interface system 2000. For example, as illustrated, the drive shaft support housing is coupled to structural support member 2102 of the frame 2100. In some embodiments, the drive shaft support housing 2404 is coupled to the frame 2100 via one or more mounting brackets 2406.

In some examples, the drive shaft support housing 2404 additionally operates as a coupling feature between the PTO system 5000 and the PTO drive member 2400. For example, as illustrated the drive shaft member 5002 is coupled to the drive shaft support housing 2404 from the back portion 2004 (FIG. 7) of the implement interface system 2000, which the drive shaft 2402 is coupled to the drive shaft support member 2404 on the front portion 2002 of the implement interface system 2000.

In some embodiments, the drive shaft member 5002 of the PTO system is removably coupled to the drive shaft support housing 2404. In some embodiments, the drive shaft 2402 is removably coupled to the drive shaft support housing 2404. In some embodiments, one or more of the drive shaft 2404 and the drive shaft member 5002 include a splined interface feature that rotatably couples the drive shaft 2404 and the drive shaft member 5002 to the drive shaft support housing 2404 and/or to one another. That is, in some embodiments, the drive shaft 2404 is directly coupled to the drive shaft member 5002 of the PTO system 5000. It will be appreciated that any suitable method for rotatably coupling the PTO drive member 2400 to the PTO system 5000 may be utilized without departing from the spirit or scope of the disclosure provided the PTO system 5000 is operable to transfer energy to the PTO drive member 2400 for powering an implement 4000 coupled to the implement interface system 2000.

Figure 15:
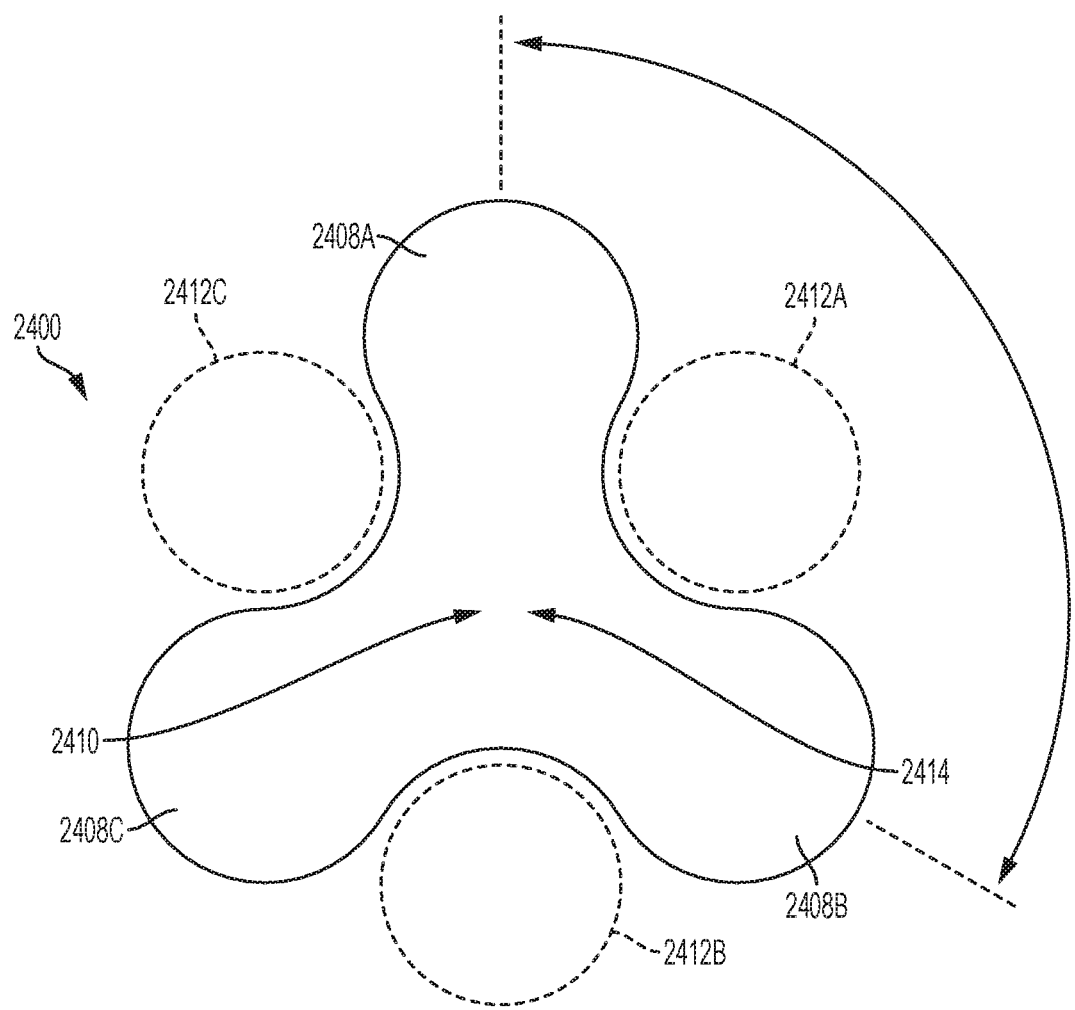
FIG. 15 is a front view of a PTO driving member, according to some embodiments.

Referring now to FIG. 15, a front view of the PTO drive member 2400 is illustrated. In various embodiments, the PTO drive member 2400 includes a plurality of drive lobes, such as drive lobes 2408A, 2408B, and 2408C. In some embodiments, each of the drive lobes emanates from a hub or central region 2410 of the PTO drive member 2400. In some embodiments, each of the lobes is coupled to the hub. That is, the lobes and the hub are formed separately and then subsequently coupled together. In some embodiments, the lobes and the hub are irremovably coupled together. In some other embodiments, the lobes are removably coupled to the hub. In some embodiments, the lobes may be coupled to the hub via one or more fasteners such as one or more screws, bolts, nuts, studs, pins, or rods, or one or more welds, for example. Although the illustrated embodiments depict the PTO drive member 2400 as including three (3) drive lobes, it will be appreciated that the PTO drive member 2400 may have two (2) drive lobes or more than three (3) drive lobes. For example, in some embodiments, the PTO drive member includes five (5) drive lobes.

In some embodiments, the lobes and the hub are formed of a single monolithic unit. For instance, the lobes are not coupled to the hub, but instead are continuous to the hub and emanate from the hub. In some such embodiments, the PTO drive member is machined from a block of material. In other such embodiments, the PTO drive member is cast.

In various embodiments, the PTO drive member 2400 is made of a metallic material, such as steel or aluminum. In some embodiments, the PTO drive member 2400 is made of a plastic, such as a high density plastic. In some embodiments, the PTO drive member 2400 is forged. In some embodiments, the PTO drive member 2400 is cast. In some embodiments, the PTO drive member 2400 is machined from a billet or block.

Referring again to FIG. 15, is some embodiments, the lobes 2408A-2408C are equally radially disbursed about the hub 2410. For instance, in the illustrated example of FIG. 15, lobe 2408A is offset from each of lobes 2408B and 2408C by approximately one-hundred-twenty (120) degrees. Likewise, lobes 2408B and 2408C are radially offset from one another by approximately one-hundred-twenty (120) degrees. In various embodiments, the hub and lobe configuration of the PTO drive member 2400 results in a plurality of voids between each of the lobes, such as voids 2412A, 2412B, and 2412C. As will be explained in greater detail below, these voids are configured to accommodate one or more reaction members of the implement 4000 such that the PTO drive member 2400 is operable to transfer power to the implement 4000.

As mentioned above, in some such embodiments, the PTO drive member 2400 is coupled to the drive shaft 2402. In some embodiments, the PTO drive member 2400 may be coupled to the drive shaft 2402 via one or more fasteners such as one or more screws, bolts, nuts, studs, pins, or rods, or one or more welds, for example. It will be appreciated, however, that in various embodiments, the PTO drive member 2400 and the drive shaft 2402 may be formed of a single monolithic unit. That is, in some embodiments, the drive shaft 2402 is not coupled to the PTO drive member 2400, but is instead a continuation of the PTO drive member 2400.

Figure 16:
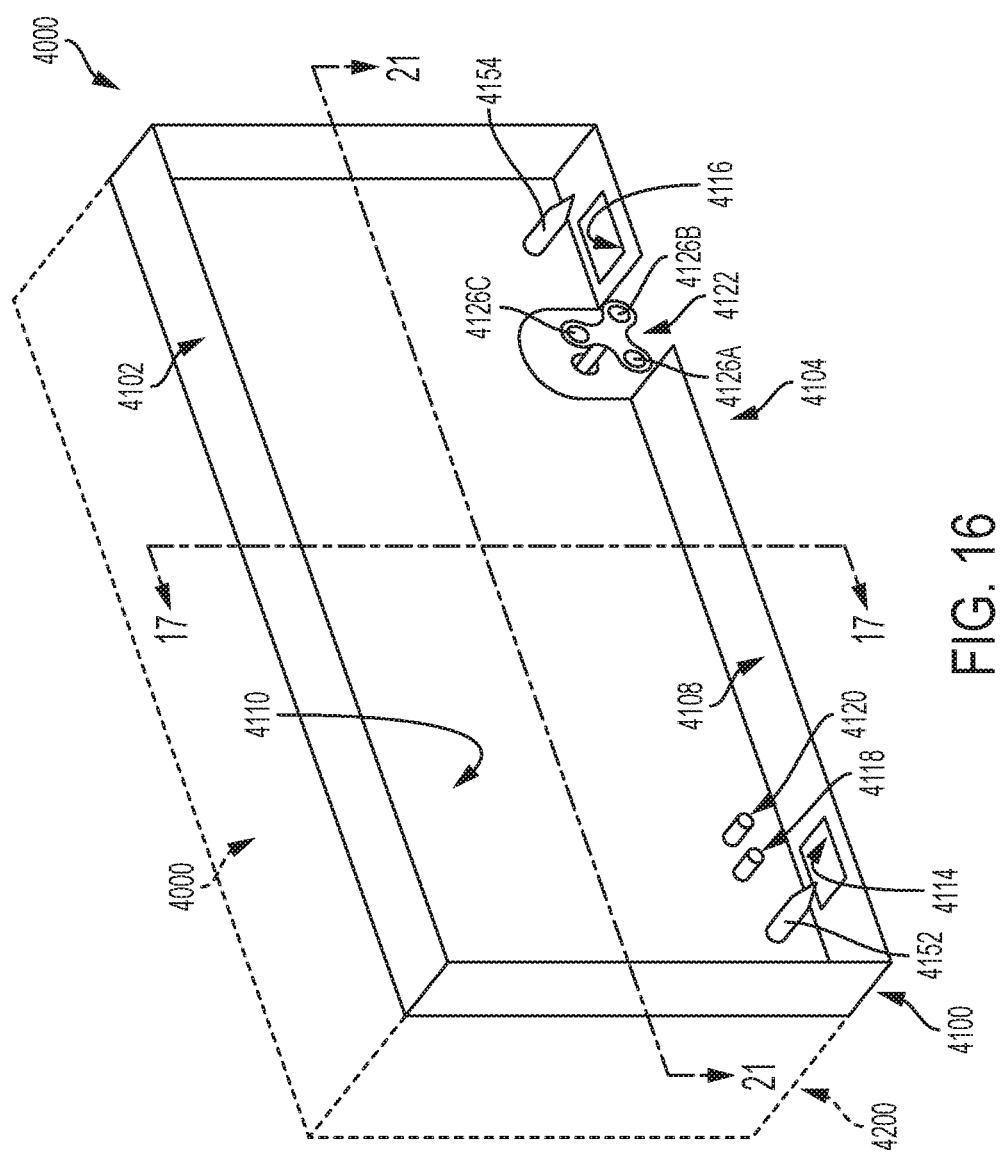
FIG. 16 is a front perspective view of an implement, according to some embodiments.

In various embodiments, one or more implements are coupleable to the utility vehicle 1000. Turning now to FIG. 16, a back perspective view of the receiving unit portion 4100 of an implement 4000 is illustrated. In various embodiments, an implement 4000 is comprised of the receiving unit portion 4100 and an implement operating unit portion 4200. For the purposes of this disclosure, the operating unit portion 4200 of the implement 4000 includes the various components of the implement not disclosed as being part of the receiving unit portion 4100 of the implement 4000, as will be appreciated by those of skill in the art.

Figure 17:
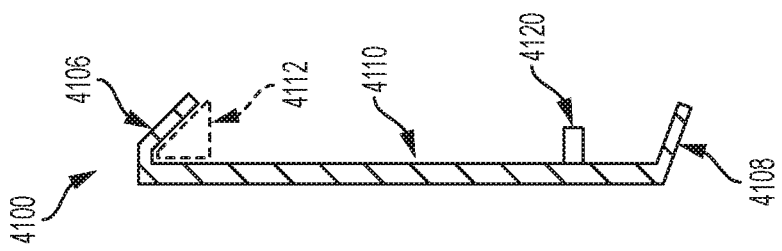
FIG. 17 is a cross sectional view of the implement illustrated in FIG. 16 taken along line 17-17, according to some embodiments.

In various embodiments, the receiving unit portion 4100 of the implement 4000 includes a top portion 4102, a bottom portion 4104, a top flange 4106, a bottom flange 4108, and a back portion 4110. In some embodiments, the top flange 4106 is configured to interface with the implement retention features 2112 and 2114 of the implement interface system 2000. For example, with reference to FIG. 17, in some embodiments, the top flange 4106 is angled relative to the back portion 4110 such that a pocket 4112 is formed between the top flange 4106 and the back portion 4112. In some embodiments, this pocket 4112 is configured to receive a portion of the implement retention features 2112 and 2114 therein, as will be understood by those of skill in the art.

Referring back now to FIG. 16, in various embodiments, the receiving unit portion 4100 of the implement 4000 further includes one or more engagement features, such as engagement features 4114 and 4116. In some embodiments, the engagement features 4114 and 4116 are configured to interact with the engagement pins 2208 and 2210 of the implement interface system 2000. In some embodiments, the engagement features 4114 and 4116 are configured to interact with the engagement pins 2208 and 2210 of the implement interface system 2000 to prevent disengagement of the implement from the implement interface system 2000. For example, in some embodiments, the engagement features 4114 and 4116 are reliefs or apertures formed in the receiving unit portion 4100 of the implement that are configured to receive the engagement pins 2208 and 2210 therein. In one such embodiment, the engagement features 4114 and 4116 are apertures formed in the bottom flange 4108 of the receiving unit portion 4100. As will be discussed in greater detail below, as the engagement pins 2208 and 2210 interact with the engagement features 4114 and 4116 of the receiving unit portion 4100 of the implement 4000, the implement 4000 becomes operably coupled to the utility vehicle 1000.

In various embodiments, the receiving unit portion 4100 of the implement 4000 includes one or more hydraulic interface components, such as hydraulic interface components 4118 and 4120. In some embodiments, the hydraulic interface components 4118 and 4120 are configured to interface with the hydraulic couplings 2304 and 2306 of the implement interface system 2000 to hydraulically couple the hydraulic systems of the implement 4000 to the utility vehicle 1000. In various embodiments, the hydraulic interface components 4118 and 4120 project from the back portion 4110 of the receiving unit portion 4100. In some embodiments, the hydraulic interface components 4118 and 4120 are perpendicular to the back portion 4110 of the receiving unit portion 4100. In some embodiments, the hydraulic interface components 4118 and 4120 are angled slightly relative to the normal of the back portion 4110. For example, hydraulic interface components 4118 and 4120 may be angled ten (10) degrees or less relative to normal.

In some embodiments, the angle at which the hydraulic interface components 4118 and 4120 project relative to the back portion 4110 of the receiving unit portion 4100 may vary as the implement is coupled to the utility vehicle 1000. Likewise, in some embodiments, the degree (or amount) to which the hydraulic interface components 4118 and 4120 project relative to the back portion 4110 may additionally or alternatively vary as the implement is coupled to the utility vehicle 1000. That is, in some embodiments, the hydraulic interface components 4118 and 4120 may be coupled to the implement 4000 such that the angle at which and/or the degree to which the hydraulic interface components 4118 and 4120 project relative to the back portion 4110 of the receiving unit portion 4100 may vary. In some embodiments, the hydraulic interface components 4118 and 4120 may be coupled to the implement 4000 via one or more resilient components such that the angle at which the hydraulic interface components 4118 and 4120 project relative to the back portion 4110 of the receiving unit portion 4100 may vary as needed during attachment of the implement 4000 to the utility vehicle 1000. Likewise, in some embodiments, the hydraulic interface components 4118 and 4120 may be coupled to the implement 4000 via one or more resilient components such that the hydraulic interface components 4118 and 4120 may translate to some degree as needed during attachment of the implement 4000 to the utility vehicle 1000.

In some embodiments, the hydraulic interface components 4118 and 4120 may be coupled to the implement 4000 such that the hydraulic interface components 4118 and 4120 are constrained against further movement upon the hydraulic interface components 4118 and 4120 translating, rotating, and/or pitching a designated degree relative to the back portion 4110 of the receiving unit portion 4100 of the implement 4000. In some such embodiments, the hydraulic interface components 4118 and 4120 may have a degree of play that enables them to translate, rotate, and/or pitch relative to the back portion 4110 of the receiving unit portion 4100 of the implement 4000.

In some other embodiments, the hydraulic system of the implement 4000 may be coupled to the hydraulic interface component 2300 of the implement interface system 2000 by way of one or more actuators. For instance, in some embodiments, the hydraulic interface component 2300 and/or one or more of the hydraulic couplings 2304 and 2306 of the implement interface system 2000 is moveable relative to the frame 2100 of the implement interface system 2000 such that the one or more hydraulic couplings 2304 and 2306 can be coupled to the hydraulic system of the implement 4000 after the implement 4000 is secured to the implement interface system 2000. In some such embodiments, after the implement 4000 is secured to the implement interface system 2000 (e.g., by way of engagement) the hydraulic interface component 2300 and/or one or more of the hydraulic couplings 2304 and 2306 of the implement interface system 2000 may be actuated such that they engage the hydraulic interface components of the implement 4000, such as hydraulic interface components 4118 and 4120. In one embodiment, after the implement 4000 is secured to the implement interface system 2000 the hydraulic interface component 2300 and/or one or more of the hydraulic couplings 2304 and 2306 of the implement interface system 2000 may be translated relative to the hydraulic interface components 4118 and 4120 such that the hydraulic system of the vehicle 1000 is hydraulically coupled to the hydraulic system of the implement 4000.

That is, while the hydraulic systems of the vehicle 1000 and implement 4000 are automatically hydraulically coupled contemporaneously with the securement of the implement 4000 to the implement interface system 2000, in some other embodiments, the hydraulic systems of the vehicle 1000 and implement 4000 are hydraulically coupled by way of a separate actuation system. It will be appreciated that such a separate actuation system may be implemented such that the hydraulic systems of the vehicle 1000 and implement 4000 are hydraulically coupled contemporaneously with the securement of the implement 4000 to the implement interface system 2000. Alternatively, the separate actuation system may be implemented such that the hydraulic systems of the vehicle 1000 and implement 4000 are hydraulically coupled subsequent to the securement of the implement 4000 to the implement interface system 2000. In some embodiments, an operator of the vehicle 1000 has one or more controls located within the operator area that can be manipulated by the operator to cause the separate actuation system to cause the hydraulic systems of the vehicle 1000 and implement 4000 to become hydraulically coupled as discussed herein. That is, the separate actuation system may be selectively implemented such that the hydraulic systems of the vehicle 1000 and implement 4000 are hydraulically coupled at any suitable time wherein the implement 4000 is proximate enough the implement interface system 2000 for the hydraulic couplings to be mated.

In some embodiments, the receiving unit portion 4100 of the implement 4000 further includes at least one PTO receiving member 4122. In some embodiments, the PTO receiving member 4122 projects from the back portion 4110 of the receiving unit portion 4100. In various embodiments, the PTO receiving member 4122 is configured to engage with the PTO drive member 2400 of the implement interface system 2000, as discussed in greater detail below.

Figure 19:
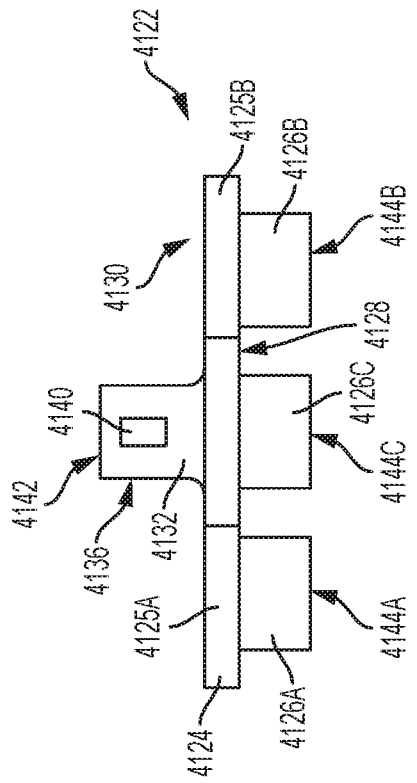
FIG. 19 is a top view of a PTO receiving member, according to some embodiments.
Figure 20:
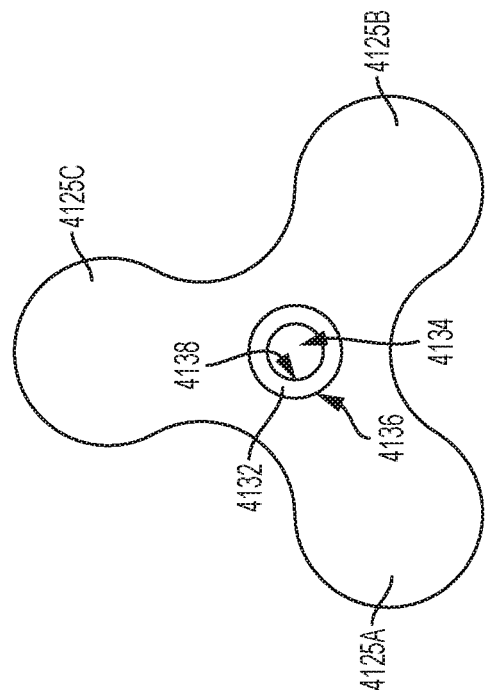
FIG. 20 is a back view of a PTO receiving member, according to some embodiments.
Figure 18:
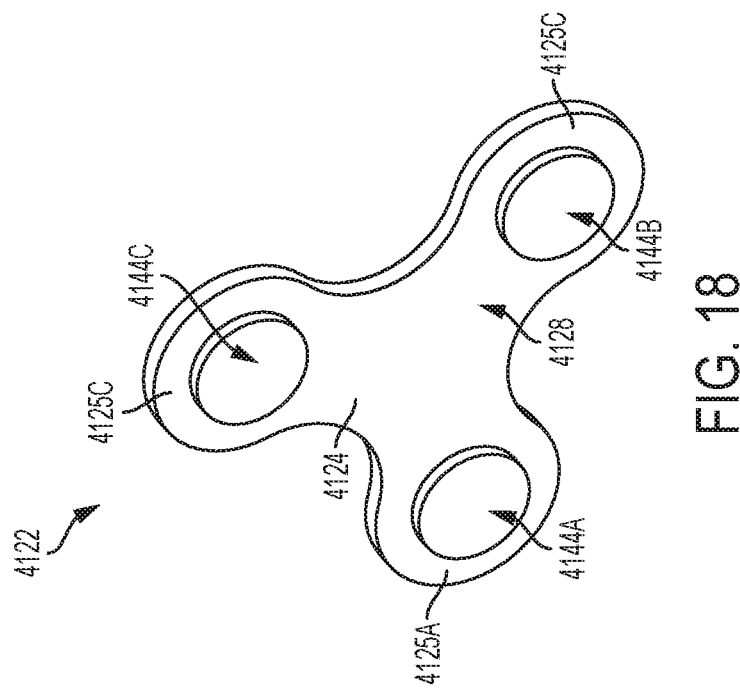
FIG. 18 is a front perspective view of a PTO receiving member, according to some embodiments.

Turning now to FIGS. 18 to 20, in various embodiments, the PTO receiving member 4122 includes a body 4124, a plurality of lobes, such as lobes 4125A, 4125B, and 4125C, and a plurality of reaction members, such as reaction members 4126A, 4126B, and 4126C. The body 4124 includes a front side 4128 and a back side 4130. In various embodiments, a receiving collar 4132 projects from the back side 4130 of the body 4124. The receiving collar includes a central bore 4134 that is configured to receive an implement drive shaft therein, the implement drive shaft being configured to transfer power to various components of the implement 4000. The receiving collar 4132 further includes and exterior face 4136 and an interior face 4138. In some embodiments, the receiving collar 4132 includes an aperture 4140 situated along its longitudinal length between the body 4124 of the receiving member 4122 and an end 4142 of the receiving collar 4132. In some embodiments, the aperture 4140 is slotted such that it has a length in excess of its width, the length of the aperture 4140 extending along the longitudinal length of the receiving collar 4132. In various embodiments, the receiving collar 4132, the bore 4134, and the body 4124 of the receiving member 4124 are concentric.

In various embodiments, the reaction members 4126A-4126C project from the front side 4128 of the body 4124. In these embodiments, each reaction member includes a forward face, such as forward faces 4144A, 4144B, and 4144C. In some embodiments, forward faces 4144A-4144C are parallel with one another, and are generally perpendicular to the longitudinal axis about which the PTO receiving member 4122 rotates. Generally, the reaction members 4126A-4126C are resilient components that are configured to interface with the lobes 2408A-2408C of the PTO drive member 2400 to transfer power from the PTO drive member 2400 to the implement 4000, as discussed in greater detail below.

In various embodiments, the PTO receiving member 4122 includes a quantity of lobes (e.g., 4125A-4125C) commensurate with the quantity of lobes on the PTO driving member 2400. For instance, in some embodiments, the PTO driving member 2400 and the PTO receiving member 4122 include the same quantity of lobes. In some embodiments, however, the PTO driving member 2400 and the PTO receiving member 4122 may include differing quantities of lobes. For instance, the PTO driving member may include more lobes than the PTO receiving member, such as twice as many lobes. Similarly, the PTO driving member may include less lobes than the PTO receiving member, such as half as many lobes. In some embodiments, the PTO driving member (or the PTO receiving member) may have any multiple of the number of lobes as the PTO receiving member (or conversely the PTO driving member).

In various embodiments, the PTO receiving member 4122 is made of a metallic material, such as steel or aluminum. In some embodiments, the PTO receiving member 4122 is made of a plastic, such as a high density plastic. In some embodiments, the PTO receiving member 4122 is forged. In some embodiments, the PTO receiving member 4122 is cast. In some embodiments, the PTO receiving member 4122 is machined from a billet or block.

In various embodiments, the reaction members 4126A-4126C are made of a rubber, synthetic rubber, or polyurethane, for example. In some embodiments, the reaction members are generally impact and abrasion resistant, as will be appreciated by those of skill in the art.

Figure 21:
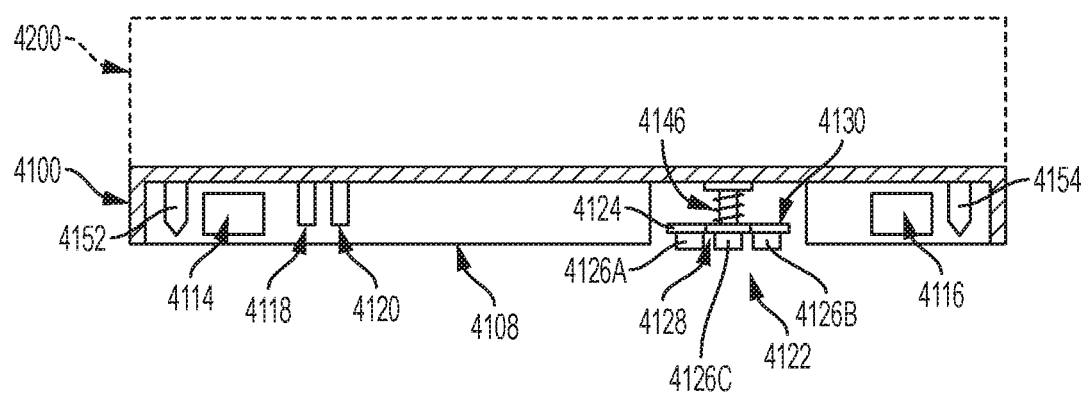
FIG. 21 is a cross sectional view of the implement illustrated in FIG. 16 taken along line 21-21, according to some embodiments.

Turning now to FIG. 21, a coupling of the PTO receiving member 4122 to the operating unit portion 4200 of the implement 4000 is illustrated. In various embodiments, the PTO receiving member 4122 is coupled to a driveshaft 4202 of the operating unit portion 4200 of the implement 4000. In various embodiments, the PTO receiving member 4122 is coupled to the driveshaft 4202 of the operating unit portion 4200 such that as the PTO receiving member 4122 rotates, it causes the driveshaft 4202 of the operating unit portion 4200 to rotate. This rotation of the driveshaft 4202 of the operating unit portion 4200 powers one or more components of the implement 4000 as will be appreciated by one of skill in the art.

It will be appreciated that a variety of mechanisms can be utilized to rotationally couple the PTO receiving member 4122 to the driveshaft 4202 of the operating unit portion 4200. For example, one or more splines, cotter pins, dowels, shanks, or other fastening mechanisms may be utilized without departing from the spirit or scope of the disclosure.

In some embodiments, despite being rotationally coupled to the driveshaft 4202 of the operating unit portion 4200, the PTO receiving member 4122 is free to translate along the longitudinal axis of the driveshaft 4202 of the operating unit portion 4200. In some such embodiments, this translation affords the PTO receiving member a degree of freedom that permits the reaction members 4126A-4126C to change their axial position relative to the PTO driving member 2400, as described in greater detail below. In some embodiments, this translational degree of freedom is accomplished by slotting aperture 4140 (FIG. 19) as described above, and extending one or more cotter pins or the like through the aperture and through an aperture of the driveshaft 4202. Under such a configuration, the PTO receiving member 4122 is free to translate along the longitudinal axis of the driveshaft 4202 of the operating unit portion 4200 based on the slotted longitudinal length of the aperture 4140.

In some embodiments where the PTO receiving member 4122 is permitted to translate along the longitudinal length of the driveshaft 4202 of the operating unit portion 4200, one or more resilient members may be positioned between to the PTO receiving member 4122 and the operating unit portion 4200 of the implement 4000. In some such embodiments, the resilient member is operable to exert a force on the PTO receiving member 4122 that influences the PTO receiving member 4122 away from the driveshaft 4202 of the operating unit portion 4200.

For example, as illustrated in FIG. 21, a resilient member 4146 is positioned between the back side 4130 of the PTO receiving member 4122 and the operating unit portion 4200 of the implement 4000. In this illustrated example, the resilient member 4146 is a coil spring that is situated about the receiving collar 4132 of the PTO receiving member 4122 and about the driveshaft 4202 of the operating unit portion 4200. That is, as illustrated, the receiving collar 4132 and the driveshaft 4202 extend through a hollow central region of the coil spring.

In some embodiments, the resilient member 4146 is configured to rotate with the PTO receiving member 4122. For example, the resilient member 4146 is in contact with one or more bearings and/or one or more bearing surfaces that enable the resilient member 4146 to rotate as the PTO receiving member 4122 rotates. In other embodiments, the resilient member 4146 is configured to remain stationary as the PTO receiving member 4122 rotates. For example, the resilient member 4146 is in contact with one or more bearings and/or one or more bearing surfaces that enable the PTO receiving member 4122 to rotate without causing the resilient member 4146 to rotate. In the illustrated example of FIG. 21, the nominal position of PTO receiving member 4122 is one wherein the PTO receiving member 4122 is operable to at least translate along the longitudinal axis of the driveshaft 4202 such that the body 4124 of the PTO receiving member 4122 moves closer to the operating unit portion 4100 of the implement 4000. As explained in greater detail below, such a nominal position provides for misalignment correction of the PTO driving member 2400 and the PTO receiving member 4122 without requiring manual intervention by an operator of the utility vehicle. In other words, as discussed in greater detail below, the configurations disclosed herein allow alignment corrections to be made from within the cab 1010 of the utility vehicle 1000 as discussed below.

With reference now to FIGS. 22 to 25, an engagement between the utility vehicle 1000 and the implement 4000 is illustrated, and specifically, engagement between the components of the actuation system 2200 and the receiving unit portion of the implement 4000 is illustrated. Generally, as discussed above, during coupling of the implement 4000 to the implement interface system 2000, the implement retention features 2112 and 2114 are received within the pocket 4112 of the receiving unit portion 4100. In various embodiments, with the implement retention features 2112 and 2114 are received within the pocket 4112, the support system 3000 and/or the implement interface system 2000 can be actuated such that the back portion 4110 of the implement 4000 is drawn or otherwise moved toward the implement interface system 2000.

In some such embodiments, the back portion 4110 of the implement 4000 is drawn or otherwise moved toward the implement interface system 2000 by pitching or rotating the implement interface system 2000 such that the top portion 2010 is rotated closer to the utility vehicle 1000. In various embodiments, with the retention features 2112 and 2114 are received within the pocket 4112, this pitching or rotation of the implement interface system 2000 will cause the back portion 4110 to move closer to the implement interface system 2000, as will be appreciated by one of skill in the art.

In some embodiments, the implement 4000 includes one or more locating pins, such as locating pins 4152 and 4154. In various embodiment, locating pins 4152 and 4154 operate to properly position the implement 4000 relative to the implement interface system 2000 as the implement 4000 is drawn toward the implement interface system 2000 (such as by pitching or rotating the implement interface system 2000, as explained above). In some embodiments, the implement interface system includes one or more locating pin receiving features. For example, referring back now to FIG. 6, locating pin receiving features 2116 and 2118 are positioned on the frame 2100 of the implement interface system 2000 such that they are operable to receive locating pins 4152 and 4154, respectively, as the implement 4000 is coupled to the implement interface system 2000.

In various embodiments, with the retention features 2112 and 2114 received within the pocket 4112 and the back portion 4110 drawn proximate the implement interface system 2000, the actuation system 2200 of the implement interface system 2000 can be engaged to secure the implement 4000 to the implement interface system 2000 (and thus the utility vehicle 1000).

In various embodiments, the actuation system 2200 is transitionable between activated and deactivated positions. In the deactivated position, the implement 4000 is separable from the implement interface system 2000. That is, none of the hydraulic components are hydraulically coupled to the hydraulic system of the utility vehicle 1000, and none of the other components of the implement 4000 are operably coupled to the PTO system 5000 of the utility vehicle 1000.

In the activated position, the implement 4000 is operably coupled to the implement interface system 2000. That is, in the activated position, any hydraulic components of the implement 4000 are hydraulically coupled to the hydraulic system of the vehicle 1000. Likewise, in the activated position, any components of the implement 4000 that are otherwise operable via the PTO system 5000 of the utility vehicle 1000 are coupled to the PTO system 5000 of the utility vehicle 1000 such that the PTO system 5000 can operate to actuate or otherwise manipulate those components.

Figure 22:
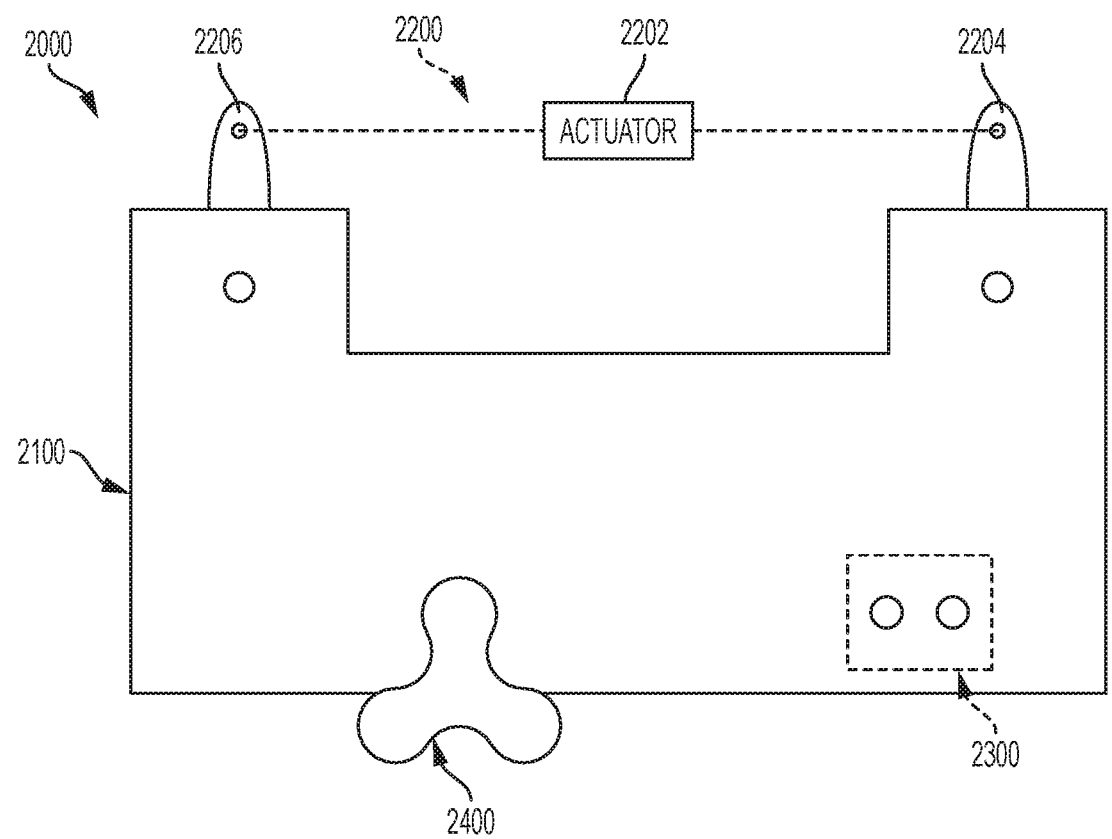
FIG. 22 is a front view of an implement interface system with an actuation system in a first position, according to some embodiments.
Figure 23:
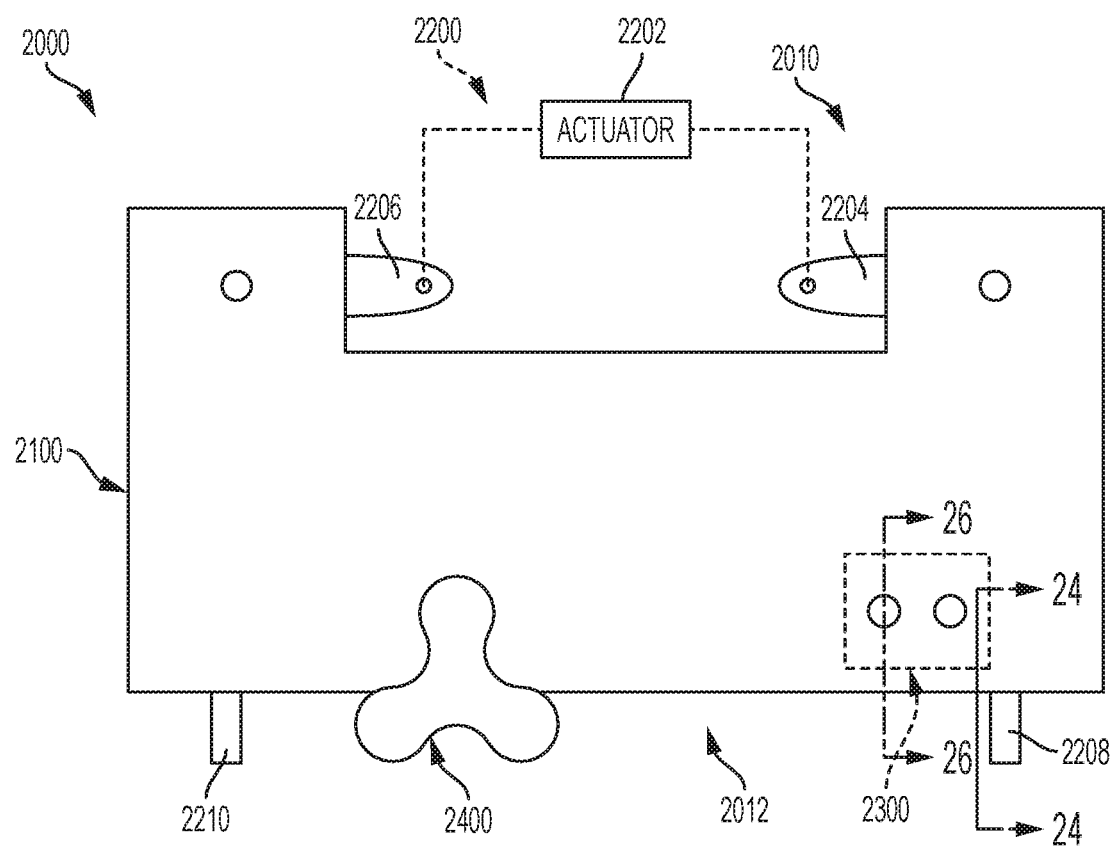
FIG. 23 is a front view of an implement interface system with an actuation system in a second position, according to some embodiments.

FIG. 22 illustrates the actuation system 2200 in a deactivated state. In the deactivated state, the actuation members 2204 and 2206 and the engagement pins 2208 and 2210 are in deactivated positions. That is, the actuation system 2200 is in the configuration illustrated in FIG. 8. FIG. 23 illustrates the actuation system 2200 in an activated state. In the activated state, the actuation members 2204 and 2206 and the engagement pins 2208 and 2210 are in activated positions. That is, the actuation system 2200 is in the configuration illustrated in FIG. 9.

As illustrated in FIG. 23, when positioned in an activated position, the engagement pins 2208 and 2210 translate such that they project from the bottom portion 2012 of the implement interface system 2000. In various embodiments, this projection from the bottom portion 2012 of the implement interface system 2000 enables the engagement pins 2208 and 2210 to engage the receiving unit portion 4100 (via engagement features 4114, 4116) of the implement 4000 in order to secure and operably couple the implement 4000 to the implement interface system 2000. In some embodiments, during engagement of the engagement pins 2208 and 2210, the receiving unit portion 4100 of the implement 4000 is drawn closer to the implement interface system 2000. FIG. 24 is a cross sectional view taken along line 24-24 of FIG. 23 with the engagement pin 2208 transitioned to an intermediate position between the engaged position and the disengaged position. FIG. 25 is a cross sectional view taken along line 24-24 of FIG. 23 with the engagement pin 2208 in the engaged position. As illustrated in FIGS. 24 and 25, as the engagement pin 2208 transitions to an engaged position, a bottom portion 2220 of the engagement pin 2208 engages the bottom flange 4108 of the implement 4000, which draws the implement 4000 toward the implement interface system 4000.

In some embodiments, the engagement pin 4108 includes a sloped or ramped surface 2222 that engages the bottom flange 4108 and cases the implement to be drawn toward the implement interface system 2000. Specifically, the ramped surface 2222 of the engagement pin 2208 contacts the engagement feature 4114 of the bottom flange 4108 of the implement 4000. As the engagement pin 2208 translates further into the engagement feature 4114 of the bottom flange 4108, the engagement pin 2208 exerts a force on the implement 4000 that causes the implement 4000 to be drawn closer to the implement interface system 2000. It will be appreciated that as the engagement pin 2208 translates into the engagement feature 4114, the engagement pin 2208 operates as an obstruction to prevent the implement 4000 from being removed from the utility vehicle 1000. Specifically, as illustrated in FIG. 25, the engagement pin 2208 obstructs the bottom flange 4108 from translating or substantially translating relative to the engagement pin 2208 and thus relative to the implement interface system 2000.

In some embodiments, the engagement pins 2208 and 2210 can be transitioned to a disengage position, as mentioned above. In some embodiments, when positioned in the disengaged position, the engagement pin 2208 is translated away from the flange 4108 such that the engagement pin 2208 does not operate as an obstruction preventing the flange 4108 and thus the implement 4000 from being moved relative to the engagement pin 2208 and thus relative to the implement interface system 2000.

In various embodiments, one or more actuators 2202 operate to transition the actuation system 2200 between engaged and disengaged states. In various embodiments, the one or more actuators 2200 can be controlled by an operator of the utility vehicle from within the cab 1010 of the utility vehicle 1000. That is, the operator of the utility vehicle 1000 can cause the one or more actuators to transition between engaged and disengaged states from within the cab 1010 of the utility vehicle 1000. In other words, the operator can secure the implement 4000 to the utility vehicle 1000 without ever exiting the cab 1010 of the utility vehicle. In various embodiments, one or electrical switches located inside the cab 1010 of the utility vehicle 1000 and electrically coupled to the one or more actuators 2202 can be manipulated to cause the one or more actuators to transition between engaged and disengaged states, as will be understood by those of skill in the art.

In various embodiments, as mentioned above, the implement 4000 can be hydraulically coupled to and decoupled from the utility vehicle 1000 without the operator ever exiting the cab 1010 of the utility vehicle 1000. That is, in various embodiments, one or more systems can be operated from within the cab 1010 of the utility vehicle 1000 to cause the implement 4000 to be hydraulically coupled to and decoupled from the utility vehicle 1000.

In some embodiments, the novel arrangement of the various hydraulic components on both the implement 4000 and the implement interface system 2000 enable the above-referenced coupling and decoupling capability. Turning now to FIGS. 26 to 34 the hydraulic coupling of the implement 4000 and the utility vehicle 1000 is illustrated and described. With specific reference to FIG. 26, in various embodiments, as described above, the hydraulic interface component 2300 includes a hydraulic coupling 2306. In various embodiments, the hydraulic coupling 2306 includes an outer sleeve 2308, and inner sleeve 2310, an upper interface coupling plate 2326, and a lower interface coupling plate 2328. As mention above, in some embodiment, the upper and lower interface coupling plates 2326 and 2328 are secured either directly or indirectly to the frame 2100 of the implement interface system 2000.

In some embodiments, the outer sleeve 2308 includes a plurality of circumferential inner wall channels, such as inner wall channels 2346 and 2348. Generally, the inner sleeve 2310 is configured such that its nominal position or resting position is one wherein the one or more retractable detents 2320 are positioned between the plurality of inner wall channels 2346 and 2348, as illustrated.

In various embodiments, the hydraulic interface component 2300 is configured such that the inner sleeve 2310 is permitted to translate along its longitudinal axis relative to the outer sleeve 2308. In various embodiments, the inner sleeve 2310 is permitted to translate in either axial direction. That is, in various embodiments, the inner sleeve 2310 is permitted to translate in a first axial direction along its longitudinal axis and in a second, opposing axial direction along its longitudinal axis. When translated in the first axial direction, the retractable detents translate along the longitudinal axis of the inner sleeve 2310 toward a first one of the inner wall channels 2346. When translated in the second axial direction, the retractable detents translate along the longitudinal axis of the inner sleeve 2310 toward a second one of the inner wall channels 2348.

Figure 26:
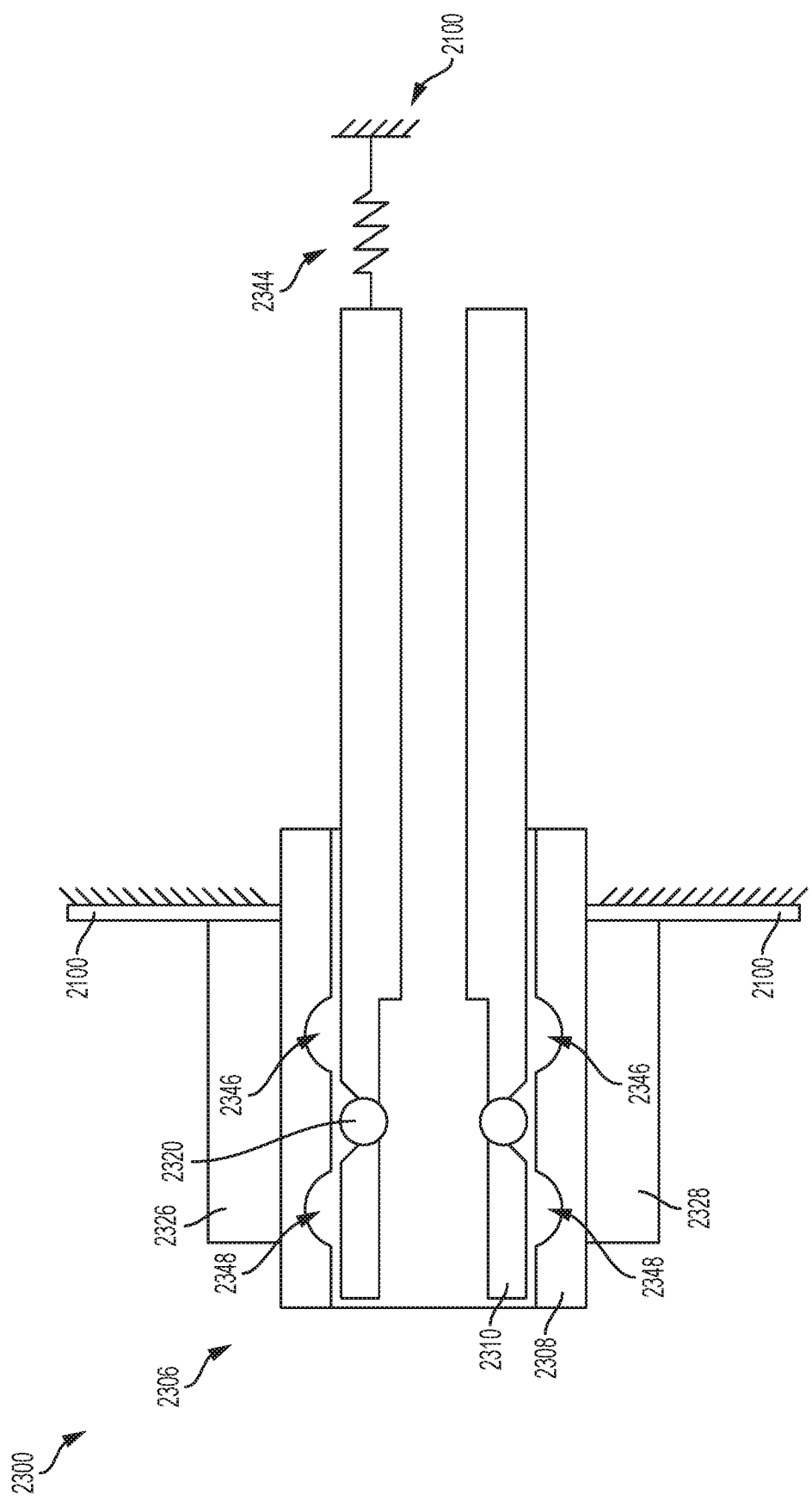
FIG. 26 is a cross sectional view of a portion of a hydraulic interface component illustrated in FIG. 23 taken along line 26-26, according to some embodiments.

In some embodiments, one or more resilient members, such as spring 2344 are coupled to the inner sleeve 2310. For example, as illustrated in FIG. 26, a spring 2344 is coupled to the inner sleeve 2310 and coupled to the frame 2100 of the implement interface system 2000. In various embodiments, the spring 2344 is coupled to the inner sleeve 2310 such that the spring 2344 is configured to exert a bidirectional force on the inner sleeve 2310 to influence the inner sleeve 2310 to return to its nominal position in the event the inner sleeve 2310 is displaced from its nominal position, as explained further below.

In various embodiments, as will be understood by those in the art, when the inner sleeve 2310 translates to a position relative to the outer sleeve 2308 wherein the retractable detents are positioned adjacent either one of the inner wall channels 2346 and 2348, the retractable detents are permitted to retract into or partially into the inner wall channel, as will be appreciated by one of skill in the art.

Figure 27:
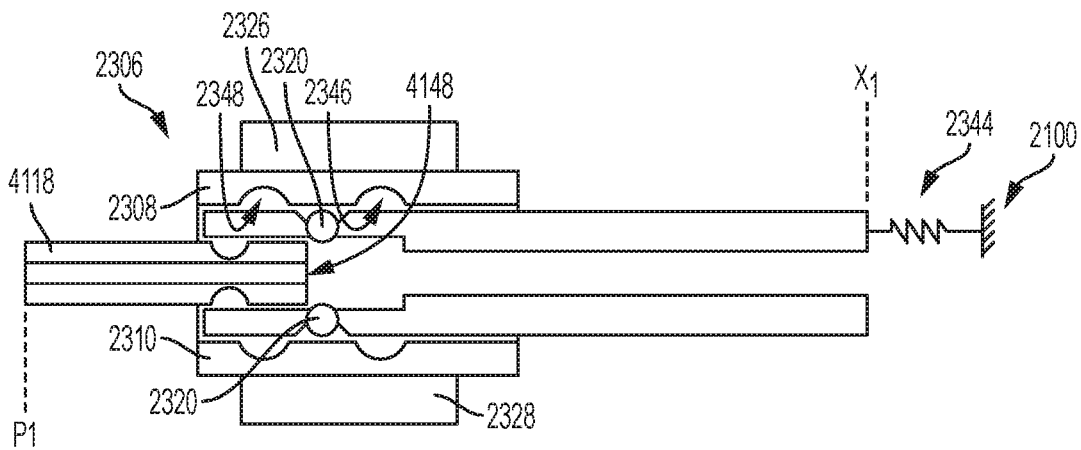
FIGS. 27 to 29 illustrate a coupling of the hydraulic systems of an implement and an implement interface system of a utility vehicle, according to some embodiments.
Figure 28:
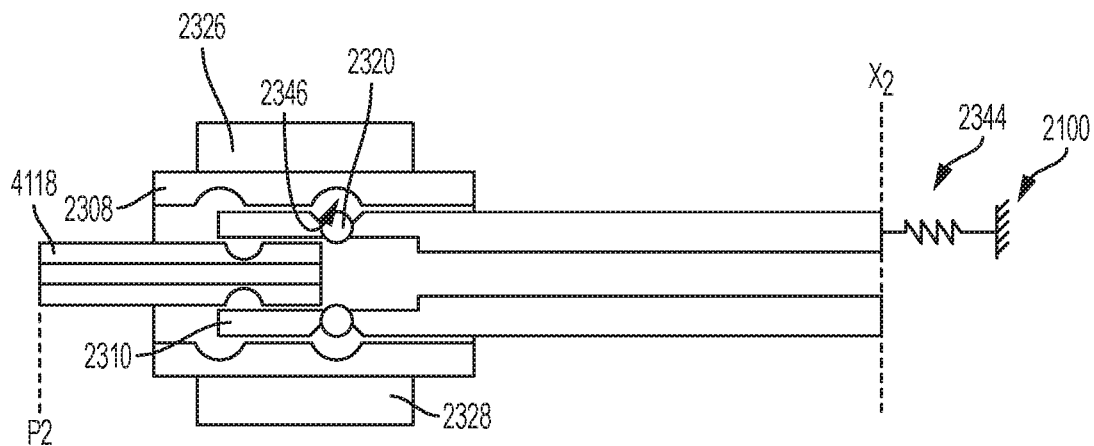
Figure 29:
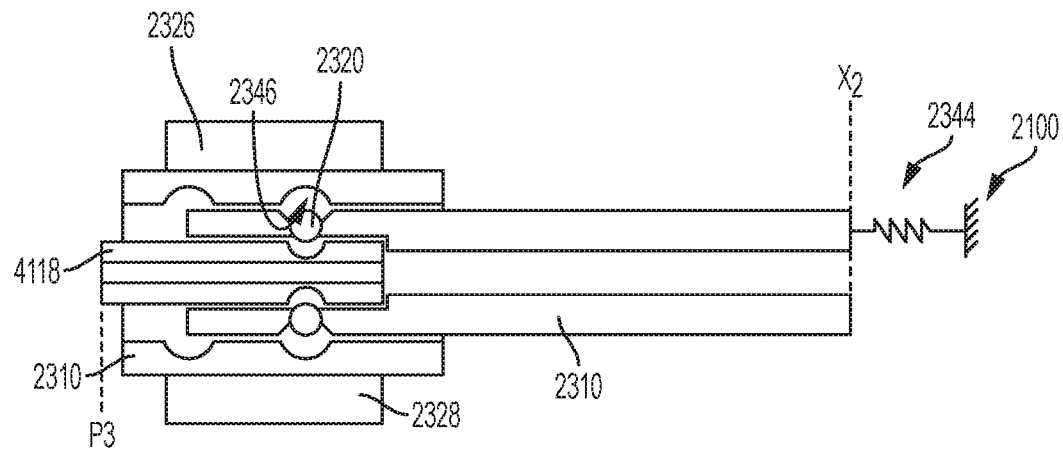
Figure 30:
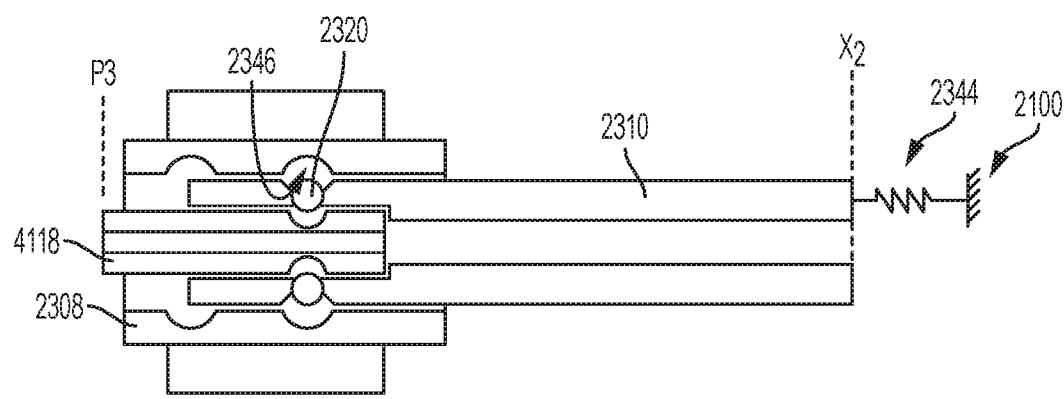
FIGS. 30 to 34 illustrate a decoupling of the hydraulic systems of an implement and an implement interface system of a utility vehicle, according to some embodiments.

FIGS. 27 to 29 are illustrative of the coupling of the hydraulic systems of the implement 4000 and the utility vehicle 1000. In various embodiments, as the implement interface system 2000 engages the implement 4000, the hydraulic interface components of the implement 4000 naturally approach and engage the hydraulic couplings of the implement interface system 2000. For example, and with specific reference to the interaction between the hydraulic interface component 4118 and the hydraulic coupling 2306, as the implement interface system 2000 engages the implement 4000, the hydraulic interface component 4118 enters an inner bore or lumen of the inner sleeve 2310 of the hydraulic coupling 2306. In some embodiments, the hydraulic interface component 4118 is advanced to a position P1 wherein a forward end 4148 of the hydraulic interface component 4118 contacts the plurality of retractable detents 2320.

In various embodiments, unless the retractable detents 2320 are positioned adjacent either of the inner wall channels 2346 and 2348 the detents operate to obstruct further translation of the hydraulic interface component 4118 relative to the inner sleeve 2310. Accordingly, in some embodiments, as the hydraulic interface component 4118 is further advanced, the retractable detents 2320 cause the inner sleeve 2310 to translate along its longitudinal axis in the direction of the advancing hydraulic interface component 4118. For example, as illustrated in FIG. 28, the hydraulic interface component 4118 has been advanced to a position P2, which has cause the inner sleeve to be retracted from a nominal position X1 to a retracted position X2. As illustrated, in the retracted position X2, the retractable detents 2320 are positioned adjacent inner wall channel 2346. Accordingly, in this position X2, the retractable detents 2320 are free to retract into inner wall channel 2346.

In some embodiments, when the retractable detents 2320 are free to retract into inner wall channel 2346, the hydraulic interface component 4118 can be further advanced relative to the inner sleeve 2310. For example, as illustrated in FIG. 29, the retractable detents 2320 are retracted into inner wall channel 2346, and the hydraulic interface component 4118 has further advanced to position P3, while the inner sleeve 2310 as remained substantially positioned at position X2. Position P3 is representative of the hydraulic interface component 4118 being hydraulically coupled to the utility vehicle 1000. In some embodiments, the inner sleeve 2310 may translate to a position different from X2 as the hydraulic interface component 4118 is further advanced toward position P3. That is, inner sleeve 2310 is not required to remain at position X2 in order the hydraulic interface component 4118 to be advanced into the inner sleeve 2308 to position P3.

In various embodiments, the operator of the utility vehicle 1000 can control the implement interface system 2000 from within the cab 1010 of the utility vehicle 1000 to cause the hydraulic interface component 4118 to advance to position P3. In some such embodiments, transitioning the actuation system 2200 to the activated state causes the hydraulic interface component 4118 to advance to position P3. That is transitioning the actuation system 2200 to the activated state causes the implement 4000 to be hydraulically coupled to the utility vehicle 1000. For instance, once the engagement pins 2208 and 2210 are transitioned to the engaged position and the implement 4000 is drawn to the implement interface system 2000 as discussed above, the hydraulic interface component 4118 to advance to position P3 such that the implement 4000 is hydraulically coupled to the implement interface system 2000.

Figure 31:
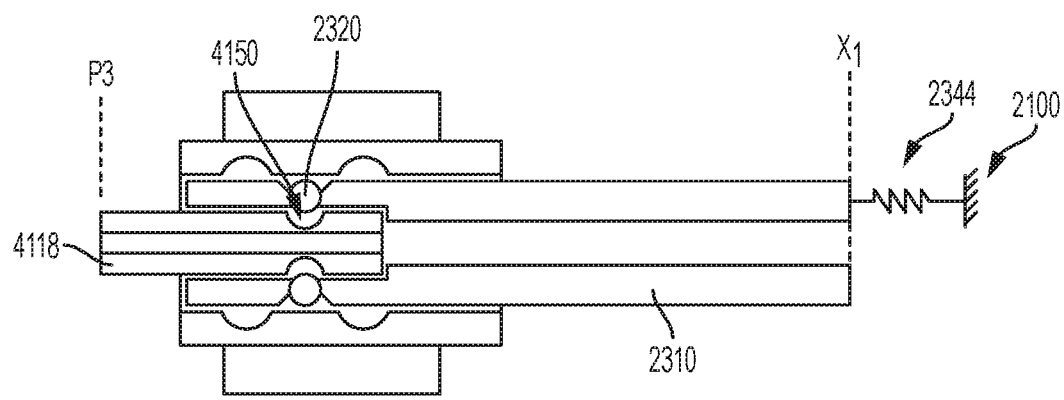

FIGS. 30 to 34 are illustrative of the decoupling of the hydraulic systems of the implement 4000 and the utility vehicle 1000. In various embodiments, as the implement interface system 2000 disengages the implement 4000, the hydraulic interface components of the implement 4000 naturally withdraw from the hydraulic couplings of the implement interface system 2000. For example, and with specific reference to the interaction between the hydraulic interface component 4118 and the hydraulic coupling 2306, as the implement interface system 2000 disengages the implement 4000, the hydraulic interface component 4118 translates along the longitudinal axis of the lumen of the inner sleeve 2310 of the hydraulic coupling 2306. In some embodiments, as the hydraulic interface component 4118 translates along the longitudinal axis of the lumen of the inner sleeve 2310, so translates the inner sleeve 2310. Specifically, in some embodiments, as hydraulic interface component 4118 translates along the longitudinal axis of the lumen of the inner sleeve 2310, the spring 2344 causes the inner sleeve 2310 to translate with the hydraulic interface component 4118 toward its nominal position. Generally, the translation of the inner sleeve 2310 with the hydraulic interface component 4118 causes the hydraulic interface component 4118 to remain coupled to the inner sleeve 2310 in position P3, as illustrated in FIG. 31. Specifically, despite the translation of the inner sleeve 2310 to its nominal position X1, the hydraulic interface component 4118 remains coupled to the inner sleeve 2310 in position P3.

Figure 32:
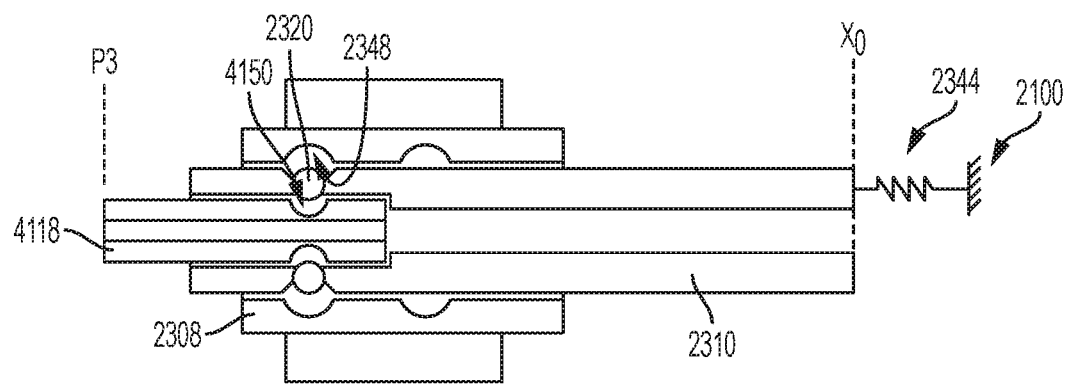

In some embodiments, at this point, retractable detents 2320 engage a retention element 4150 of the hydraulic interface component 4118 such that the hydraulic interface component 4118 remains coupled to the inner sleeve 2310 in position P3 despite further retracting of the hydraulic interface component 4118 along the longitudinal axis of the inner sleeve 2310. In some embodiments, where the inner sleeve 2310 remains coupled to the hydraulic interface component 4118 as a result of the retractable detents 2320, further withdrawal of the hydraulic interface component 4118 along the longitudinal axis of the inner sleeve 2310 causes the inner sleeve to translate to a position X0, as illustrated in FIG. 32. That is, between positions X1 and X0, the retractable detents 2320 prevent a decoupling of the hydraulic interface component 4118 and the inner sleeve 2310 as will be appreciated by one of skill in the art.

Figure 33:
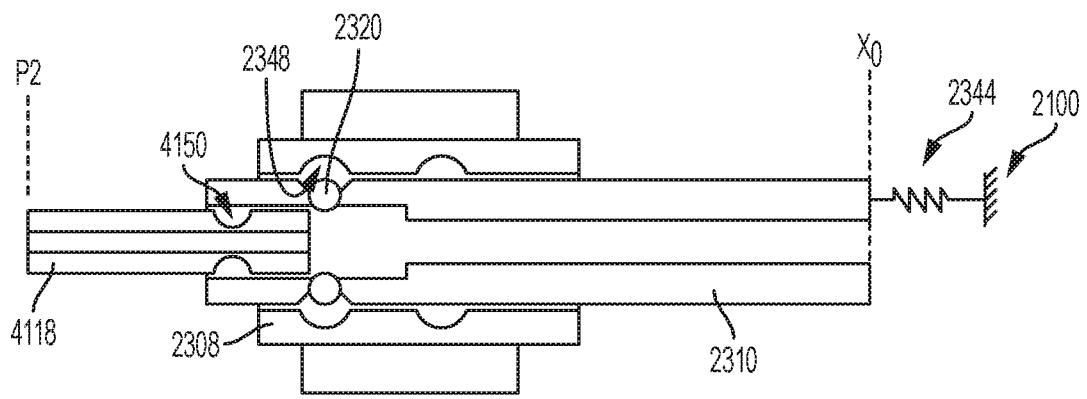

Upon translating to the position X0 the retractable detents 2320 are positioned adjacent inner wall channel 2348. Accordingly, in this position X0, the retractable detents 2320 are free to retract into inner wall channel 2348. In some embodiments, when the retractable detents 2320 are free to retract into inner wall channel 2348, the hydraulic interface component 4118 can be decoupled and withdrawn from the inner sleeve 2310. For example, as illustrated in FIG. 33, the retractable detents 2320 are retracted into inner wall channel 2348, and the hydraulic interface component 4118 has been withdrawn to a position P2, while the inner sleeve 2310 has remained substantially positioned at position X0. Position P2 is representative of the hydraulic interface component 4118 and thus the implement 4000 being hydraulically decoupled from the utility vehicle 1000.

Figure 34:
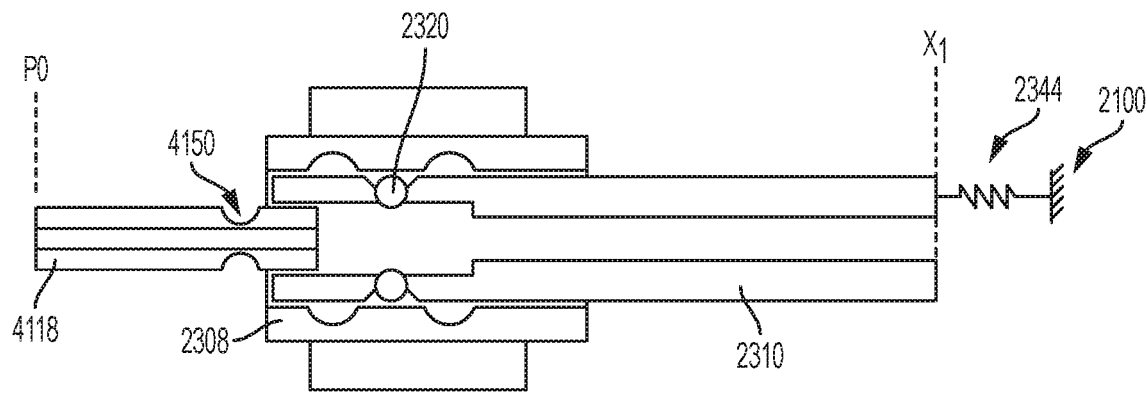

As explained above, in some embodiments, when the inner sleeve 2310 is displaced from its nominal position, the spring 2344 exerts a force on the inner sleeve 2310 to induce inner sleeve 2310 to translate along its longitudinal axis and return to its nominal position. Referring now to FIG. 34, the spring 2344 has caused the inner sleeve 2310 to translate along its longitudinal axis and return to its nominal position at X1. In this illustrated example, because the retractable detents 2320 were not engaged with the retention element 4150 of the hydraulic interface component 4118, the inner sleeve 2310 return to its nominal position at X1 without causing the hydraulic interface component 4118 to translate. Thus, as illustrated in FIG. 34, after the inner sleeve 2310 has returned to its nominal position X1, the hydraulic interface component 4118 is positioned in a position P0 wherein the implement 4000 is decoupled from the utility vehicle 1000.

It will be appreciated that while the inner sleeves 2310 of the hydraulic couplings are configured to translate relative to the outer sleeves 2308 as the hydraulic interface components of the implement are advance into and withdrawn from the hydraulic couplings, in various alternative embodiments, the outer sleeves 2308 may be configured to additionally or alternatively translate relative to the inner sleeves 2310.

It will also be appreciated that while the inner sleeve 2310 is described above as having one or more resilient members coupled thereto, in various embodiments, the hydraulic interface components 4118 and 4120 of the implement 4000 additionally or alternatively have one or more resilient member coupled thereto.

As mentioned above, in various embodiments, the implement 4000 can be coupled to and decoupled from the PTO system 5000 utility vehicle 1000 without the operator ever exiting the cab 1010 of the utility vehicle 1000. That is, in various embodiments, one or more systems can be operated from within the cab 1010 of the utility vehicle 1000 to cause the implement 4000 to be operably coupled to and decoupled from the PTO system 5000 of the utility vehicle 1000.

Figure 35:
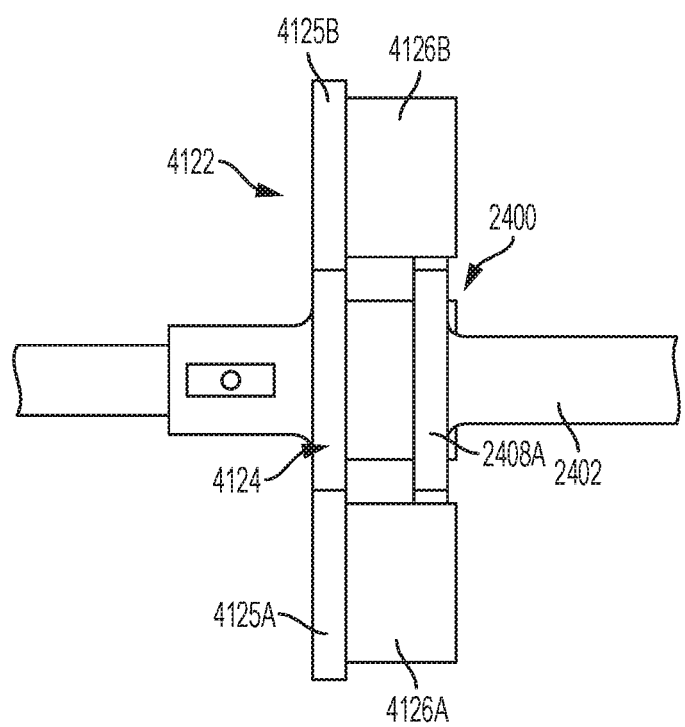
FIG. 35 is a top view of a properly aligned coupling of a PTO driving member and PTO receiving member, according to some embodiments.
Figure 36:
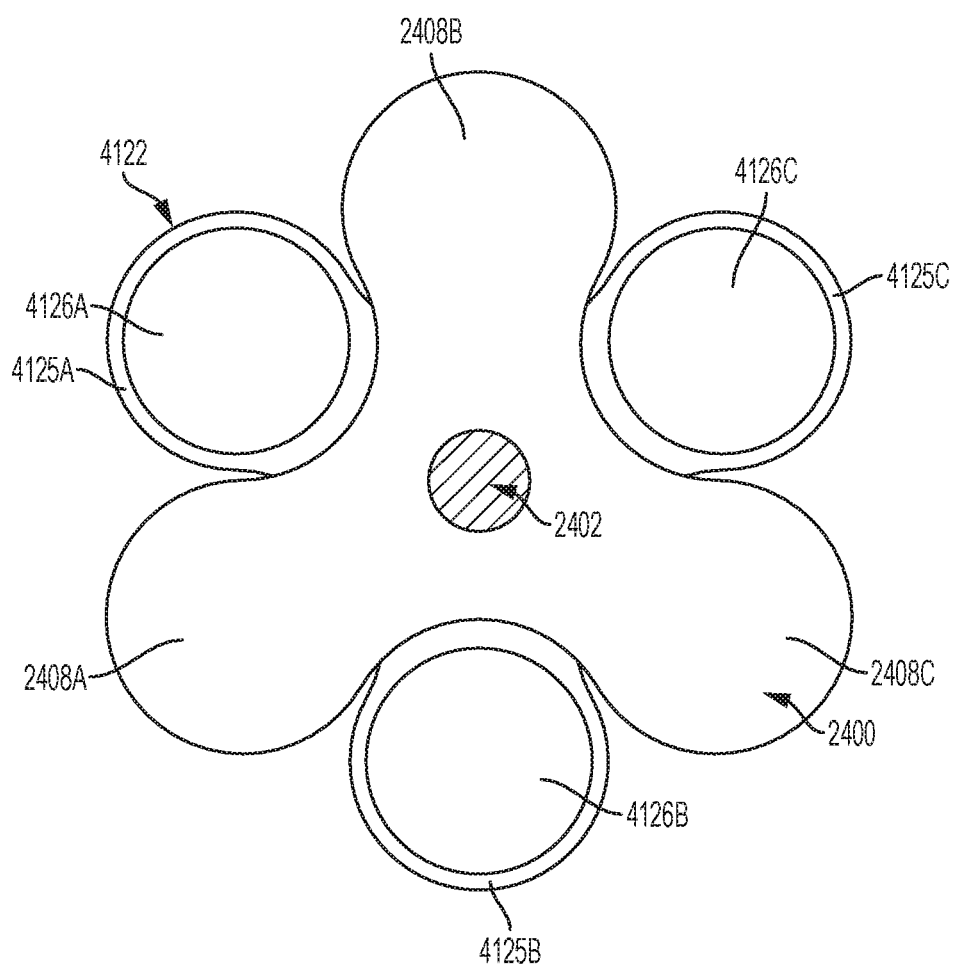
FIG. 36 is a back view of a properly aligned coupling of a PTO driving member and PTO receiving member, according to some embodiments.
Figure 37:
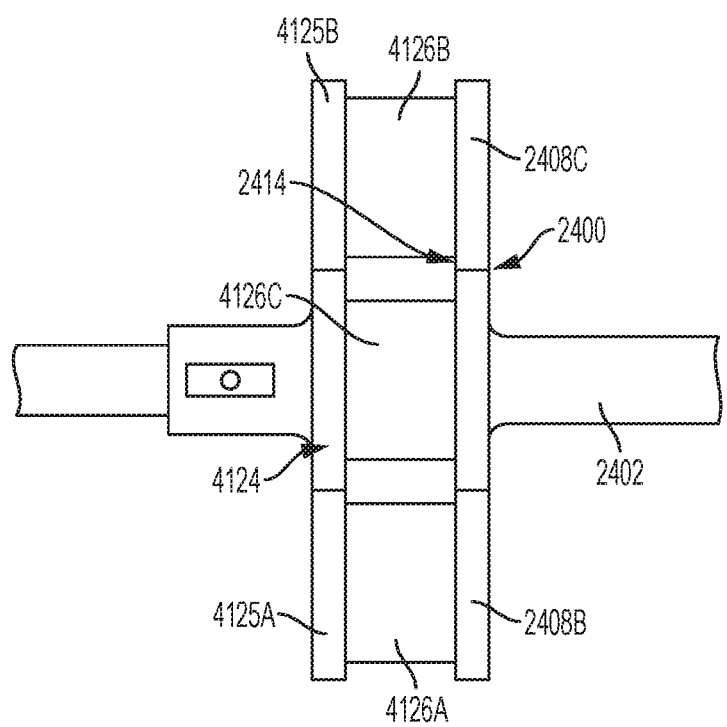
FIG. 37 is a top view of a misaligned coupling of a PTO driving member and PTO receiving member, according to some embodiments.

Referring now to FIGS. 35 to 37, the coupling, decoupling, and operation of the PTO system 5000 of the utility vehicle 1000 and the implement 4000 is illustrated and discussed. With specific reference to FIGS. 35 and 36, the PTO driving member 2400 of the implement interface system 2000 is configured to interface with the PTO receiving member 4122 of the implement 4000. Generally, the PTO driving member 2400 projects from the front portion 2002 of the implement interface system 2000 and the PTO receiving member 4122 projects from the back portion 4110 of the implement 4000 such that as the implement 4000 is coupled to the implement interface system 2000, the PTO driving member 2400 and the PTO receiving member 4122 interfere with one another. That is, when the implement 4000 is coupled to the implement interface portion 2000, the PTO driving member projects a distance toward the PTO receiving member 4122 sufficient for the PTO driving member 2400 to engage the PTO receiving member 4122. In some embodiments, PTO driving member 2400 projects a distance toward the PTO receiving member 4122 such that, upon proper alignment, the forward face 2414 of the PTO driving member 2400 is more proximate the back portion 4110 of the implement 4000 than are the forward faces 4144A-4144C of the reaction members 4126A-4126C.

In some embodiments, the reaction members 4126A-4126C of the PTO receiving member 4122 are configured to interact with the lobes 2408A-2408C of the PTO driving member 2400 such that the PTO driving member 2400 causes the PTO receiving member 4122 to rotate as the PTO system 5000 rotates (and thus as the PTO driving member 2400 rotates).

In some embodiments, the lobes 2408A-2408C of the PTO driving member 2400 are configured to be situated between the reaction members 4126A-4126C of the PTO receiving member 4122. Specifically, as explained above, the voids 2412A-2412C of the PTO driving member 2400 are sized such, upon proper alignment of the PTO driving member 2400 and the PTO receiving member 4122, the reaction members 4126A-4126C are situated in the voids 2412A-2412C such that as the PTO driving member 2400 rotates, the lobes 2408A-2408C engage the reaction members 4126A-4126C. This engagement of the reaction members 4126A-4126C by the lobes 2408A-2408C, causes the PTO receiving member 4122 to rotate with the PTO driving member 2400. In other words, the reaction members 4126A-4126C of the PTO receiving member 4122 operate as obstructions to the lobes 2408A-2408C of the PTO driving member 2400 such that the PTO driving member 2400 cannot rotate without the lobes 2408A-2408C engaging the reaction members 4126A-4126C.

In some embodiments, and with specific reference to FIG. 37, upon coupling of the implement 4000 to the implement interface system 2000, the PTO driving member 2400 and the PTO receiving member 4122 are misaligned. That is, in some embodiments, the reaction members 4126A-4126C are not situated in the voids 2412A-2412C located between the lobes 2408A-2408C of the PTO driving member 2400. Instead, in some embodiments, the implement 4000 is coupled to the implement interface system 2000 such that a forward face 2414 of the PTO driving member 2400 contacts the forward faces 4144A-4144C of the reaction members 4126A-4126C.

Accordingly, if the PTO driving member 2400 and the PTO receiving member 4122 are misaligned, the forward face 2414 of the PTO driving member 2400 is not positioned more proximate the back portion 4110 of the implement 4000 than are the forward faces 4144A-4144C of the reaction members 4126A-4126C. Instead, upon misalignment of the PTO driving member 2400 and the PTO receiving member 4122, the PTO receiving member 4122 is configured to deflect along the longitudinal axis of the receiving collar 4136 toward the implement 4000.

For example, as discussed above, in some embodiments, the receiving collar 4136 includes an aperture 4140 that is slotted to allow the PTO receiving member 4122 to translate along the longitudinal axis of the receiving collar 4136. In some embodiments, as discussed above, the coil spring 4146 operates to exert a force on the PTO receiving member 4122 that influences the PTO receiving member 4122 away from the driveshaft 4202 of the operating unit portion 4200. Accordingly, in various embodiments, upon proper alignment, the force exerted on the PTO receiving member by the coil spring 4146 will cause the PTO receiving member 4122 to translate back to its nominal (non-deflected position) toward the PTO driving member 2400 such that the lobes 2408A-2408C of the PTO driving member 2400 can engage the reaction members 4126A-4126C as the PTO driving member 2400 is rotated.

In some embodiments, a misalignment of the PTO driving member 2400 and the PTO receiving member 4122 can be corrected by simply engaging the PTO system 5000. That is, a misalignment of the PTO driving member 2400 and the PTO receiving member 4122 can be corrected by causing the PTO driving member 2400 to rotate. In some embodiments, the friction force between the forward faces 4144A-4144C of the reaction members 4126A-4126C and the forward face 2414 of the PTO driving member 2400 is insufficient to prevent a misaligned PTO driving member 2400 from rotating relative to the PTO receiving member 4122. In other words, the systems described herein provide that a misaligned PTO driving member 2400 and PTO receiving member 4122 can be overcome (i.e., the PTO driving member 2400 and PTO receiving member 4122 can be properly aligned) by simply engaging the PTO system 5000 to cause the PTO driving member 2400 to rotate relative to the PTO receiving member 4122.

Therefore, in various embodiments, an operator of the utility vehicle 1000 can correct a misaligned PTO driving member 2400 and PTO receiving member 4122 without ever exiting the cab 1010 of the utility vehicle 1000. For instance, if the PTO driving member 2400 and PTO receiving member 4122 are misaligned after coupling the implement 4000 to the implement receiving member 2000, the operator of the utility vehicle can correct the misalignment by simply engaging the PTO system 5000 of the utility vehicle 1000 via one or more PTO system activation switches located within the cab 1010 of the utility vehicle 1000.

Accordingly, the implement interface system 2000 and the support system 3000 of the utility vehicle 1000 herein described are configured such that an operator of the utility vehicle 1000 can couple an implement 4000 to the utility vehicle 1000, control or otherwise manipulate the implement 4000, and decouple the implement 4000 from the utility vehicle 1000 without ever leaving the safety and comfort of the cab 1010 of the utility vehicle 1000. That is, unlike conventional systems and designs, an operator of the utility vehicle 1000 is not required to exit the cab 1010 of the utility vehicle 1000 to manually attach or engage the implement 4000 to the utility vehicle 1000. Likewise, unlike conventional systems and designs, an operator of the utility vehicle 1000 is not required to exit the cab 1010 of the utility vehicle 1000 to manually couple the utility vehicle's hydraulic system to the hydraulic system of the implement 4000. And, unlike conventional systems and designs, an operator of the utility vehicle 1000 is not required to exit the cab 1010 of the utility vehicle 1000 to manually couple the utility vehicle's PTO system 5000 to the implement 4000. Instead, each of these operations can be performed by the operator from within the cab 1010 of the utility vehicle 1000.

The above discussed embodiments include a PTO driving member 2400 and a PTO receiving member 4122. As explained above, the PTO driving member 2400 and a PTO receiving member 4122 operate together to couple one or more components of the implement 4000 to the PTO system 5000 of the utility vehicle 1000. However, the illustrated PTO driving member 2400 should not be viewed as limiting. In other words, the PTO driving member of the disclosure is not limited to a structure including a body and a plurality of lobes. In various embodiments, the PTO driving member includes one or more additional features. For example, referring now to FIG. 38, a PTO driving member 6000 is illustrated and described. In some embodiments, the PTO driving member 6000 includes a body 6002 and a plurality of radially projecting lobes, such as radially projecting lobes 6004-6008. In some embodiments, one or more rollers are positioned at an end of each of the radially projecting lobes. For example, as illustrated, rollers 6010-6014 are situated at the ends of the radially projecting lobes 6004-6008, respectively. In various embodiments, each of the rollers has a central axis about which the roller is configured to rotate. In some embodiments, the rollers are coupled to the lobes via one or more bearing elements, as will be appreciated by one of skill in the art.

Figure 38:
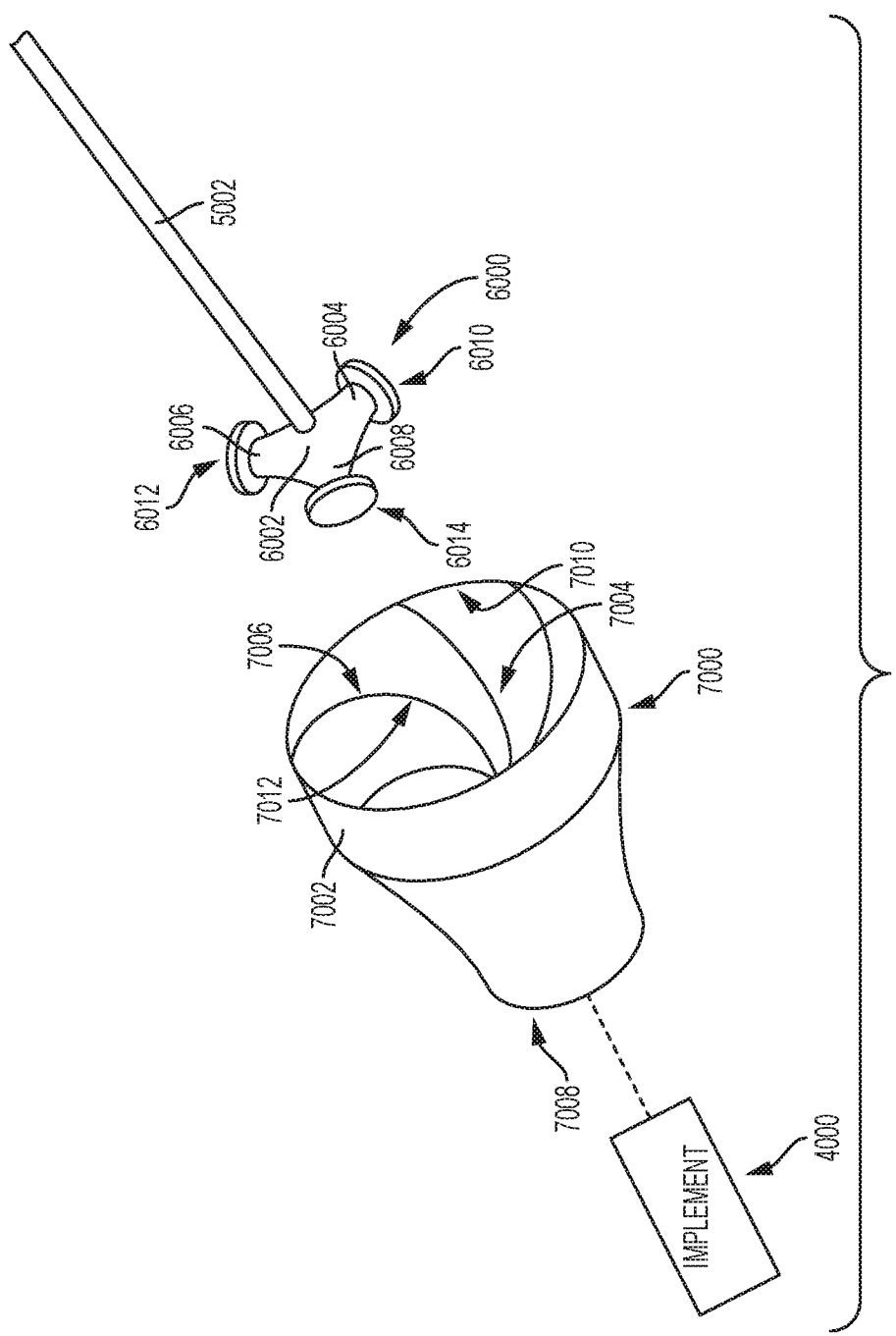
FIG. 38 is a front perspective view of a PTO driving member and a PTO receiving member, according to some embodiments.

In some embodiments, the PTO driving member 6000 is configured to engage a PTO receiving member, such as the PTO receiving member 7000 illustrated in FIG. 38. In various embodiments, the PTO receiving member 7000 includes a body 7002. In some embodiments, the body 7002 is conically shaped and includes a hollow interior region 7004, with an open forward face 7006, and a closed or partially closed rearward face 7008. In some embodiments, the rearward face 7008 is more proximate the implement 4000 than is the forward face 7006.

In some embodiments, the PTO receiving member 7000 is configured to receive the PTO driving member 6000 therein. Specifically, in some embodiments, the PTO driving member 6000 is received within the hollow interior region 7004 of the body 7002. In some embodiments, an interior wall 7010 of the body includes one or more locating features 7012 that are configured to properly locate and orient the PTO driving member 6000 as it is received within the PTO receiving member 7000. In some such embodiments, these locating features 7012 includes one or more channels or grooves cut into the interior wall 7010. In some embodiments, the channels or grooves are helical as the progress from the forward face 7006 toward the rearward face 7008, such that the interior wall 7010 is rifled. In some embodiments a width of the channel or groove of the locating feature 7012 decreases as the channel or groove is traversed from the forward face 7006 toward the rearward face 7008. In various embodiments, the locating features 7012 are appropriately sized to accommodate the rollers 6010-6014 of the PTO driving member 6000, as will be appreciate by one of skill in the art.

Figure 39:
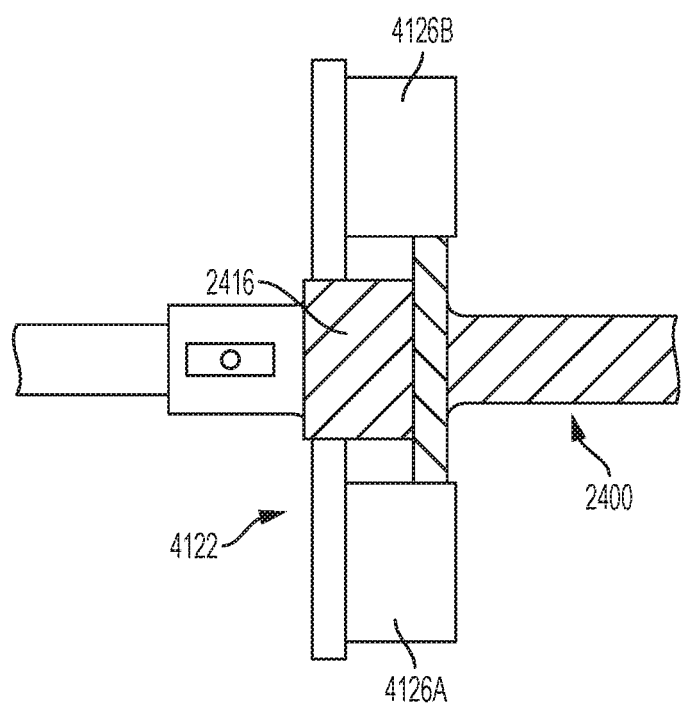
FIG. 39 is a top view of a coupling of a PTO driving member and a PTO receiving member, according to some embodiments.
Figure 40:
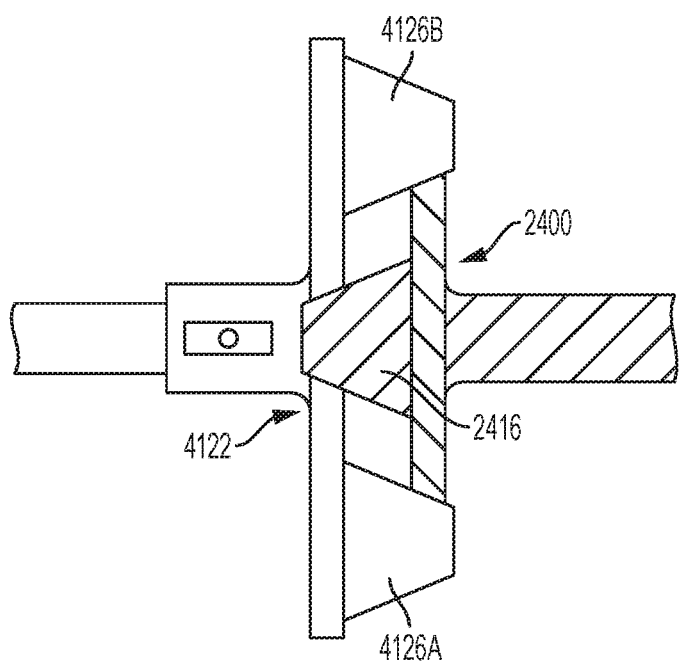
FIG. 40 is a top view of a coupling of a PTO driving member and a PTO receiving member, according to some embodiments.
Figure 41:
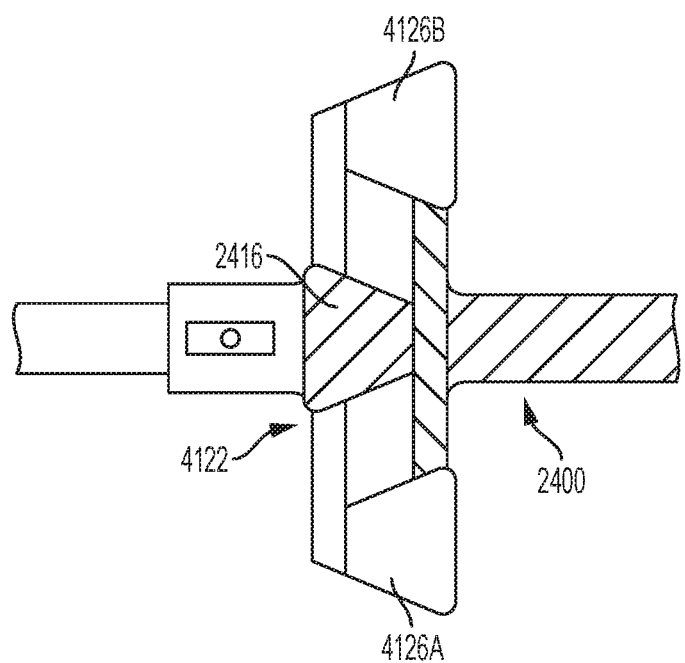
FIG. 41 is a top view of a coupling of a PTO driving member and a PTO receiving member, according to some embodiments.
Figure 42:
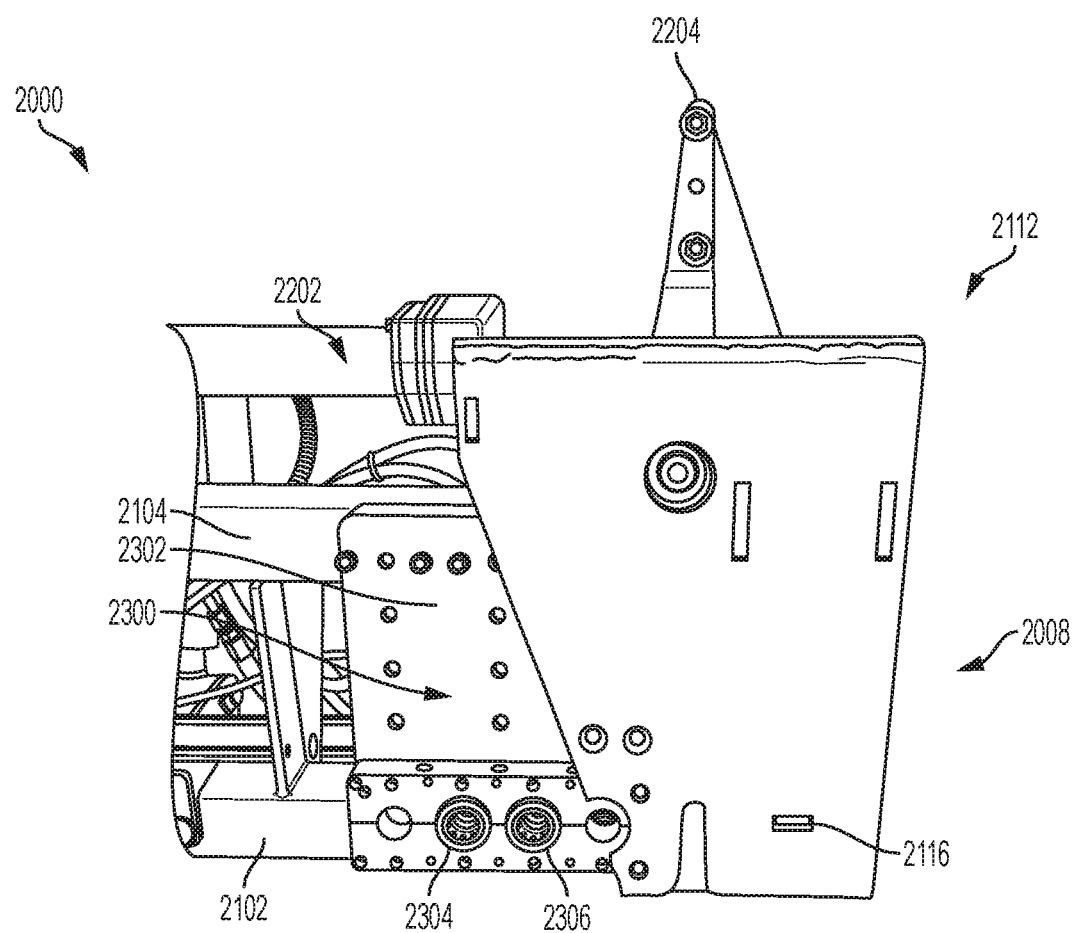
FIG. 42 is a detailed illustration of a left side portion of the front side of an implement interface system, according to some embodiments.
Figure 43:
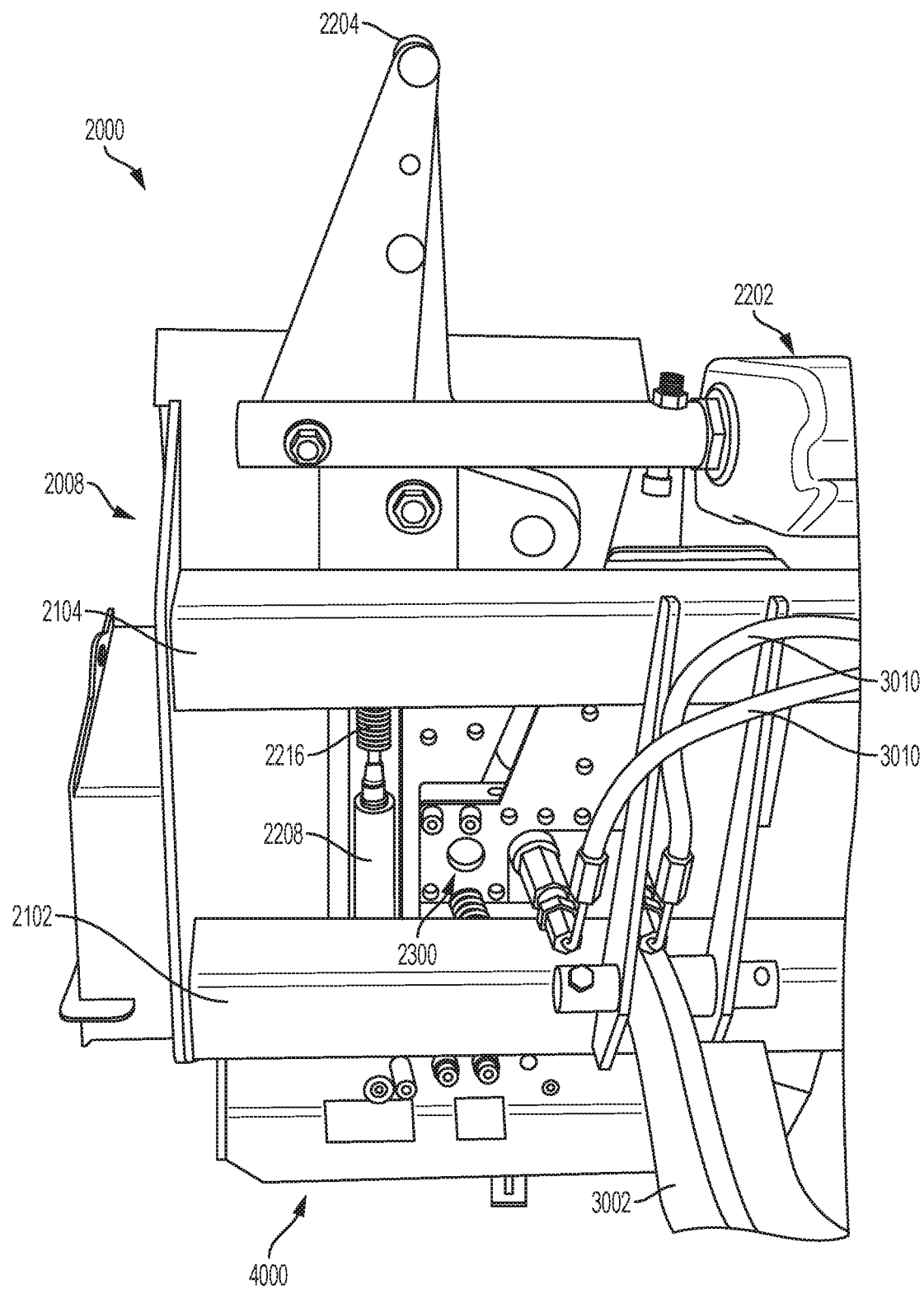
FIG. 43 is a detailed illustration of a left side portion of the back side of an implement interface system, according to some embodiments.
Figure 44:
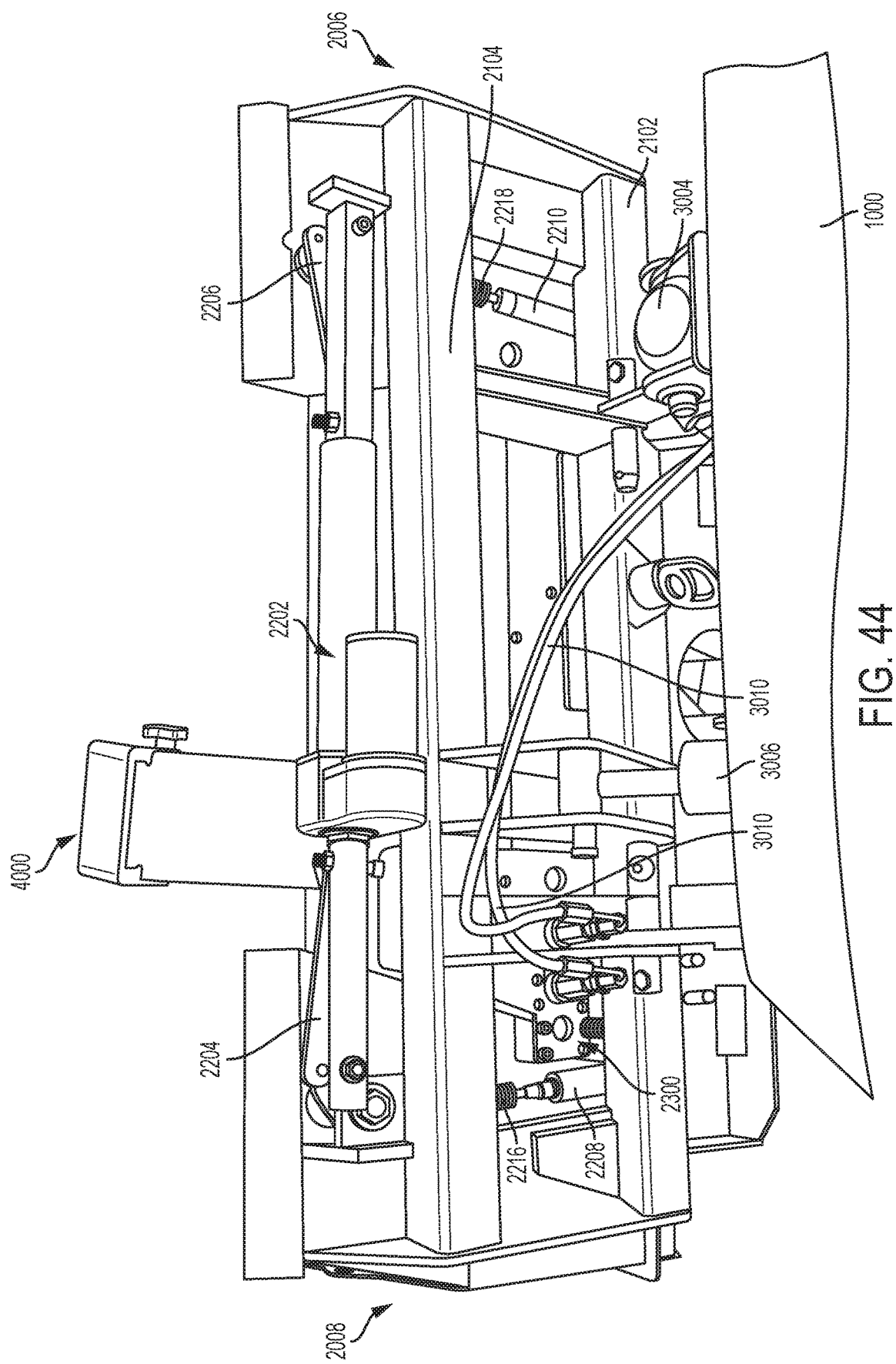
FIG. 44 is a detailed illustration of a back perspective view of an implement interface system, according to some embodiments.
Figure 45:
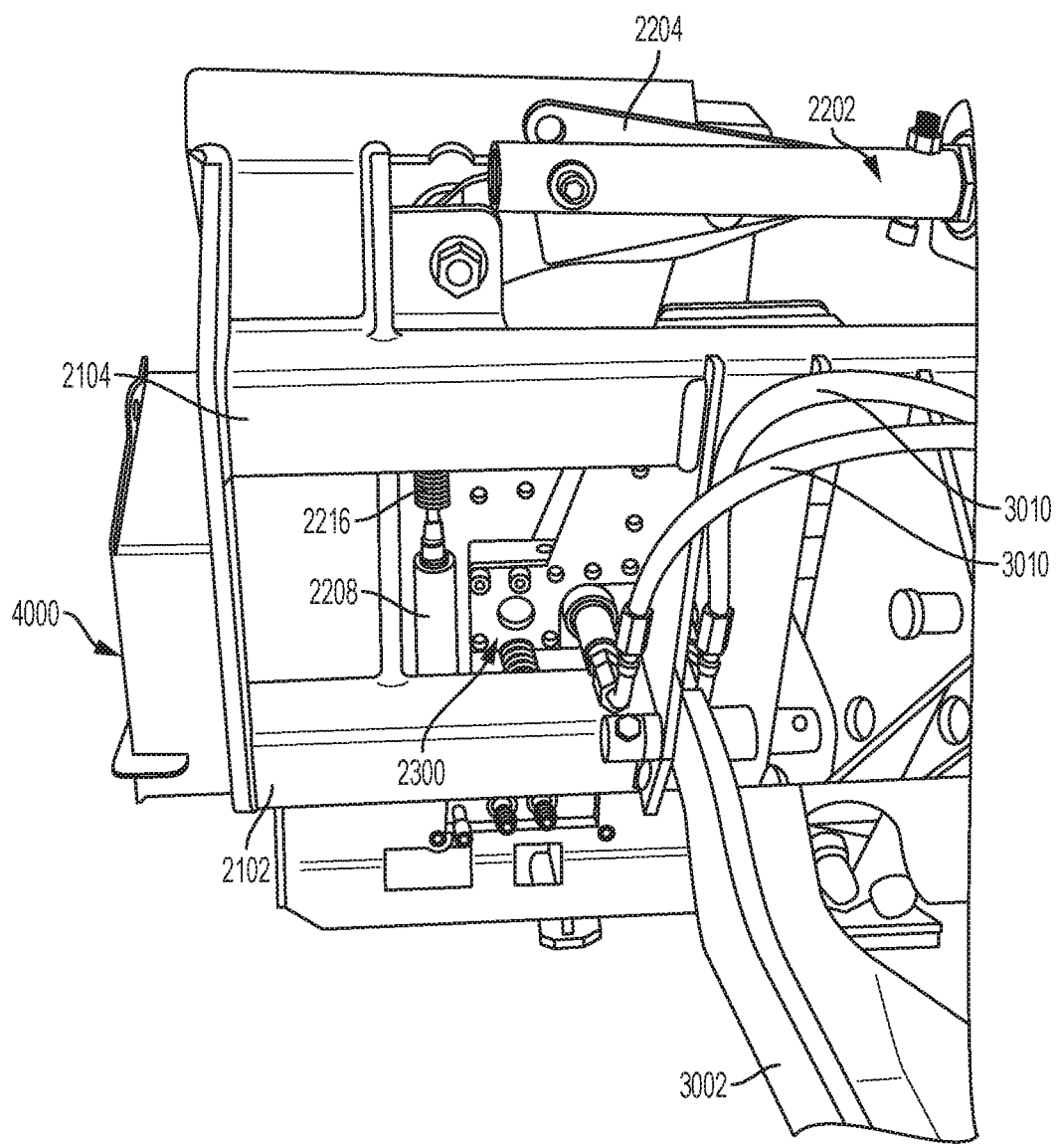
FIG. 45 is a detailed illustration of a left side portion of the back side of an implement interface system, according to some embodiments.
Figure 46:
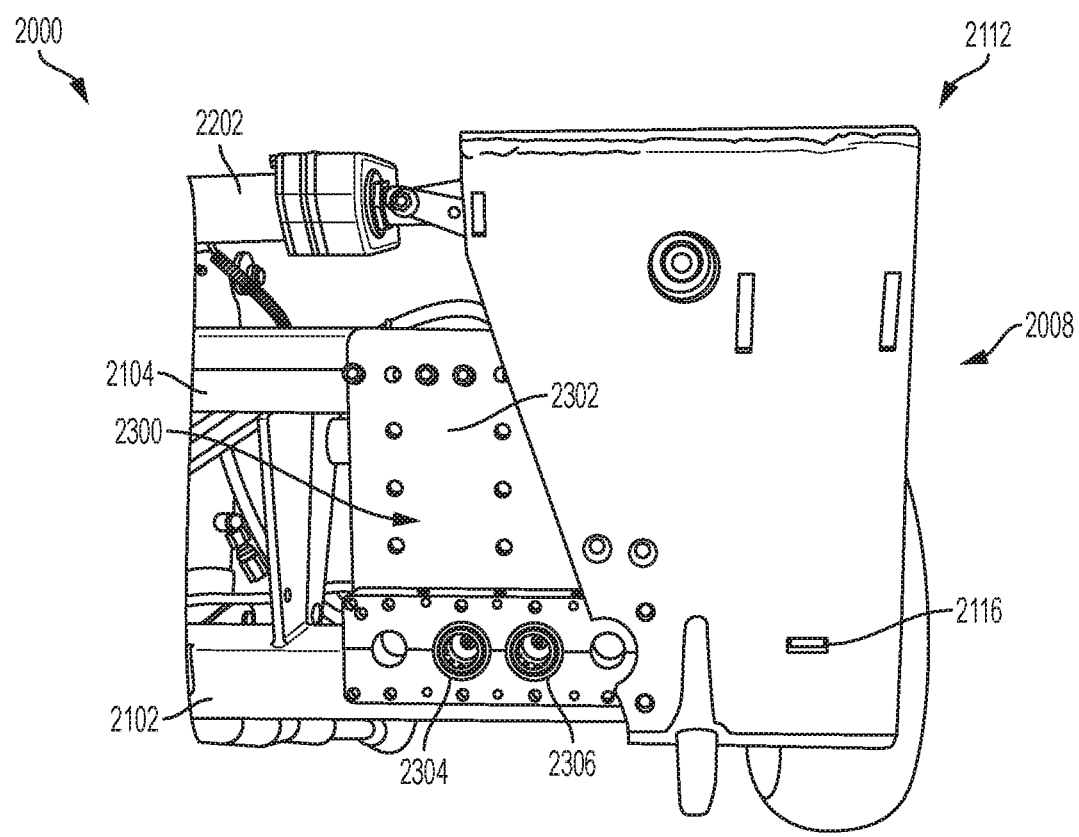
FIG. 46 is a detailed illustration of a left side portion of the front side of an implement interface system, according to some embodiments.
Figure 47:
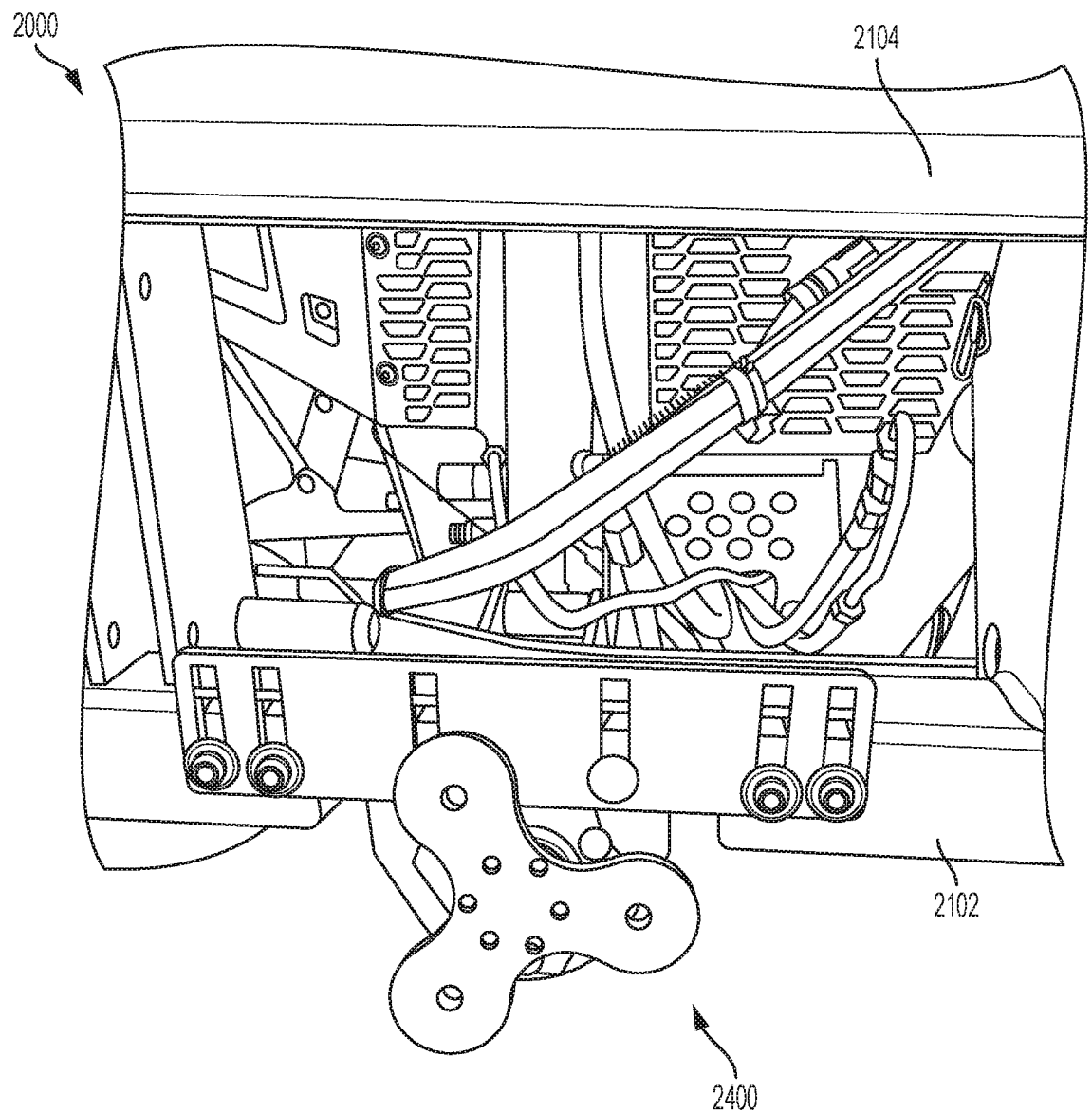
FIG. 47 is a detailed illustration of a PTO drive member of an implement interface system, according to some embodiments.
Figure 48:
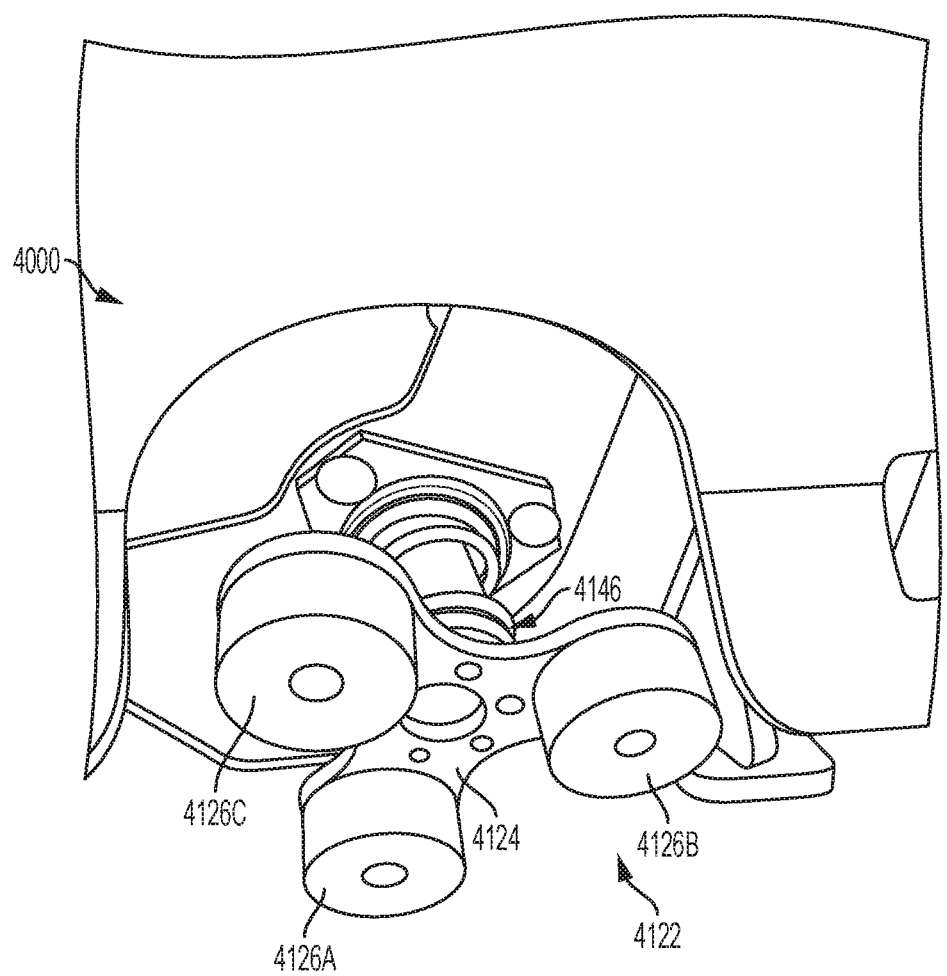
FIG. 48 is a detailed illustration of a PTO receiving member of an implement, according to some embodiments.
Figure 49:
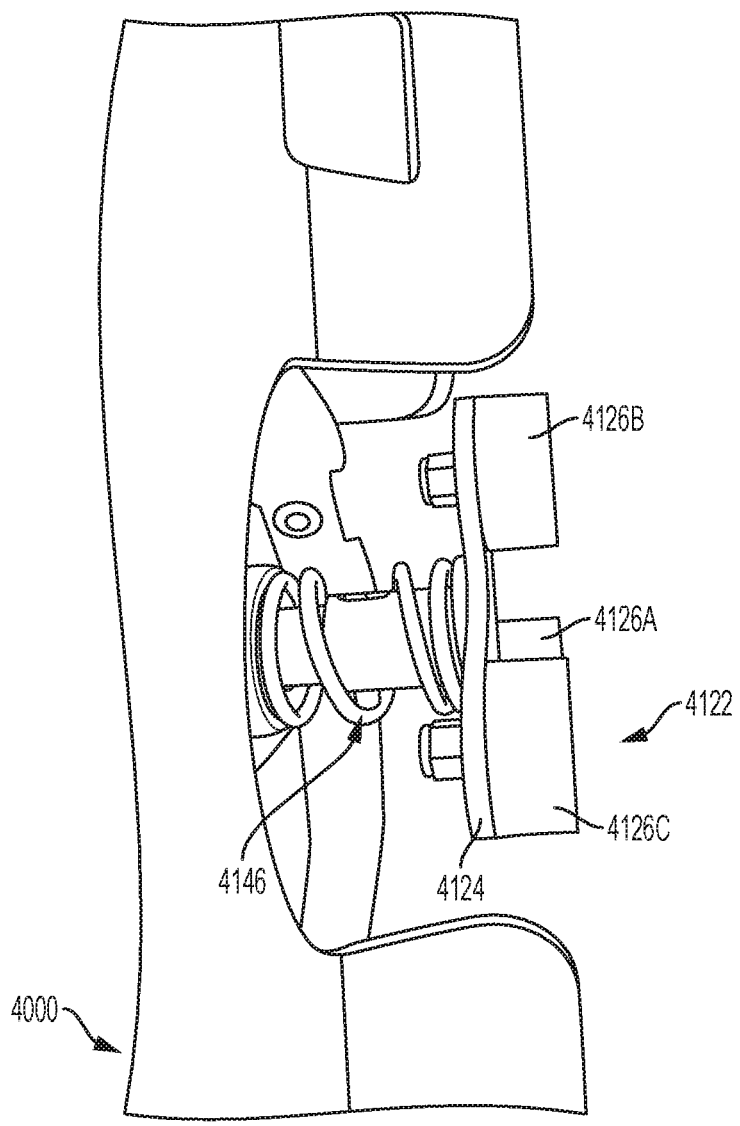
FIG. 49 is a detailed illustration of a PTO receiving member of an implement, according to some embodiments.
Figure 50:
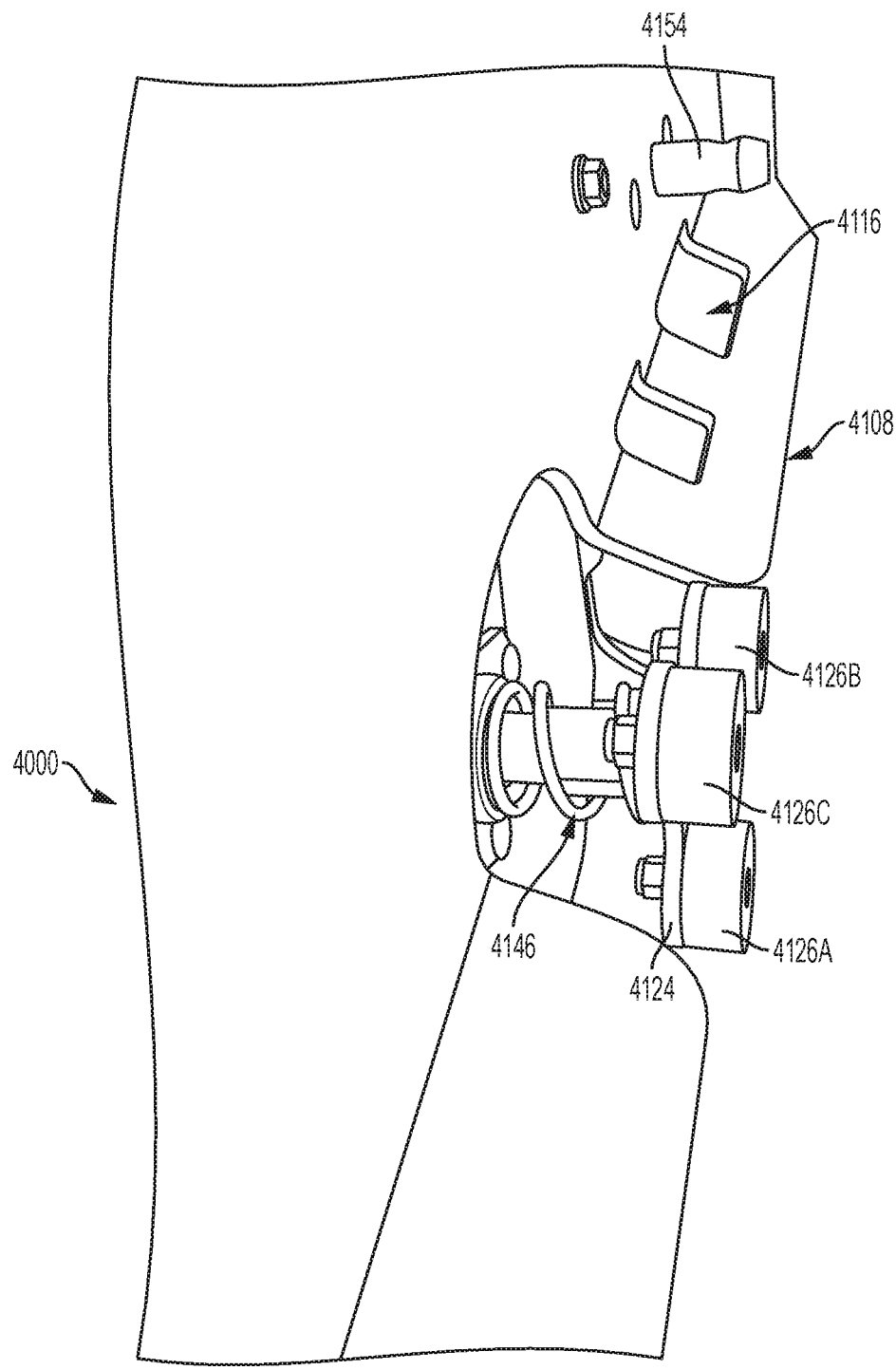
FIG. 50 is a detailed illustration of a PTO receiving member of an implement, according to some embodiments.
Figure 51:
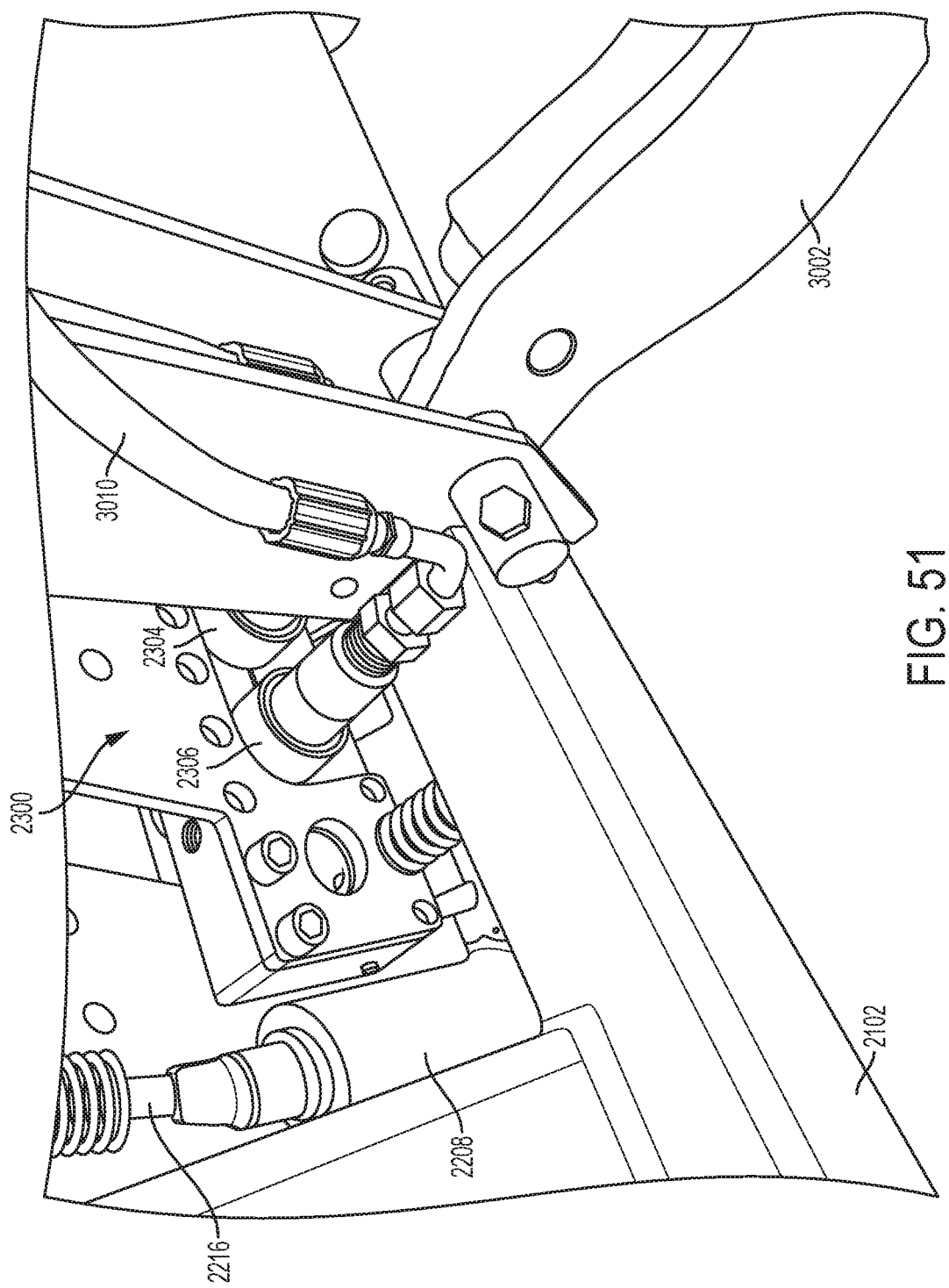
FIG. 51 is a detailed illustration of a portion of a hydraulic system of an implement interface system viewed from the back left side of the implement interface system, according to some embodiments.
Figure 52:
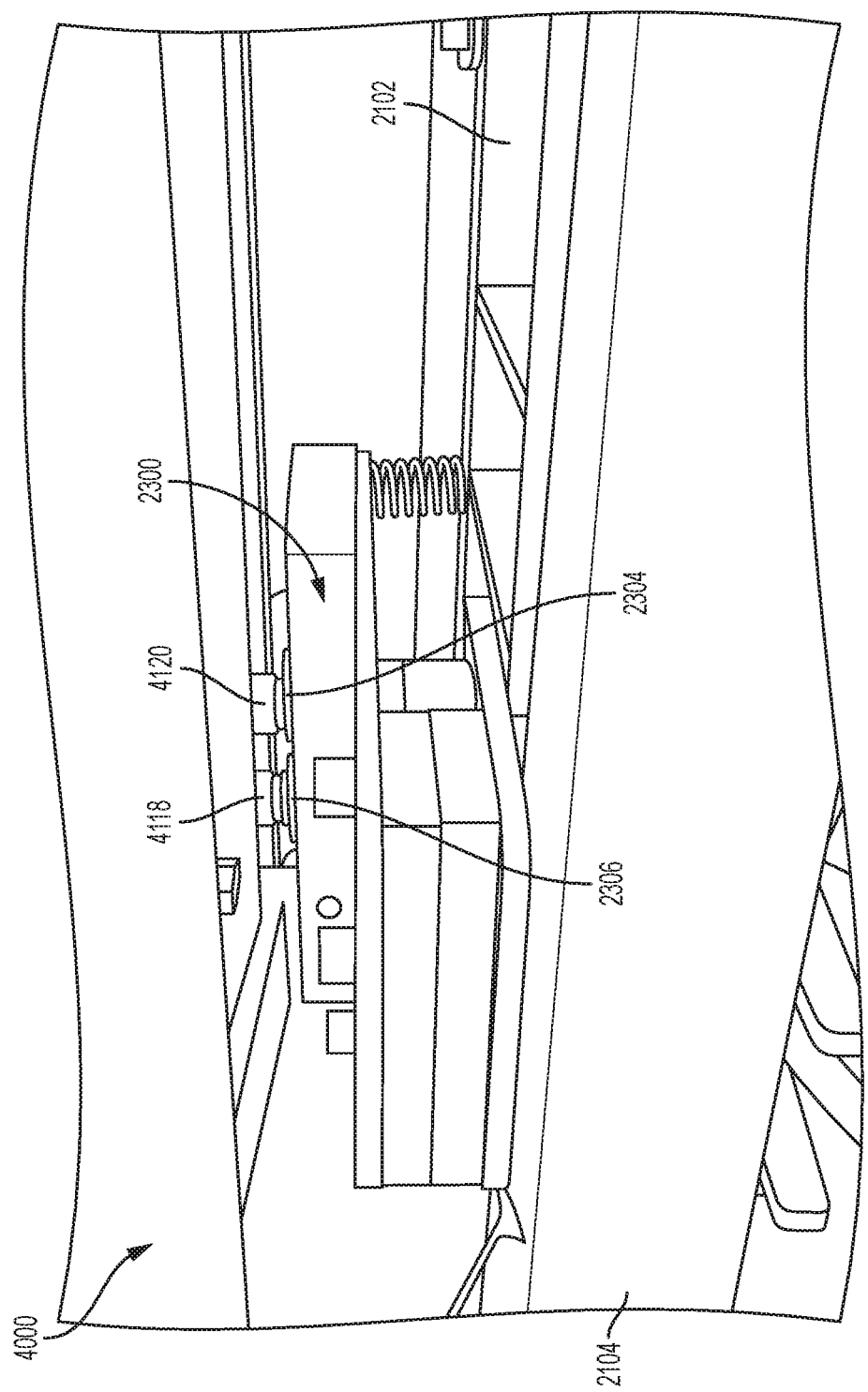
FIG. 52 is a detailed illustration of a portion of a hydraulic system of an implement interface system viewed from a top of an implement interface system, according to some embodiments.
Figure 53:
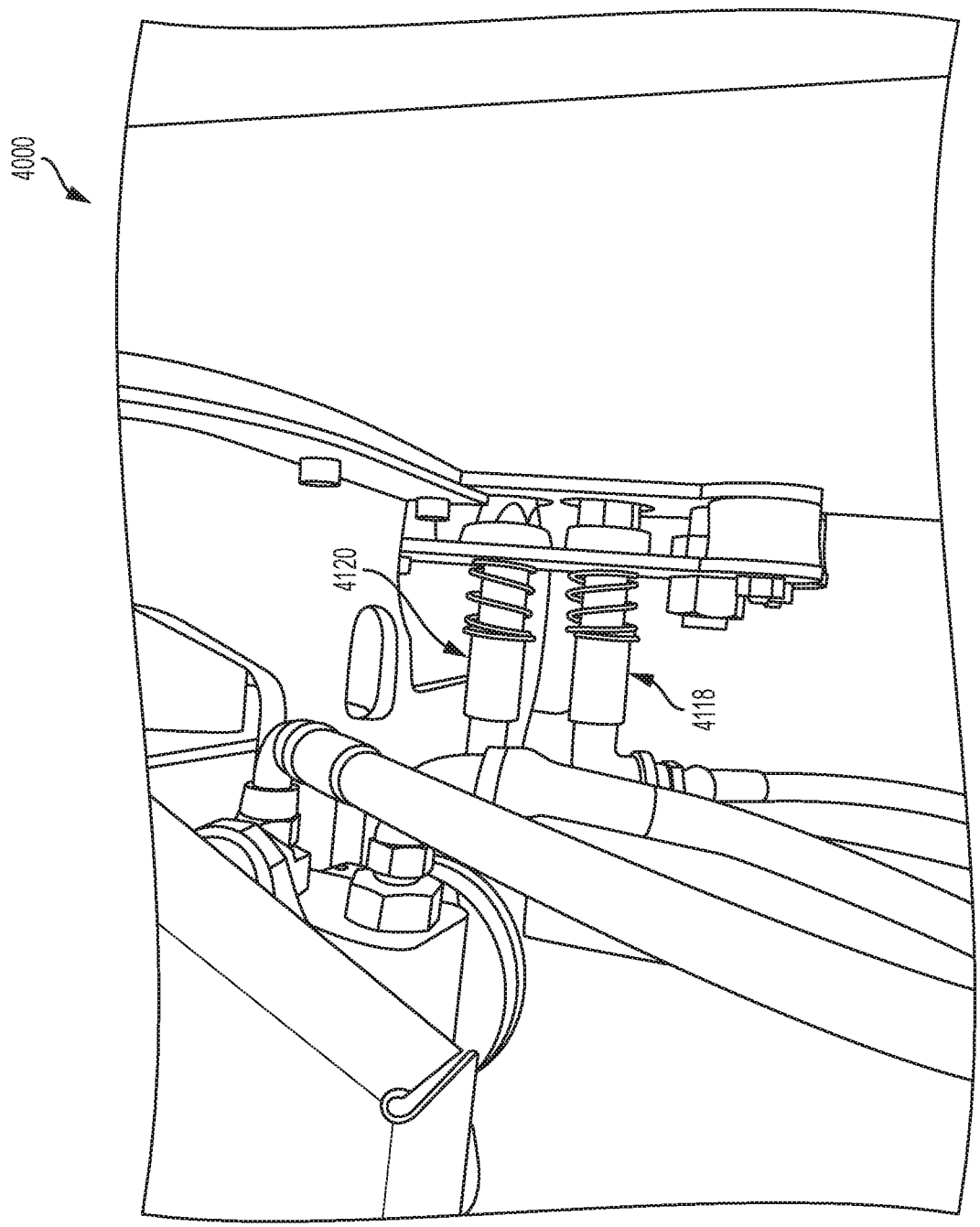
FIG. 53 is a detailed illustration of a portion of a hydraulic system of an implement, according to some embodiments.
Figure 54:
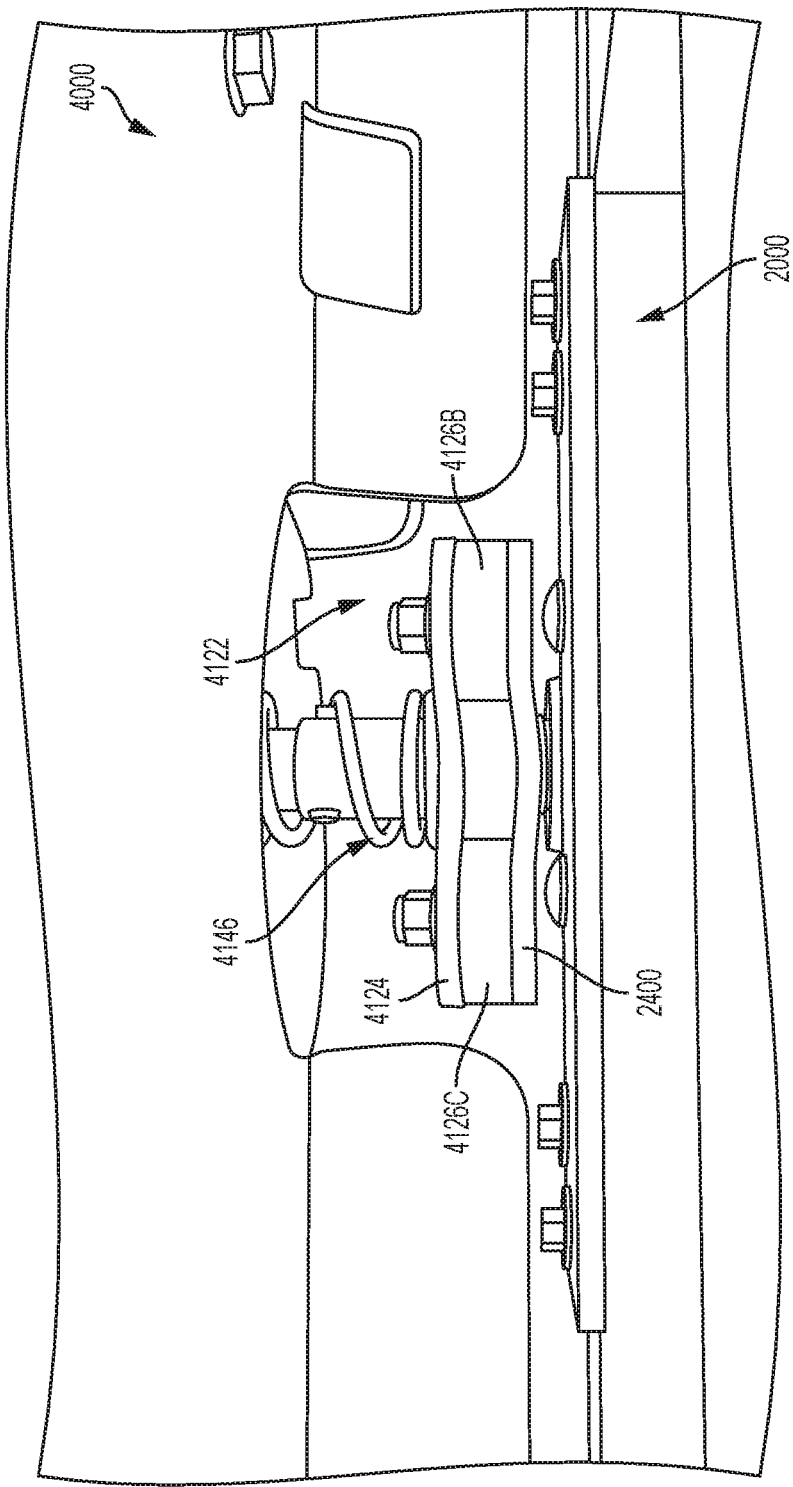
FIG. 54 is a detailed illustration of a properly aligned coupling of a PTO drive member and a PTO receiving member, according to some embodiments.
Figure 55:
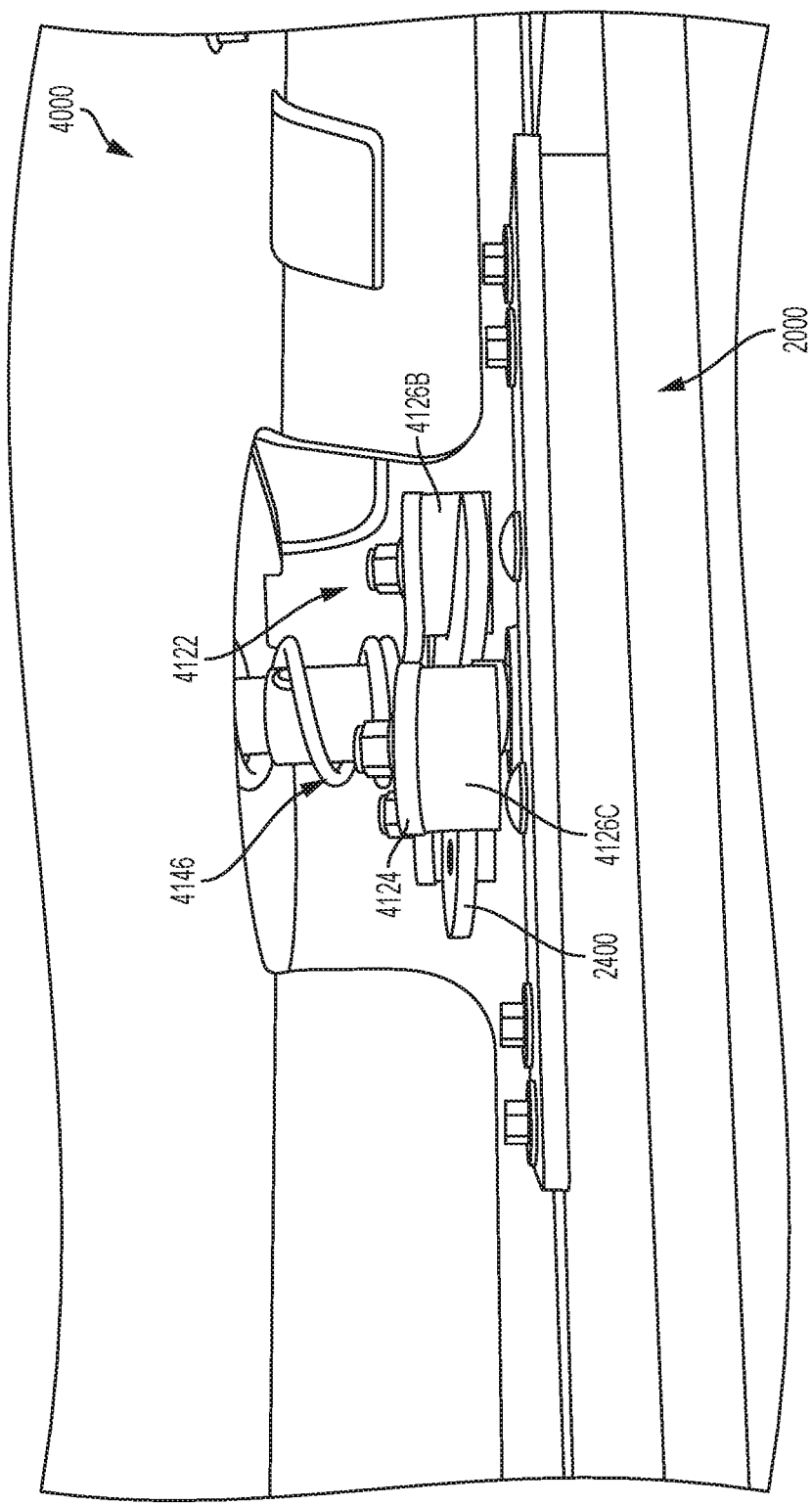
FIG. 55 is a detailed illustration of a properly aligned coupling of a PTO drive member and a PTO receiving member, according to some embodiments.
Figure 56:
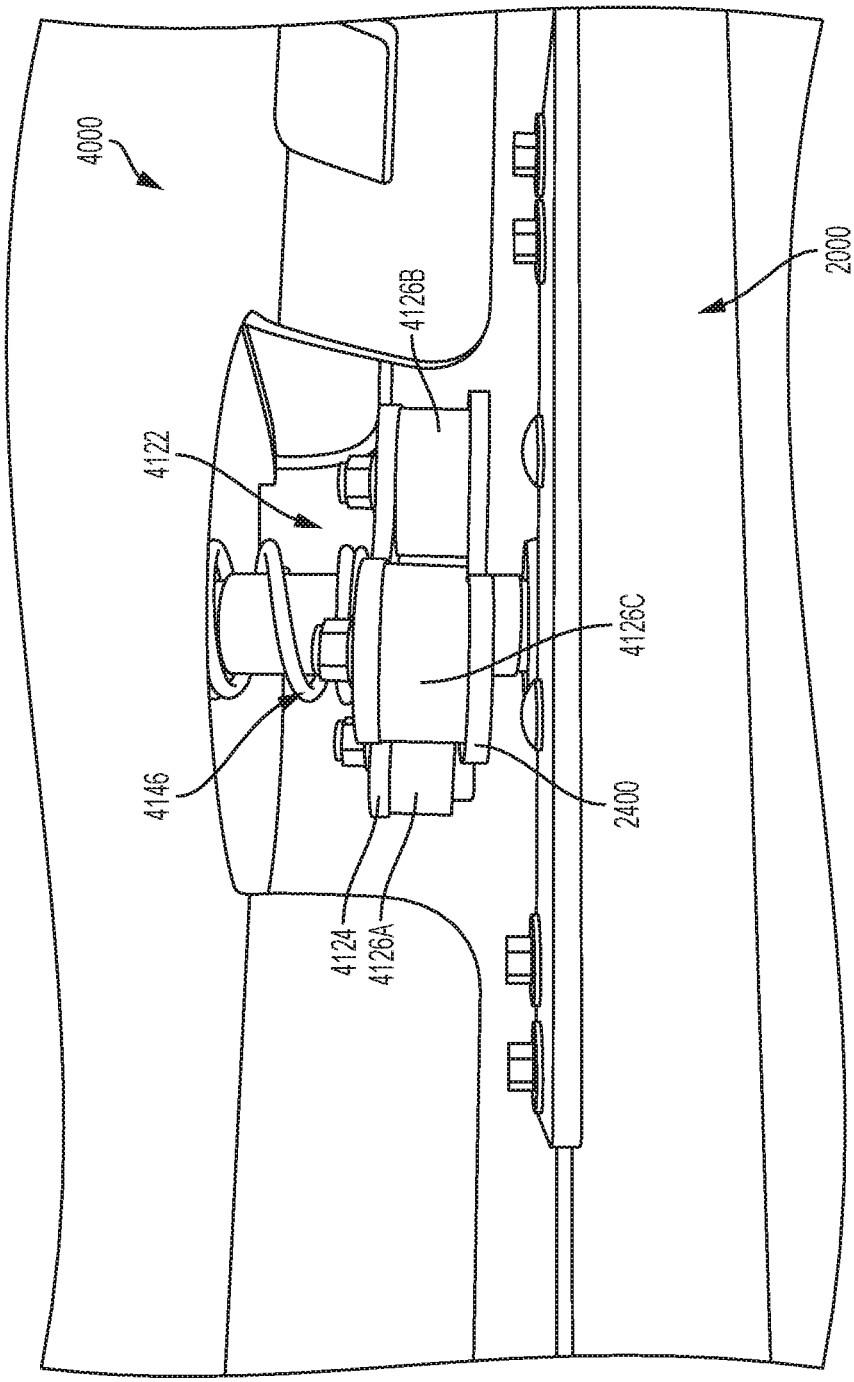
FIG. 56 is a detailed illustration of a misaligned coupling of a PTO drive member and a PTO receiving member, according to some embodiments.
Figure 57:
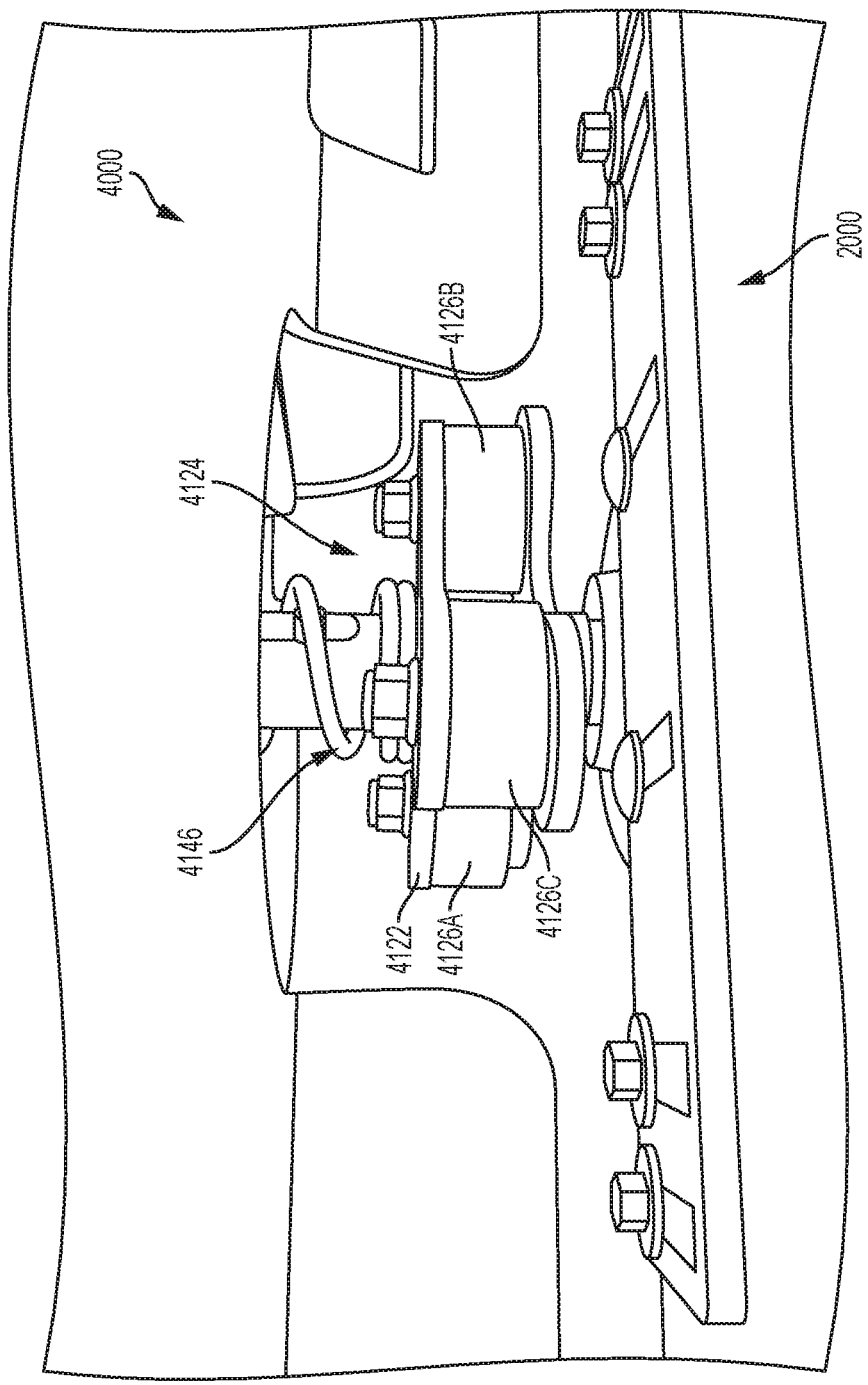
FIG. 57 is a detailed illustration of a misaligned coupling of a PTO drive member and a PTO receiving member, according to some embodiments.
Figure 58:
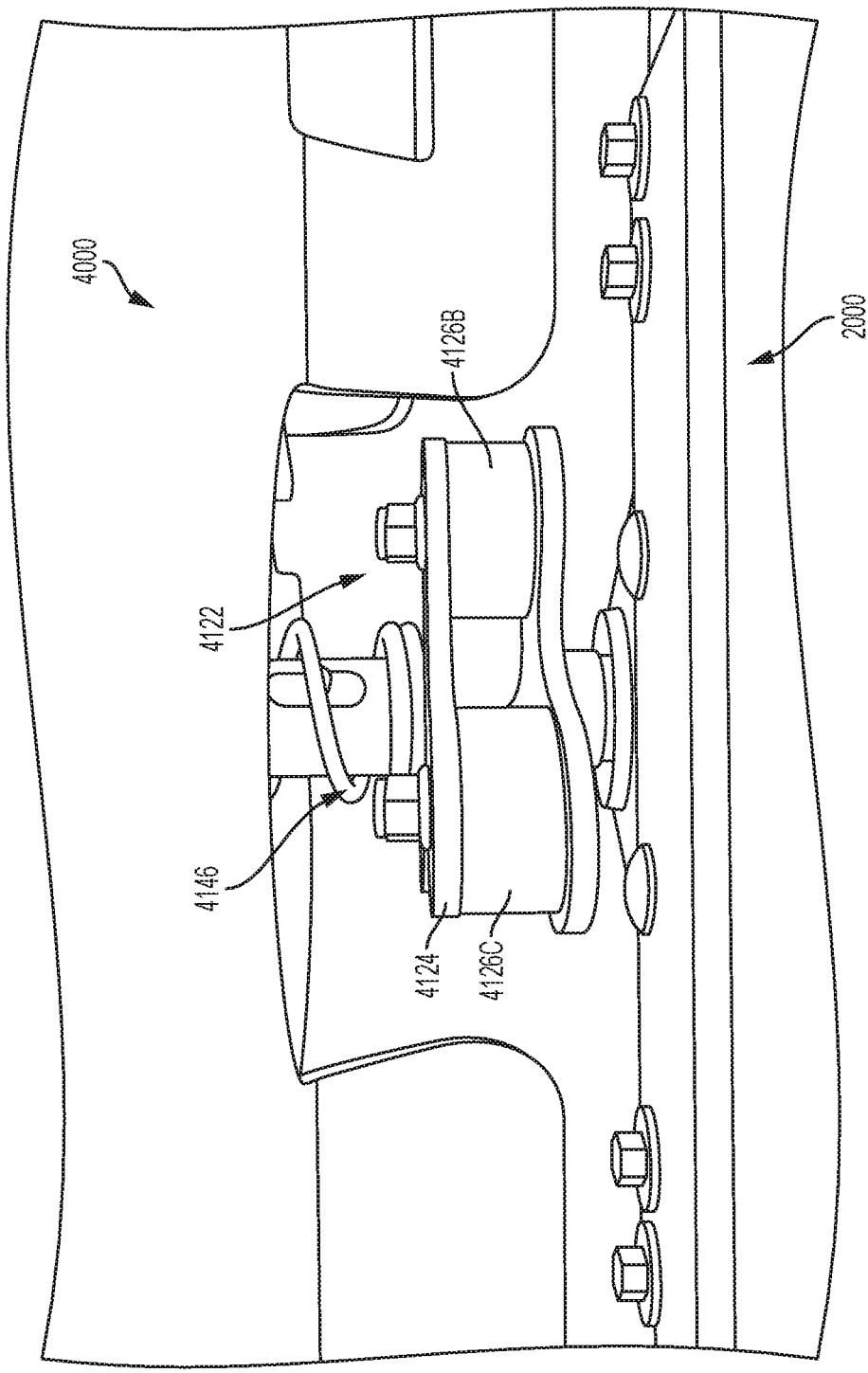
FIG. 58 is a detailed illustration of a misaligned coupling of a PTO drive member and a PTO receiving member, according to some embodiments.
Figure 59:
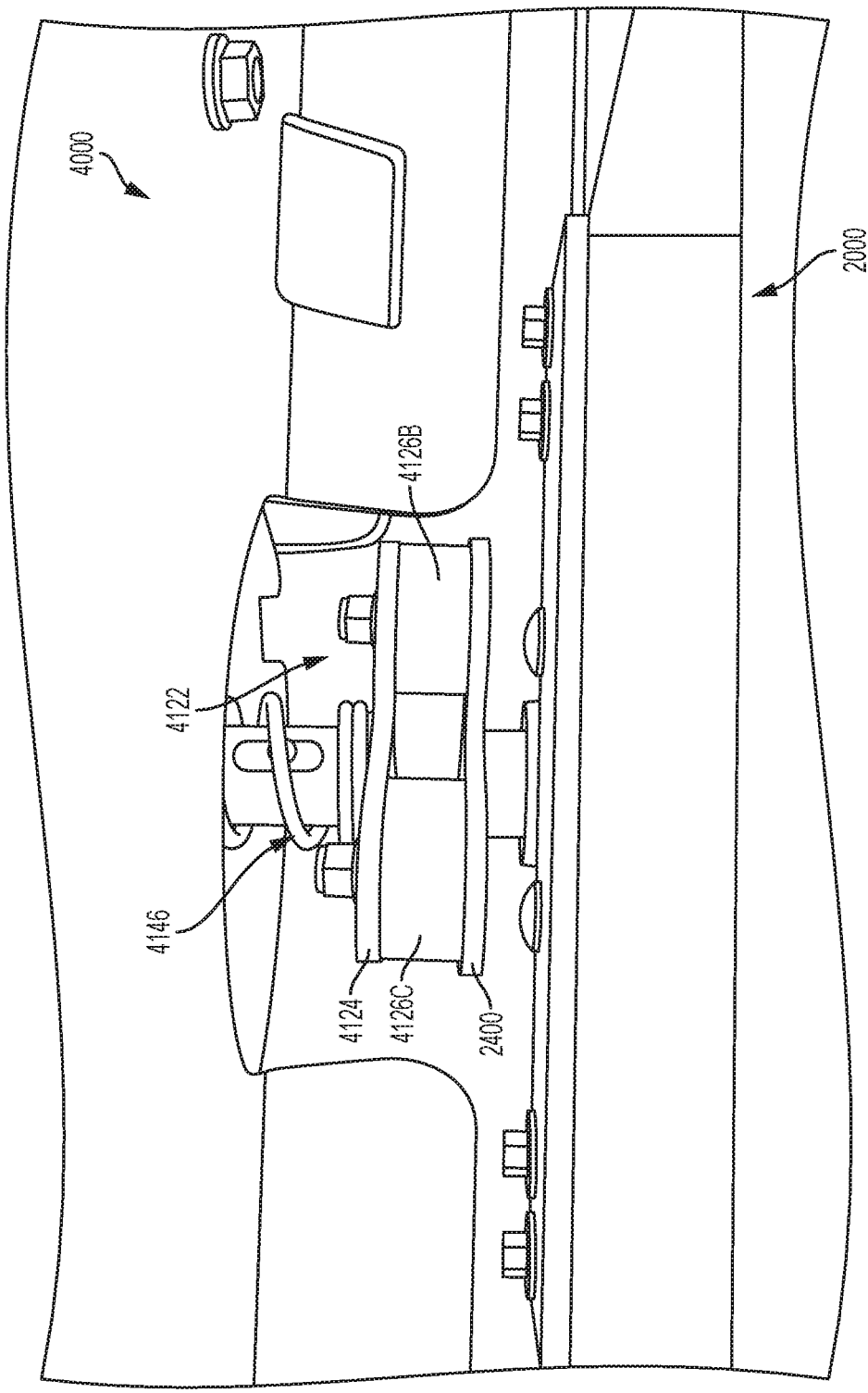
FIG. 59 is a detailed illustration of a misaligned coupling of a PTO drive member and a PTO receiving member, according to some embodiments.

Turning now to FIGS. 39-41, in various embodiments one or more of the PTO drive member 2400 and the PTO receiving member 4122 include reaction members. For example, as shown in FIG. 39, PTO drive member 4122 includes reaction members 4126A-4126C (although reaction member 4126C is blocked from view), and PTO receiving member 2400 includes one or more reaction members, such as reaction member 2416. In some embodiments, the reaction members on the PTO driving member 2400 and/or the reaction members on the PTO receiving member may be beveled or tapered. For example, the reaction members 4126A-4126C and 2416 illustrated in FIGS. 40 and 41 are tapered. The tapered reaction members 4126A-4126C and 2416 illustrated in FIG. 40 have a positive taper in that the cross sectional area of the reaction member decreases along the axial length of the reaction member in a progression away from the lobe surface from which the reaction member emanates. In various embodiments, such a configuration provides that the PTO drive member/PTO receiving member joint can function as a slip clutch or breakaway that can provide overload or sudden stop protection.

The tapered reaction members 4126A-4126C and 2416 illustrated in FIG. 41 have a negative taper in that the cross sectional area of the reaction member increases along the axial length of the reaction member in a progression away from the lobe surface from which the reaction member emanates. In various embodiments, such a configuration provides that reaction members can assist in coupling the PTO drive member and PTO receiving member together. For instance, the taper on the reaction members causes the PTO drive member and PTO receiving member to be drawn together as the reaction members of the PTO drive member and the PTO receiving member engage one-another.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the above described features.

The invention claimed is:

1. A utility vehicle comprising:
   a power take off system configured to deliver power to a removable implement coupled to the utility vehicle,
   a power take off driving member coupled to the power take off system of the utility vehicle, the power take off driving member including a body and a plurality of lobes radially emanating from the body of the power take off driving member; and
   a power take off receiving member configured to interface with the power take off driving member, the power take off receiving member including a body and a plurality of lobes radially emanating from the body of the power take off receiving member, each adjacent radially emanating lobe of the power take off receiving member having a reaction member projecting therefrom, the power take off receiving member being coupleable to the removable implement,
   wherein each adjacent radially emanating lobe of the power take off driving member engages a reaction member of the power take off receiving member to cause the power take off receiving member to rotate and wherein the power take off driving member and the power take off receiving member are brought into contact and are coupled without manual intervention, and
   wherein the power take off receiving member is able to translate along a longitudinal axis of a driveshaft of the removable implement to change the axial position of the reaction member relative to the power take off driving member.

2. The utility vehicle of claim 1, wherein the power take off driving member is coupled to a drive shaft of the utility vehicle.

3. The utility vehicle of claim 1, wherein
   at least one of the plurality of lobes includes a first end adjacent the body and defines a first lateral width, and a head radially spaced from the first end and defining a second lateral width larger than the first lateral width.

4. The utility vehicle of claim 1, wherein the power take off driving member is coupled to a drive shaft of the utility vehicle.

5. The utility vehicle of claim 1, wherein the power take off driving member is operable to self-align with the power take off receiving member.

6. The utility vehicle of claim 5, wherein the power take off driving member is operable to be actuated to correct a misalignment between the plurality of lobes of the power take off driving member and the reaction members of the power take off receiving member.

7. The utility vehicle of claim 6, wherein when misaligned, actuation of the power take off driving member causes relative rotation between the power take off driving member and the power take off receiving member until the lobes of the power take off driving member align with respective voids adjacent each adjacent reaction member of the power take off receiving member.

8. The utility vehicle of claim 1, wherein the power take off receiving member of the removable implement is decoupled from the power take off driving member of the vehicle contemporaneously with a decoupling of the removable implement from the utility vehicle.

9. The utility vehicle of claim 1, further comprising at least one resilient member positioned between the power take off receiving member and an operating unit portion of the removable implement.

10. A power transfer system configured for transferring power from a utility vehicle to at least one removable implement that is coupleable to the utility vehicle such that at least one system of the at least one removable implement can be powered by the utility vehicle, the system comprising:
    a power take off driving member coupleable to a power take off system of the utility vehicle, the power take off driving member including a body and a plurality of lobes radially emanating from the body of the power take off driving member; and
    a power take off receiving member configured to interface with the power take off driving member, the power take off receiving member including a body and a plurality of lobes radially emanating from the body of the power take off receiving member, each adjacent radially emanating lobe of the power take off receiving member having a reaction member projecting therefrom, the power take off receiving member being coupleable to the at least one removable implement,
    wherein each adjacent radially emanating lobe of the power take off driving member engages a reaction member of the power take off receiving member to cause the power take off receiving member to rotate and wherein the power take off driving member and the power take off receiving member are brought into contact and are coupled without manual intervention, and
    wherein the power take off receiving member is free to translate along a longitudinal axis of a driveshaft of the removable implement to change the axial position of the reaction member relative to the power take off driving member.

11. The power transfer system of claim 10, wherein
    at least one of the plurality of lobes includes a first end adjacent the body and defines a first lateral width, and a head radially spaced from the first end and defining a second lateral width larger than the first lateral width.

12. The system of claim 11, wherein a plurality of forward faces on the lobes of the power take off receiving member are parallel to each other and perpendicular to a longitudinal axis of the power take off receiving member.

13. The system of claim 10, wherein the power take off driving member is coupleable to a drive shaft of the utility vehicle.

* * * * *